(12) United States Patent
Sun et al.

(10) Patent No.: US 12,455,631 B2
(45) Date of Patent: Oct. 28, 2025

(54) DISPLAY APPARATUS

(71) Applicant: HISENSE VISUAL TECHNOLOGY CO., LTD., Shandong (CN)

(72) Inventors: Na Sun, Shandong (CN); Luming Yang, Shandong (CN); Dayong Wang, Shandong (CN); Jin Cheng, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 217 days.

(21) Appl. No.: 18/366,017

(22) Filed: Aug. 7, 2023

(65) Prior Publication Data
US 2023/0384868 A1    Nov. 30, 2023

Related U.S. Application Data

(63) Continuation of application No. PCT/CN2021/133773, filed on Nov. 27, 2021.

(30) Foreign Application Priority Data

Feb. 8, 2021  (CN) .......................... 202110179119.X
Feb. 8, 2021  (CN) .......................... 202110184152.1
Feb. 8, 2021  (CN) .......................... 202110184228.0

(51) Int. Cl.
*G06F 3/01*        (2006.01)
*H04N 21/4223*    (2011.01)
(Continued)

(52) U.S. Cl.
CPC .......... *G06F 3/017* (2013.01); *H04N 21/4223* (2013.01); *H04N 21/4312* (2013.01); *H04N 21/4396* (2013.01); *H04N 21/44* (2013.01)

(58) Field of Classification Search
CPC ...... G06F 3/017; G06F 3/0304; G06F 3/0483; G06F 3/0488; G06F 3/16; G06F 9/451;
(Continued)

(56) References Cited

U.S. PATENT DOCUMENTS 5,850,218 A   12/1998  LaJoie et al.
6,435,777 B1   8/2002  Yoshii et al.
(Continued)

FOREIGN PATENT DOCUMENTS

CN          1620123 A     5/2005
CN        101026702 A     8/2007
(Continued)

OTHER PUBLICATIONS

International Search Report, mailed Jan. 29, 2022, from PCT/CN2021/133773, 5 pages.
(Continued)

*Primary Examiner* — Adil Ocak
(74) *Attorney, Agent, or Firm* — Workman Nydegger

(57) ABSTRACT

A display apparatus includes a display; an image collector or a user input interface configured to connect with the image collector; one or more processors configured to execute the instructions to cause the display apparatus to: in response to a switch command for a gesture detection function switch on a user interface, detect whether the image collector is occupied by a specified application that needs to start the image collector based on an attribute state of the image collector; in response to the attribute state being a first state, determine that the image collector is occupied by the specified application that needs to start the image collector, and not perform a gesture detection function; in response to the attribute state being a second state, determine that the image
(Continued)

collector is not occupied by the specified application that needs to start the image collector, and perform the gesture detection function.

18 Claims, 19 Drawing Sheets

(51) Int. Cl.
 *H04N 21/431* (2011.01)
 *H04N 21/439* (2011.01)
 *H04N 21/44* (2011.01)
(58) Field of Classification Search
 CPC ........... H04N 21/4223; H04N 21/4312; H04N 21/4396; H04N 21/44; H04N 21/44218
 USPC .......................................................... 725/37
 See application file for complete search history.

(56) References Cited

U.S. PATENT DOCUMENTS

| | | | |
|---|---|---|---|
| 9,800,933 | B1 | 10/2017 | Strothmann et al. |
| 11,803,831 | B1* | 10/2023 | Kalaboukis ............ G06Q 20/405 |
| 2010/0275231 | A1 | 10/2010 | Yi et al. |
| 2011/0291926 | A1* | 12/2011 | Gokturk ............... G06V 40/113 |
| | | | 345/158 |
| 2012/0189287 | A1 | 7/2012 | Otani |
| 2013/0212624 | A1 | 8/2013 | Okada |
| 2013/0290911 | A1* | 10/2013 | Praphul .................. G06F 3/038 |
| | | | 715/863 |
| 2019/0018243 | A1* | 1/2019 | Parkinson ............... G06F 3/162 |

FOREIGN PATENT DOCUMENTS

| | | |
|---|---|---|
| CN | 101052114 A | 10/2007 |
| CN | 101437124 A | 5/2009 |
| CN | 101577797 A | 11/2009 |
| CN | 102036119 A | 4/2011 |
| CN | 102375688 A | 3/2012 |
| CN | 102402601 A | 4/2012 |
| CN | 103197835 A | 7/2013 |
| CN | 103414946 A | 11/2013 |
| CN | 103428562 A | 12/2013 |
| CN | 103914126 A | 7/2014 |
| CN | 103916710 A | 7/2014 |
| CN | 104104984 A | 10/2014 |
| CN | 104182132 A | 12/2014 |
| CN | 104246661 A | 12/2014 |
| CN | 104317395 A | 1/2015 |
| CN | 104750252 A | 7/2015 |
| CN | 104898822 A | 9/2015 |
| CN | 105824427 A | 8/2016 |
| CN | 106056085 A | 10/2016 |
| CN | 106325507 A | 1/2017 |
| CN | 107526500 A | 12/2017 |
| CN | 107765853 A | 3/2018 |
| CN | 109725723 A | 5/2019 |
| CN | 109725727 A | 5/2019 |
| CN | 110458095 A | 11/2019 |
| CN | 110611788 A | 12/2019 |
| CN | 110716648 A | 1/2020 |
| CN | 110764616 A | 2/2020 |
| CN | 112817557 A | 5/2021 |
| CN | 112835506 A | 5/2021 |
| CN | 112860212 A | 5/2021 |
| JP | 2017212007 A | 11/2017 |
| WO | 2009069975 A1 | 6/2009 |
| WO | 2013167057 A2 | 11/2013 |
| WO | 2014036937 A1 | 3/2014 |
| WO | 2015194697 A1 | 12/2015 |
| WO | 2019047205 A1 | 3/2019 |

OTHER PUBLICATIONS

Chinese First Office Action, mailed Jun. 8, 2022, from Chinese App. 202110179119.X, 25 pages.
Chinese Second Office Action, mailed Mar. 29, 2023, from Chinese App. 202110179119.X, 32 pages.
Chinese First Office Action, mailed May 10, 2022, from Chinese App. 202110184152.1, 23 pages.
Chinese Second Office Action, mailed , Oct. 13, 2022, from Chinese App. 202110184152.1, 19 pages.
Chinese First Office Action, mailed Jan. 26, 2022, from Chinese App. 202110184228.0, 10 pages.

* cited by examiner ial Application No. PCT/CN2021/133773, filed on Nov. 27, 2021, which claims priorities to Chinese Patent Application No. 202110179119.X filed on Feb. 8, 2021, Chinese Patent Application No. 202110184228.0 filed on Feb. 8, 2021, and Chinese Patent Application No. 202110184152.1 filed on Feb. 8, 2021, which are hereby incorporated by reference in their entireties.

DISPLAY APPARATUS

CROSS-REFERENCE OF RELATED APPLICATIONS

This application is a continuation application of Internat

FIELD

The disclosure relates to the field of smart TV interaction technologies, and particularly to a display apparatus.

BACKGROUND

With the rapid development of display apparatuses, the display apparatuses have more functions and more powerful performances. At present, the display apparatuses include a smart TV, a smart set-top box, a smart box, and other products with smart display screens, etc. Taking the smart TV as an example, the smart TV provides conventional TV functions, and can play different TV programs.

In a process of using a display apparatus, a user may adjust an output volume of the display apparatus based on use requirements, so that the user can immerse himself/herself in the TV programs. At present, volume adjustment of the display apparatus is generally implemented using a configured remote control of the display apparatus, and volume down or volume up is implemented by triggering a left button or a right button of the remote control. However, this volume adjustment needs to be implemented with the help of other devices, which is not convenient enough and affects user experience.

SUMMARY

In a first aspect, a display apparatus provided in the disclosure includes: a display configured to present an image and/or a user interface; an image collector or a user interface configured to connect with the image collector, the image collector being configured to collect a user image; a memory configured to store instructions and data associated with the display and one or more processors in connection with the display, the image collector or the user input interface and the memory and configured to execute the instructions to cause the display apparatus to: acquire a user image including a user gesture collected by the image collector; in response to recognizing that the user gesture in the user image is a volume adjustment gesture, present a volume bar in the user interface; and in response to a volume adjustment command generated during performing a specified action based on the volume adjustment gesture, adjust a volume value corresponding to the volume bar.

In a second aspect, the disclosure further provides a method for volume adjustment. The method includes: acquiring a user image including a user gesture collected by an image collector; in response to recognizing that the user gesture in the user image is a volume adjustment gesture, presenting a volume bar in the user interface; and in response to a volume adjustment command generated during performing a specified action based on the volume adjustment gesture, adjusting a volume value corresponding to the volume bar.

In a third aspect, the disclosure provides a display apparatus, including: a display configured to present an image and/or a user interface; an image collector or a user interface configured to connect with the image collector, the image collector being configured to collect a user image; a memory configured to store instructions and data associated with the display and one or more processors in connection with the display, the image collector or the user input interface and the memory and configured to execute the instructions to cause the display apparatus to: in response to a switch command for a global gesture switch on the user interface, detect whether the image collector is occupied by a specified application that needs to start the image collector; in response to the image collector being occupied by the specified application that needs to start the image collector, not start a global gesture detection function; and in response to the image collector not being occupied by the specified application that needs to start the image collector, start the global gesture detection function, where the global gesture detection function is used to detect a user image including a user gesture, to control the display apparatus accordingly based on the user gesture.

In a fourth aspect, the disclosure further provides a display apparatus, including: a display configured to present an image and/or a user interface presenting a video file; an image collector or a user interface configured to connect with the image collector, the image collector being configured to collect a user image; a memory configured to store instructions and data associated with the display and one or more processors in connection with the display, the image collector or the user input interface and the memory and configured to execute the instructions to cause the display apparatus to: in response to a global gesture detection function being enabled, acquire a user image including a user gesture collected by the image collector; in response to detecting that the user gesture in the user image is a play and pause control gesture, acquire playing mode broadcast data for playing the video file; in response to the playing mode broadcast data indicating full-screen playing, respond to a command generated from the play and pause control gesture by performing a play operation or a pause operation on the video file; and in response to the playing mode broadcast data indicating small-screen playing, not respond to the command generated from the play and pause control gesture.

In a fifth aspect, the disclosure further provides a display apparatus, including: a display configured to present an image and/or a user interface; an image collector or a user interface configured to connect with the image collector, the image collector being configured to collect a user image; a memory configured to store instructions and data associated with the display and one or more processors in connection with the display, the image collector or the user input interface and the memory and configured to execute the instructions to cause the display apparatus to: in response to a global gesture detection function being enabled, acquire a user image including a user gesture collected by the image collector; in response to the user gesture being a play and pause control gesture, respond to a command corresponding to the play and pause control gesture by performing a play operation or a pause operation; and in response to the user gesture being a mute control gesture, respond to the command corresponding to the mute control gesture by performing a mute operation or an unmute operation.

In a sixth aspect, the disclosure further provides a method for controlling a display apparatus, the method including: in response to a switch command for a global gesture switch on a user interface, detecting whether an image collector is occupied by a specified application that needs to start the image collector; in response to the image collector being occupied by the specified application that needs to start the image collector, not enabling a global gesture detection function; and in response to the image collector not being occupied by the specified application that needs to start the image collector, enabling the global gesture detection function, where the global gesture detection function is used to detect a user image including a user gesture, to control the display apparatus accordingly based on the user gesture.

In a seventh aspect, the disclosure further provides a method for controlling a display apparatus, the method including: in response to a global gesture detection function being enabled, acquiring a user image including a user gesture collected by an image collector; in response to detecting that the user gesture in the user image is a play and pause control gesture, acquiring playing mode broadcast data for playing a video file; in response to the playing mode broadcast data indicating full-screen playing, responding to a command generated from the play and pause control gesture by performing a play operation or a pause operation on the video file; and in response to the playing mode broadcast data indicating small-screen playing, not responding to the command generated from the play and pause control gesture.

In an eighth aspect, the disclosure further provides a method for controlling a display apparatus, the method including: in response to a global gesture detection function being enabled, acquiring a user image including a user gesture collected by an image collector; in response to the user gesture being a play and pause control gesture, responding to a command corresponding to the play and pause control gesture by performing a play operation or a pause operation; and in response to the user gesture being a mute control gesture, responding to the command corresponding to the mute control gesture by performing a mute operation or an unmute operation.

In a ninth aspect, the disclosure provides a display apparatus, including: a display configured to present an image and/or a user interface; an image collector or a user interface configured to connect with the image collector, the image collector being configured to collect a user image; a memory configured to store instructions and data associated with the display and one or more processors in connection with the display, the image collector or the user input interface and the memory and configured to execute the instructions to cause the display apparatus to: acquire a user image including at least one user gesture collected by the image collector, and a specified gesture ID of a first user gesture matching a volume adjustment gesture in the user image; compute a recognition success rate of the volume adjustment gesture corresponding to the specified gesture ID in several frames of the user image collected within a first duration; in response to the recognition success rate of the volume adjustment gesture exceeding a first threshold, present a volume bar in the user interface; and in response to a volume adjustment command generated when a user corresponding to the specified gesture ID performs a specified action based on the volume adjustment gesture, adjust a volume value corresponding to the volume bar.

In a tenth aspect, the disclosure further provides a method for volume adjustment based on multi-person gesture recognition, the method including: acquiring a user image including at least one user gesture collected by an image collector, and a specified gesture ID of a first user gesture matching a volume adjustment gesture in the user image; computing a recognition success rate of the volume adjustment gesture corresponding to the specified gesture ID in several frames of the user image collected within a first duration; in response to the recognition success rate of the volume adjustment gesture exceeding a first threshold, presenting a volume bar in a user interface; and in response to a volume adjustment command generated when a user corresponding to the specified gesture ID performs a specified action based on the volume adjustment gesture, adjusting a volume value corresponding to the volume bar.

DETAILED DESCRIPTION OF EMBODIMENTS

In order to make purposes and embodiments of the disclosure clearer, embodiments of the disclosure will be described clearly and completely below in combination with the accompanying drawings in embodiments of the disclosure. Obviously, the described embodiments are some but not all embodiments of the disclosure.

It should be noted that the brief description of the terms in the disclosure is only for the convenience of understanding embodiments described hereafter, and is not intended to limit embodiments of the disclosure. Unless otherwise specified, these terms should be understood according to the ordinary and plain meanings.

The terms, such as "first," "second," and "third," in the specification, the claims, and the above drawings of the disclosure are used to distinguish between similar or like objects or entities, and do not necessarily mean to limit a specific sequence or a sequential order, unless otherwise indicated. It should be understood that the terms used in this way may be interchanged where appropriate.

Figure 1:
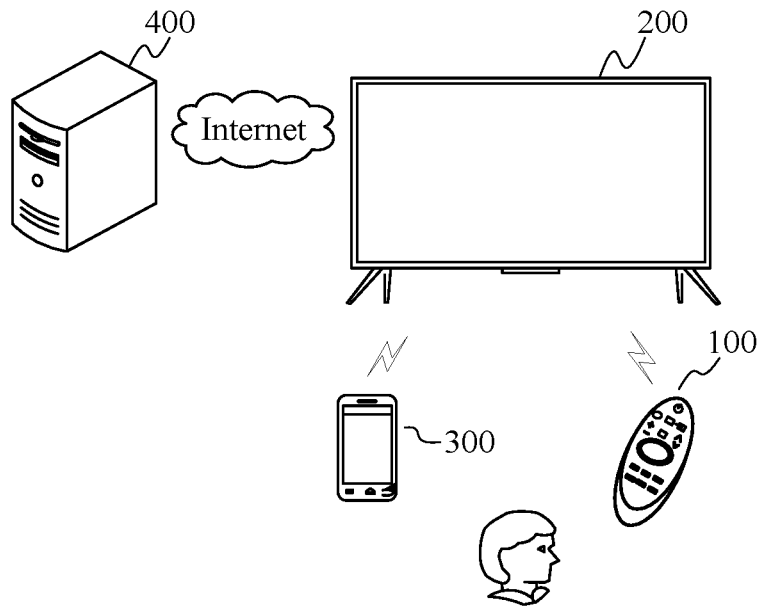
FIG. 1 shows a use scenario of a display apparatus according to some embodiments.

FIG. 1 shows a use scenario of a display apparatus according to some embodiments. As shown in FIG. 1, the display apparatus 200 further performs data communication with a server 400, and a user may operate the display apparatus 200 through a smart device 300 or a control device 100.

In some embodiments, the control device 100 may be a remote control, and communication between the remote control and the display apparatus includes at least one of infrared protocol communication or Bluetooth protocol communication, or other short-range communication methods. The display apparatus 200 is controlled wirelessly or by wired methods. The user may control the display apparatus 200 by inputting a user command through at least one of a button on the remote control, a voice input, a control panel input, etc.

In some embodiments, the display apparatus 200 may also be controlled by means other than the control device 100 and the smart device 300, for example, may directly receive a voice command from a user via a voice command acquiring module provided inside the display apparatus 200, or may receive a voice command control from a user via a voice control device provided outside the display apparatus 200.

In some embodiments, the display apparatus 200 also performs data communication with the server 400. The display apparatus 200 may be allowed to perform communicative connection through a Local Area Network (LAN), a Wireless Local Area Network (WLAN), and other networks. The server 400 may provide various contents and interactions for the display apparatus 200.

Figure 2:
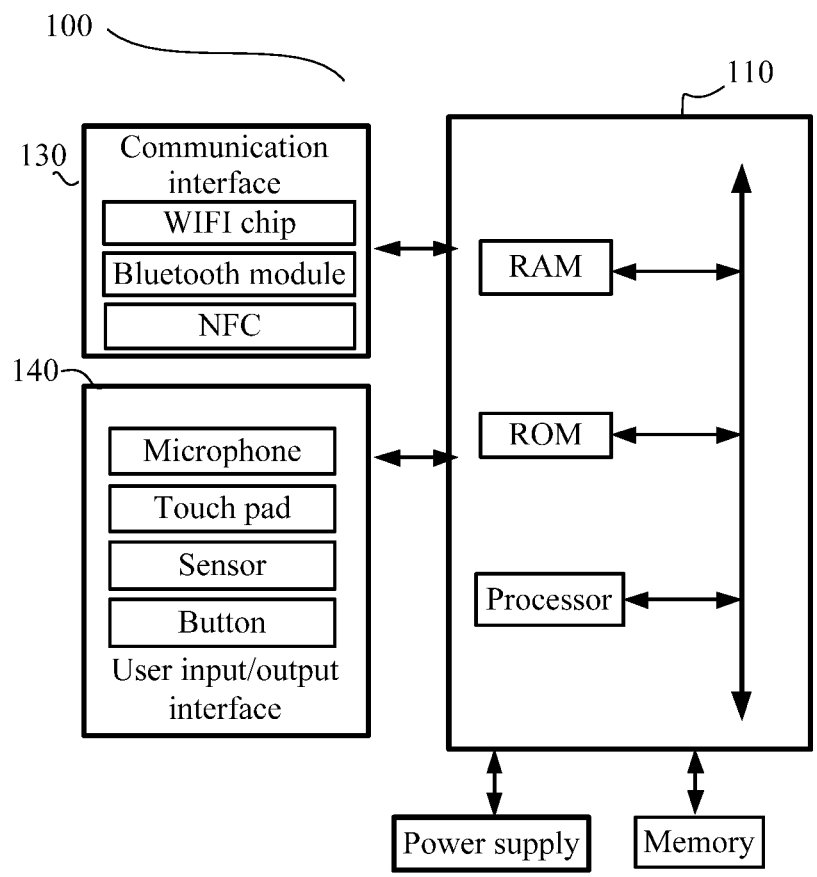
FIG. 2 shows a block diagram of a hardware configuration of a control device 100 according to some embodiments.

FIG. 2 shows a block diagram of a hardware configuration of a control device 100 according to some embodiments. As shown in FIG. 2, the control device 100 includes one or more processor 110, a communication interface 130, a user input/output interface 140, a memory, and a power supply. The control device 100 may receive an operation command input from a user and convert the operation command into an instruction that can be recognized and responded by the display apparatus 200, playing an intermediary role between the user and the display apparatus 200.

In some embodiments, the communication interface 130 is used for external communication, and includes at least one of a WIFI chip, a Bluetooth module, NFC, or an alternative module. The user input/output interface 140 includes at least one of a microphone, a touchpad, a sensor, a button, or an alternative module.

Figure 3:
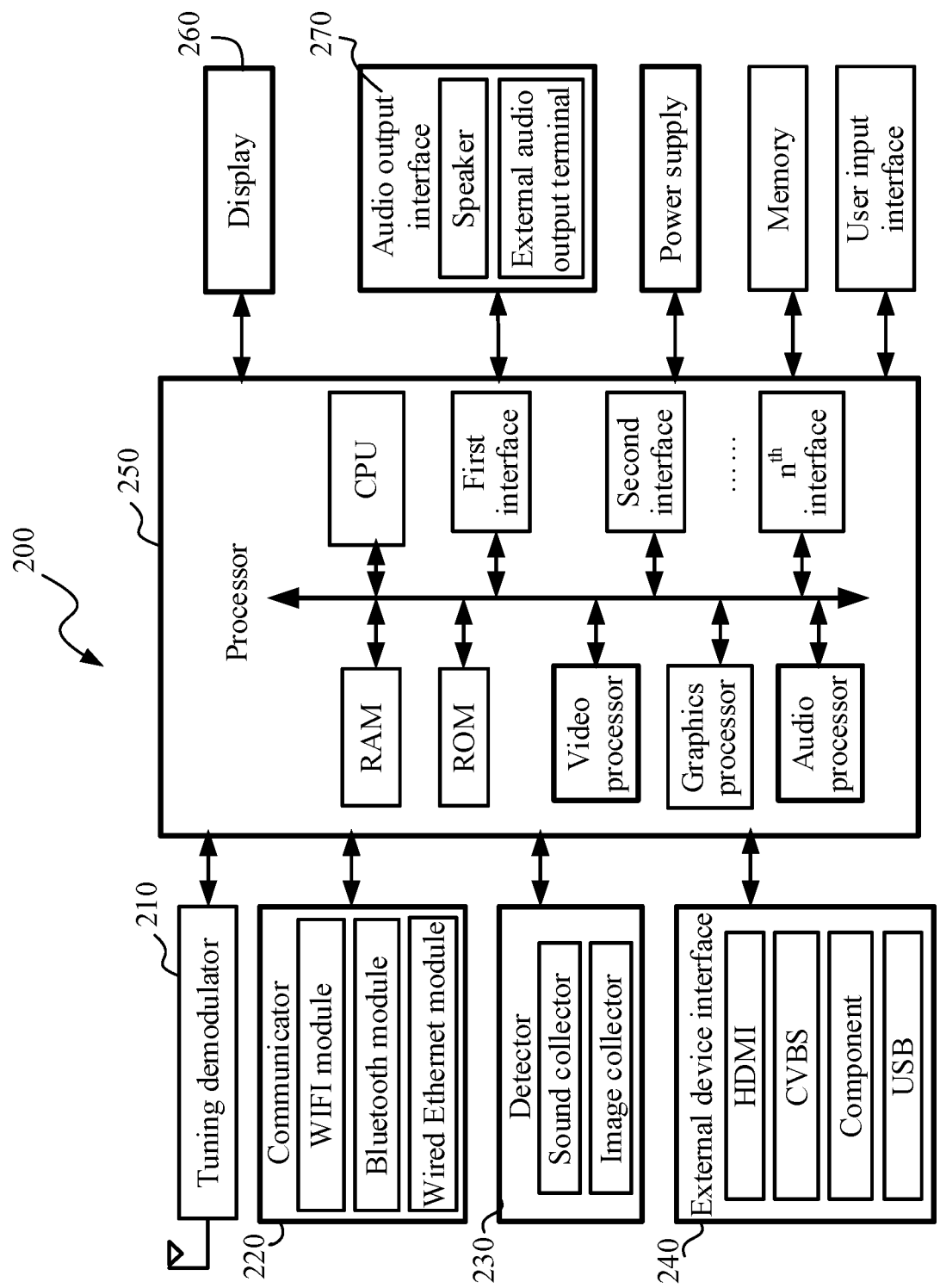
FIG. 3 shows a block diagram of a hardware configuration of a display apparatus 200 according to some embodiments.

FIG. 3 shows a block diagram of a hardware configuration of a display apparatus 200 according to some embodiments. Referring to FIG. 3, in some embodiments, the display apparatus 200 includes at least one of a tuning demodulator 210, a communicator 220, a detector 230, an external device interface 240, one or more processor 250, a display 260, an audio output interface 270, a memory, a power supply, or a user input interface.

The display 260 includes a panel component for presenting an image, a driver component for driving image display, a component for receiving an image signal output from the at least one processor, and for presenting video content, image content, a menu manipulation interface, and a UI for user operation, etc.

The display 260 may be at least one of a liquid crystal display, an OLED display, or a projection display, or may be a projection device and a projection screen.

The communicator 220 is a component for communicating with an external apparatus or server according to various types of communication protocols. For example, the communicator may include at least one of a Wifi module, a Bluetooth module, a wired Ethernet module, other network communication protocol chip or near-field communication protocol chip, or an infrared receiver. The display apparatus 200 may send and receive control signals and data signals with the control device 100 or the server 400 through the communicator 220.

The detector 230 is configured to collect a signal from external environment or external interaction. For example, the detector 230 includes an optical receiver and a sensor for collecting ambient light intensity; or, the detector 230 includes an image collector, such as a camera, which may be configured to collect an external environment scenario, a user attribute, or a user interaction gesture, or the detector 230 includes a sound collector, such as a microphone, which is configured to receive external sound.

The external device interface 240 may include, but is not limited to, any one or more of a high-definition multimedia interface (HDMI), an analog or data high-definition component input interface (Component), a composite video broadcast signal (CVBS) input interface, a USB input interface (USB), or an RGB terminal, or may be a composite input/output interface formed by multiple interfaces mentioned above.

In some embodiments, at least one processor 250 controls operations of the display apparatus and responds to the user's operations through various software control programs stored in the memory. The at least one processor 250 controls the overall operation of the display apparatus 200. For example, in response to receiving a user command for selecting a UI object presented on the display 260, the at least one processor 250 may perform an operation associated with the object selected based on the user command.

Figure 4:
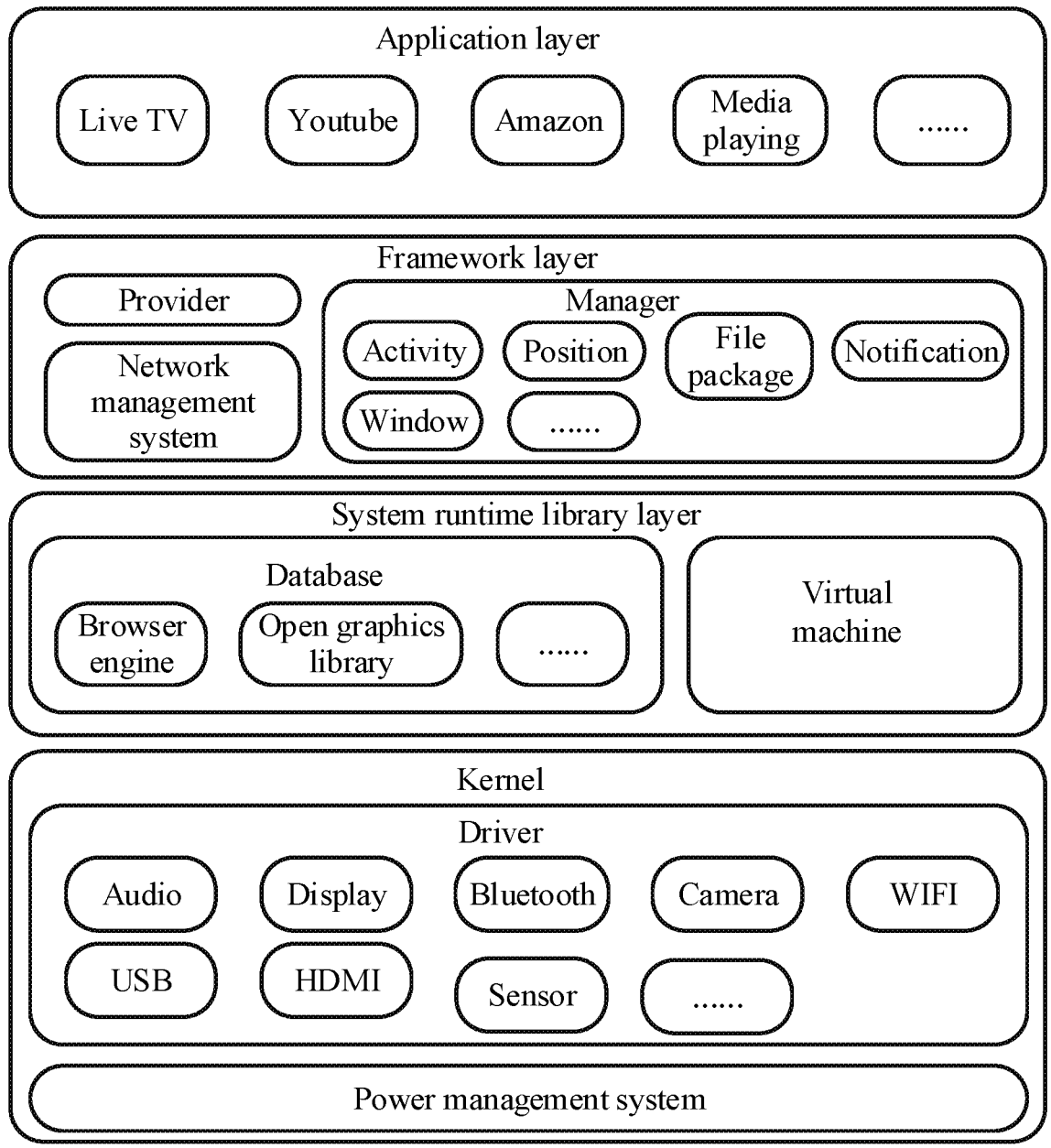
FIG. 4 shows a diagram of a software configuration in the display apparatus 200 according to some embodiments.

FIG. 4 shows a diagram of a software configuration in the display apparatus 200 according to some embodiments. Referring to FIG. 4, in some embodiments, a system is divided into four layers, namely, an Application layer (abbreviated as the "application layer"), an Application Framework layer (abbreviated as the "framework layer"), an Android runtime and system library layer (abbreviated as the "system runtime library layer"), and a kernel layer from top to bottom.

In some embodiments, at least one application is running in the application layer, where the at least one application may be a Window application, a system setup application, or a clock application etc. accompanied with an operating system; or may be an application developed by a third-party developer. In a specific implementation, an application package in the application layer is not limited to the above examples.

The framework layer provides an application programming interface (API) and a programming framework for applications. The application framework layer includes some predefined functions. During execution, the application can access system resources and obtain system services through the API.

In some embodiments, the system runtime library layer provides support for an upper layer, i.e., the framework layer. When the framework layer is used, an Android operating system may run a C/C++ library included in the system runtime library layer to implement a function to be implemented by the framework layer.

In some embodiments, the kernel layer is a layer between hardware and software. As shown in FIG. 4, the kernel layer at least includes at least one of the following drivers: audio driver, panel driver, Bluetooth driver, camera driver, WIFI driver, USB driver, HDMI driver, sensor driver (such as fingerprint sensor, temperature sensor, pressure sensor, etc.), and power driver, etc.

Figure 5:
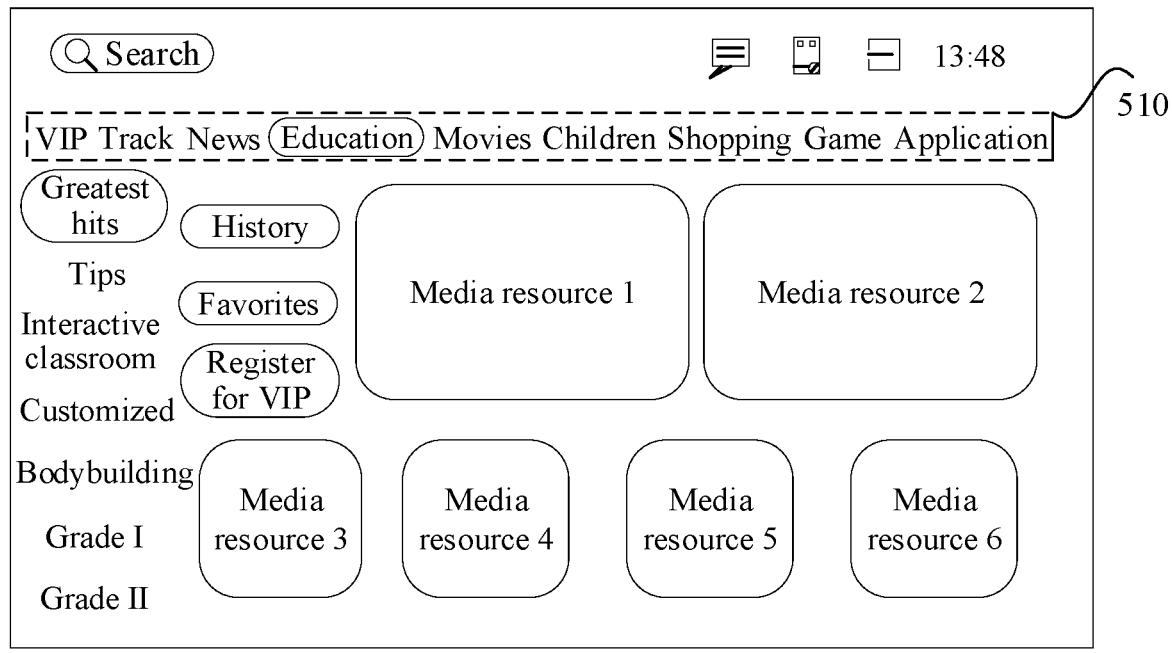
FIG. 5 shows a diagram of presenting an icon control interface of an application in the display apparatus 200 according to some embodiments.

FIG. 5 shows a diagram of presenting an icon control interface of an application in the display apparatus 200 according to some embodiments. In some embodiments, after startup, the display apparatus can directly enter a preset interface of a video-on-demand application. As shown in FIG. 5, the interface of the video-on-demand application may include a navigation bar 510 and a content presentation region below the navigation bar 510. A content presented in the content presentation region may change with a selected control in the navigation bar. Applications in the application layer may be integrated into the video-on-demand application, and then presented through a control in the navigation bar, or may be further presented after an application control in the navigation bar is selected.

In some embodiments, when a smart TV function or a video playing function is implemented using the display apparatus, the display apparatus can play a TV program, a video file, an audio file, or the like. In a process of using the display apparatus, a user can control the display apparatus to, e.g., play a video, pause a video, perform a mute operation or an unmute operation, etc. The unmute operation refers to an operation of canceling muting, that is, switching from a mute state to a volume output state.

At present, the method for controlling the display apparatus is generally implemented using a configured remote control of the display apparatus. If the remote control is lost or fails to perform a corresponding operation in a timely manner in emergency, it may not be convenient enough to control the display apparatus, thus affecting user experience.

At present, the display apparatus has greatly supported an external camera, or the display apparatus has a built-in camera, thus allowing for image collection, image recognition, and gesture detection through the cameras. Therefore, in order to improve a control efficiency of the display apparatus, embodiments of the disclosure provide a gesture recognition method for controlling muting (unmuting) and video play and pause through gesture recognition using a camera.

A smart method for implementing global muting and unmuting and controlling video play and pause in a full-screen scenario based on gesture recognition provided in embodiments of the disclosure can efficiently control the display apparatus, and can compute an effective frame rate during a gesture detection process to determine whether to cancel or continue performing corresponding operations.

It should be noted that the disclosure proposes to implement specific commands, such as global muting, unmuting and controlling video play and pause in the full-screen scenario, etc., through gestures. Of course, these commands are only illustrative descriptions, and the user may also assign another command meaning through a same gesture. In that case, in order to enable the command to be targeted, one gesture only corresponds to one command. For a specific command, the user may also choose other gestures to trigger the command. In this regard, the disclosure only defines that there is one-to-one correspondence between gestures and commands, without specially defining the determination of a specific correspondence between the commands and the gestures, and how to combine a gesture with a corresponding command.

Figure 6:
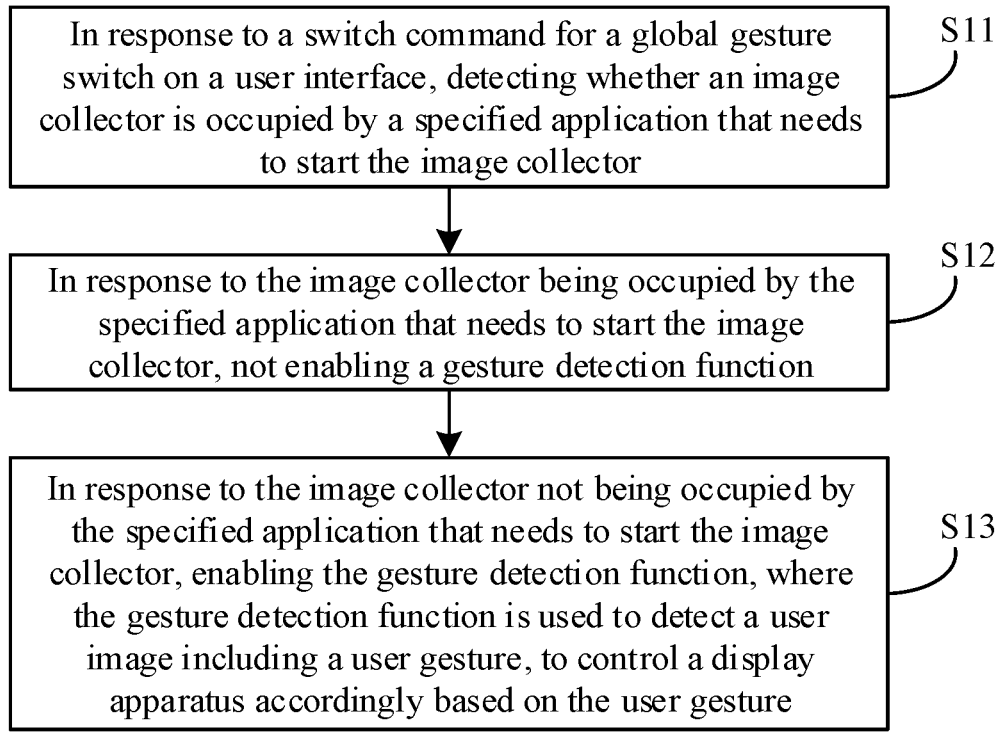
FIG. 6 shows a first flowchart of a method for controlling a display apparatus according to some embodiments.

FIG. 6 shows a first flowchart of a method for controlling a display apparatus according to some embodiments. Embodiments of the disclosure provide a display apparatus, including: a display configured to present an image and/or a user interface; an image collector or a user input interface configured to connect with the image collector, the image collector being configured to collect a user image, the user input interface being configured to implement a user command input function through an action, such as external voice, touch, gesture, pressing, etc.; and a memory configured to store computer instructions and at least one processor in connection with the display, the user input interface and the memory and configured to execute the computer instructions to cause the display apparatus to perform functions or operations. When performing the method for controlling a display apparatus shown in FIG. 6, the at least one processor is configured to perform following steps.

SIT: in response to a switch command for a global gesture switch on a user interface, detecting whether an image collector is occupied by a specified application that needs to start the image collector.

When the display apparatus is controlled based on gesture recognition, it is necessary to configure a gesture detection function entry in the display apparatus. An implementation of the gesture detection function can be configured based on a gesture switch of the display apparatus. If the gesture switch is switched on, the gesture detection function of the display apparatus can be activated to implement corresponding control of the display apparatus based on a detected user gesture; and if the gesture switch is switched off, the gesture detection function of the display apparatus can be deactivated.

Figure 7:
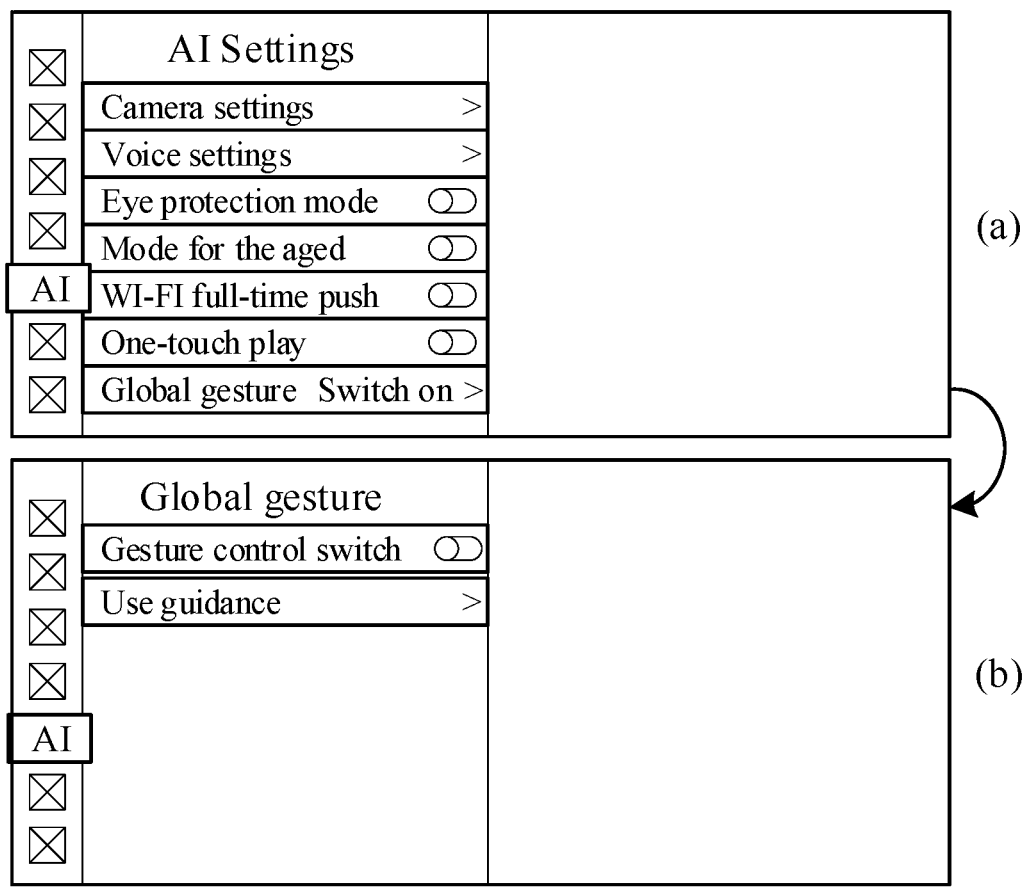
FIG. 7 shows a schematic diagram of an interface presenting a global gesture switch in a user interface according to some embodiments.

FIG. 7 shows a schematic diagram of an interface presenting a gesture switch in a user interface according to some embodiments. Referring to (a) in FIG. 7, if a gesture detection function is configured in the display apparatus, an AI setting button is presented in the user interface, and the AI setting button is triggered to present an AI setting interface in the user interface. A global gesture switch control button is presented in the AI setting interface. If the global gesture switch control button is clicked, then a global gesture setting interface as shown in (b) in FIG. 7 is presented in the user interface. The global gesture setting interface presents a gesture control switch, i.e., a global gesture switch. If the gesture control switch is clicked, then the global gesture switch of the display apparatus is switched on. To control the display apparatus based on gesture recognition, the global gesture switch can be switched on.

After the gesture switch is switched on, the display apparatus can perform a gesture detection function. However, the gesture detection function needs to be implemented by invoking an image collector (camera) to collect a user image including a user gesture in real time, and a type of the user gesture in the user image is recognized to control the display apparatus, such as playing, pausing, muting, unmuting, etc. Therefore, it is necessary to ensure that the image collector is in an unoccupied state when the gesture detection function is implemented.

An application capable of invoking the image collector is a specified application that needs to start the image collector. The specified application refers to an application that needs to implement a corresponding function using a camera during runtime, such as a photographing application. If the image collector is occupied by the specified application that needs to start the image collector, it means that the image collector is performing image collection, but not for the purpose of gesture detection. Therefore, the gesture detection function can be implemented only when the image collector is not occupied by the specified application that needs to start the image collector.

For example, if the user has entered an app with a photographing function, in this case, an image collected by the image collector is used for photographing or previewing, thus failing to enter the gesture detection function. Otherwise, during a photographing process of the user, if a simple POSE is interpreted as command performing, the photographing process is virtually interrupted, thereby conflicting with an original intention of the user.

To accurately determine whether the display apparatus can implement the gesture detection function after the global gesture switch is switched on, it is necessary to first determine whether the image collector is occupied by a specified application that needs to start the image collector. In some embodiments, when performing the detection whether the image collector is occupied by the specified application that needs to start the image collector, the at least one processor is further configured to perform following steps.

Step 111: acquiring an attribute state value of the image collector.

Step 112: in response to the attribute state value being a first value, determining that the image collector is occupied by the specified application that needs to start the image collector.

Step 113: in response to the attribute state value being a second value, determining that the image collector is not occupied by the specified application that needs to start the image collector.

Whether the image collector is occupied by the specified application that needs to start the image collector can be determined according to an attribute state value of the image collector. When the global gesture switch is in an ON state, the attribute state value of the image collector is acquired. The attribute state value may include two values, namely, the first value and the second value, according to whether the image collector is occupied. In some embodiments, the first value may be 1, and the second value may be 0.

If the attribute state value is the first value, that is, 1, it is determined that the image collector is occupied by the specified application that needs to start the image collector. If the attribute state value is the second value, that is, 0, it is determined that the image collector is not occupied by the specified application that needs to start the image collector.

S12: in response to the image collector being occupied by the specified application that needs to start the image collector, not enabling a gesture detection function.

S13: in response to the image collector not being occupied by the specified application that needs to start the image collector, enabling the gesture detection function, where the gesture detection function is used to detect a user image including a user gesture, to control the display apparatus accordingly based on the user gesture.

When the image collector is occupied by the specified application that needs to start the image collector, it means that the image collector fails to collect the user image. In this case, the gesture detection function is not enabled, i.e., a gesture detection process is not performed. When the image collector is not occupied by the specified application that needs to start the image collector, it means that the image collector can collect the user image in real time. In this case, the gesture detection function is enabled, i.e., the gesture detection process is performed.

When performing gesture detection, the display apparatus can collect the user image including the user gesture in real time through the image collector, and perform gesture recognition on the user gesture in the user image to control the display apparatus correspondingly according to a recognized specified gesture.

In some embodiments, to control the display apparatus based on gesture recognition, a control gesture corresponding to each control may be pre-configured. For example, when a mute operation and an unmute operation of the display apparatus are controlled, a control gesture may be preset as a one-handed gesture of the number 1 (mute control gesture), for example, an index finger is used to represent the number 1; and when a play operation and a pause operation of the display apparatus are controlled, a control gesture may be preset as a one-handed five-finger gesture (play and pause control gesture), such as a one-handed palm.

For example, when the display apparatus is in normal operation, global muting is implemented by the one-handed gesture of the number 1, and then the unmute operation is implemented by the one-handed gesture of the number 1 once again; and when a video is played by full-screen playing except for a physical channel, the current play is paused by the one-handed five-finger gesture, and the video continues to be played by the one-handed five-finger gesture once again.

As can be seen, the display apparatus can be controlled through gesture recognition without using a remote control, so that the user can control the display apparatus by making a corresponding gesture using his/her hand, thus improving the control efficiency of the display apparatus, and achieving good user experience.

In some embodiments, the video file may be played using the display apparatus in two playing modes, namely, full-screen playing and small-screen playing. The full-screen playing refers to global presentation of a video picture in the user interface (full-screen interface), and the small-screen playing refers to generation of a small screen in the user interface and local presentation of a video picture without presenting the video picture on the whole or full screen.

In order to facilitate accurate control of play and pause of the video file, the play or pause operation on the display apparatus may be performed based on gesture recognition only in the full-screen playing mode. Therefore, when the user gesture in the user image is recognized as a play and pause control gesture, it is necessary to determine a current playing mode of the video file in the display apparatus.

Figure 8:
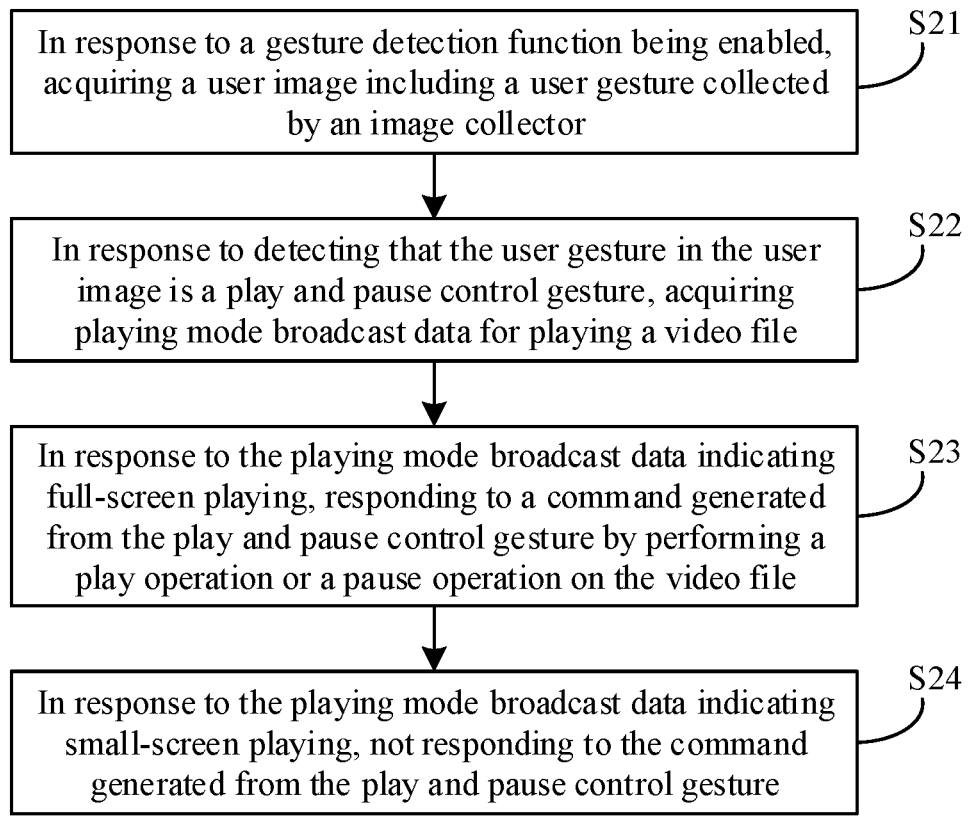
FIG. 8 shows a second flowchart of the method for controlling a display apparatus according to some embodiments.

FIG. 8 shows a second flowchart of the method for controlling a display apparatus according to some embodiments. Embodiments of the disclosure provide a display apparatus, including: a display configured to present an image and/or a user interface; an image collector or a user input interface which is able to connect with the image collector, the image collector being configured to collect a user image, the user input interface being configured to implement a user command input function through an action, such as external voice, touch, gesture, pressing, etc.; a memory configured to store computer instructions and data associated with the display; and at least one processor in connection with the display, the user input interface and the memory and configured to execute the instructions to cause the display apparatus to perform various operations. When performing the method for controlling a display apparatus shown in FIG. 8, the at least one processor is configured to perform following steps.

S21: in response to a gesture detection function being enabled, acquiring a user image including a user gesture collected by an image collector.

When the display apparatus is controlled based on gesture recognition, it is necessary to first switch on a gesture switch, and then start a gesture detection process when the image collector is not occupied. In this case, the image collector collects the user image of a user within a detection region in real time.

When the user is using the display apparatus, if it is necessary to control the display apparatus using gestures, the user can stand within a detection region of the image collector (camera), and make a gesture using his/her fingers. The image collector collects the user image of the user within the detection region, and the user image includes the user gesture. The at least one processor performs gesture recognition on the user image including the user gesture, and determines whether the user gesture is a play and pause control gesture or a mute control gesture.

The play and pause control gesture is used to perform a video play or pause operation on the display apparatus. In some embodiments, the play and pause control gesture may be set as a one-handed five-finger gesture. The mute control gesture is used to perform a mute operation and an unmute operation on the display apparatus. In some embodiments, the mute control gesture may be set as a one-handed gesture of the number 1. The play and pause control gesture or the mute control gesture may also be customized according to a use habit of the user, and is not limited in this embodiment.

The image collector collects user images of the user within the detection region in real time at a preset frequency, and sequentially sends the user images to the at least one processor. the at least one processor performs gesture recognition on each frame of the user images. In some embodiments, the preset frequency of the image collector is 30-40 ms/frame, i.e., the image collector collects a frame of the user image within a duration of 30-40 ms.

S22: in response to detecting that the user gesture in the user image is a play and pause control gesture, acquiring playing mode broadcast data for playing a video file.

In some embodiments, the device for recognizing the user gesture in the user image may be the image collector. When the image collector detects that the user gesture in the user image is the play and pause control gesture, the detection result may be sent to the at least one processor, so that the at least one processor controls the display apparatus to implement a corresponding operation based on the play and pause control gesture.

In some embodiments, the device for recognizing the user gesture in the user image may also be the at least one processor. After receiving the user image collected by the image collector in real time, the at least one processor performs gesture recognition on the user image. If it is detected that the user gesture in the user image is the play and pause control gesture, the display apparatus may be controlled to implement the corresponding operation based on the play and pause control gesture.

The video play or pause operation of the display apparatus needs to be controlled based on gestures in a scenario of full-screen playing. Therefore, when it is determined that the user gesture in the user image is a play and pause control gesture, it means that the user needs to perform a play or pause operation on the video file played in the display apparatus. In this case, it is necessary to acquire the playing mode used by the display apparatus when playing the video file, in order to determine whether a play operation or a pause operation on the video file may be performed based on a command generated from the play and pause control gesture.

The playing mode of the video file may be acquired from broadcasting package or data. The at least one processor acquires the playing mode broadcast data for playing the video file. For example, if a received playing mode broadcast data is: com.hisense.show.fivefingermenu, it means that in this case, the video file is played by full-screen playing. If a received playing mode broadcast data is: com.hisense.hide.fivefingermenu, it means that in this case, the video file is played by small-screen playing.

S23: in response to the playing mode broadcast data indicating full-screen playing, responding to a command generated from the play and pause control gesture by performing a play operation or a pause operation on the video file.

S24: in response to the playing mode broadcast data indicating small-screen playing, not responding to the command generated from the play and pause control gesture.

Because the play and pause operation scenario is only limited to full-screen playing in the disclosure, it is necessary to determine the application scenario if a one-handed five-finger gesture (play and pause control gesture) is detected in the user image collected by the image collector.

When it is determined that the playing mode broadcast data of the video file indicates full-screen playing, it means that the display apparatus can be controlled based on gestures in this scenario, i.e., the command generated from the play and pause control gesture may be responded to by performing a play operation or a pause operation on the video file. When it is determined that the playing mode broadcast data of the video file indicates small-screen playing, it means that the display apparatus cannot be controlled based on gestures in this scenario. In this case, the command generated from the play and pause control gesture is not responded to, and the play operation or the pause operation on the video file cannot be performed.

In some embodiments, whether a current playing mode is a full-screen playing interface can be determined by acquiring the playing mode broadcast data and channel monitoring, whether a current channel is a physical channel or an Android channel can be determined by channel monitoring, and whether the current playing mode is full-screen playing or small-screen playing can be determined from the playing mode broadcast data.

The physical channel refers to a channel in connection with a signal source when the display apparatus implements picture output, such as a signal source via an HDMI port, a set-top box, etc. The Android channel refers to a channel via an Android system to implement picture output.

If the display apparatus plays the video file using the Android channel by full-screen playing, the display apparatus is determined to be in the full-screen playing interface. Only in this case, the one-handed five-finger gesture is effective, i.e., the command generated from the play and pause control gesture may be responded to by performing a play operation or a pause operation on the video file.

If a small-screen playing broadcast data is received or the channel is monitored to be switched to the physical channel, the one-handed five-finger gesture is not effective, i.e., the command generated from the play and pause control gesture is not responded to, no play operation or pause operation on the video file will be performed, and only a global mute or unmute operation can be performed.

In some embodiments, before performing the acquiring the playing mode broadcast data for playing the video file, the at least one processor is further configured to perform following steps.

Step 221: acquiring a signal source ID for identifying a channel type.

Step 222: in response to the signal source ID indicating a first channel type, acquiring the playing mode broadcast data for playing the video file, and determining whether to respond to the command generated from the play and pause control gesture based on the playing mode indicated by the playing mode broadcast data.

Step 223: in response to the signal source ID indicating a second channel type, not responding to the command generated from the play and pause control gesture.

When the user gesture in the user image is detected to be the play and pause control gesture, it means that video play or pause control needs to be performed on the display apparatus in a current scenario. In this case, it is necessary to determine whether the display apparatus plays the video file in a full-screen interface.

In some embodiments, whether the display apparatus is in the scenario of full-screen playing is determined by acquiring the playing mode broadcast data and channel monitoring, i.e., first determining a channel type of the display apparatus, and then determining the playing mode broadcast data of the video file.

When the channel type of the display apparatus is determined, the signal source ID for identifying a channel type in the system may be directly acquired. The channel type includes the physical channel and the Android channel. A signal source ID of the Android channel is 2562, and a signal source ID of the physical channel is 64 or other values except 2562.

If the acquired signal source ID indicates the first channel type, for example, 2562, it means that a current channel type of the display apparatus is the Android channel. In this case, whether the video file is played by full-screen play or small-screen play can be further determined. The playing mode broadcast data for playing the video file is acquired, and whether to respond to the command generated from the play and pause control gesture is determined based on the playing mode indicated by the playing mode broadcast data.

If the channel type is the Android channel and the video file is played by full-screen playing, the command generated from the play and pause control gesture may be responded to by performing the play operation or the pause operation on the video file. If the channel type is the Android channel and the video file is played by small-screen playing, the command generated from the play and pause control gesture may not be responded to, and the play operation or the pause operation on the video file cannot be performed.

If the acquired signal source ID indicates the second channel type, for example, 64 or other values except 2562, it means that the current channel type of the display apparatus is the physical channel. In this case, the command generated from the play and pause control gesture may directly not be responded to, without determining whether the video file is played by full-screen play or small-screen play, and the play operation or the pause operation on the video file cannot be performed.

As can be seen, when the display apparatus according to embodiments of the disclosure controls the display apparatus using gestures, if the user gesture is recognized as the play and pause control gesture based on the user image collected by the image collector, the signal type is monitored and the playing mode broadcast data for playing the video is acquired, to determine whether the playing mode of the video file is full-screen play or small-screen play. When the channel type is the Android channel and the playing mode is full-screen playing, the command generated from the play and pause control gesture may be responded to by performing the play operation or the pause operation on the video file; and when the playing mode is small-screen play or the channel type is the physical channel, the command generated from the play and pause control gesture is not responded to. Therefore, in a scenario where play or pause of the display apparatus is controlled, whether the command of the play and pause control gesture can be responded to is determined based on the channel type and the playing mode, in order to efficiently control the display apparatus, and improve the user experience.

When the display apparatus is controlled based on gesture recognition, if a user gesture recognized by gesture recognition on the collected user image is the play and pause control gesture, the display apparatus is controlled to perform the play operation or the pause operation; and if a user gesture recognized is a mute control gesture, the display apparatus is controlled to perform a mute operation or an unmute operation. The above gesture recognition method can efficiently control the display apparatus. Even without a remote control, the user can still conveniently control the display apparatus, thus improving the user experience.

Figure 9:
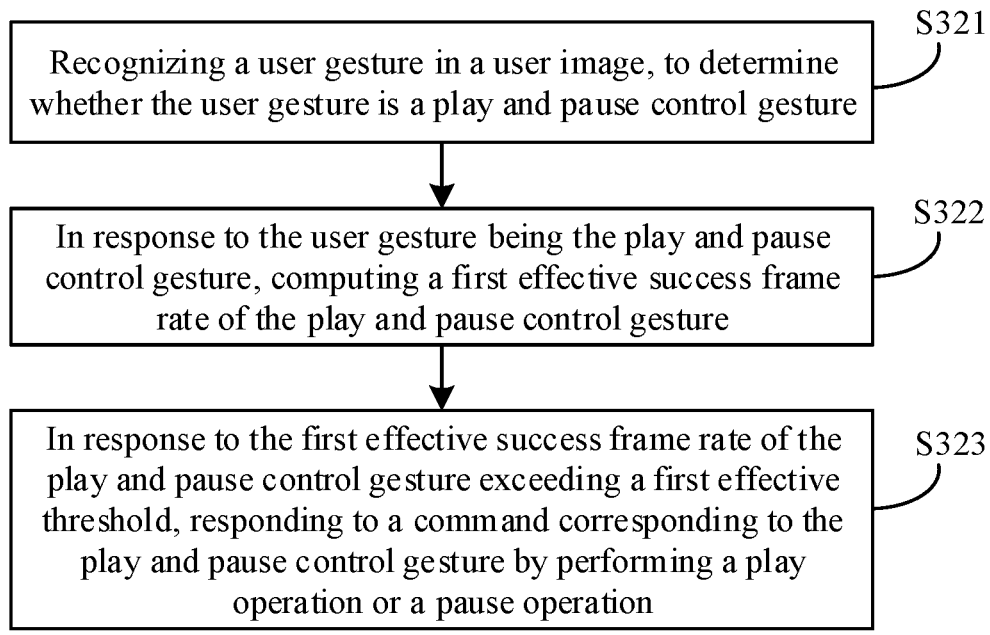
FIG. 9 shows a flowchart of a method for controlling a display apparatus to perform a play operation or a pause operation according to some embodiments.
Figure 10:
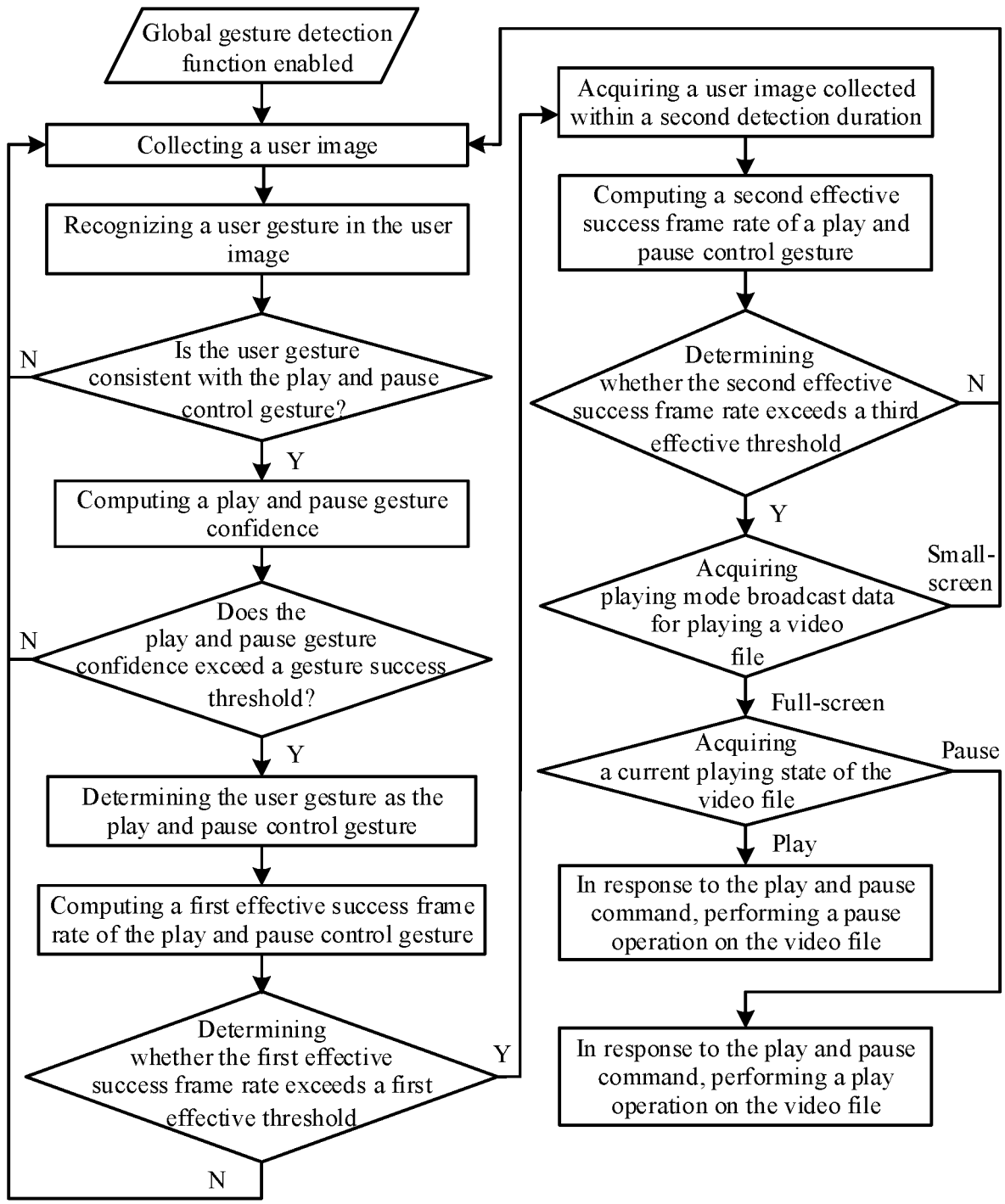
FIG. 10 shows a data flow diagram of controlling a display apparatus to perform a play operation or a pause operation according to some embodiments.

FIG. 9 shows a flowchart of a method for controlling a display apparatus to perform a play operation or a pause operation according to some embodiments; and FIG. 10 shows a data flow diagram of controlling a display apparatus to perform a play operation or a pause operation according to some embodiments. Referring to FIG. 9 and FIG. 10, in some embodiments, when performing a step S32: in response to a user gesture being a play and pause control gesture, responding to a command corresponding to the play and pause control gesture by performing a play operation or a pause operation, the at least one processor is further configured to perform following steps.

S321: recognizing a user gesture in a user image, to determine whether the user gesture is a play and pause control gesture.

S322: in response to the user gesture being the play and pause control gesture, computing a first effective success frame rate of the play and pause control gesture.

S323: in response to the first effective success frame rate of the play and pause control gesture exceeding a first effective threshold, responding to a command corresponding to the play and pause control gesture by performing a play operation or a pause operation.

When a user is located within a detection region of an image collector, for example, the user is standing in front of the display apparatus, the image collector collects a user image including a user gesture for AI detection. However, if the user gesture made by the user is not a gesture intended to control the display apparatus, but other accidental gesture, in this case, it is not necessary to start a gesture detection process for controlling the display apparatus.

In some embodiments, when performing the step S321: determining whether the user gesture is the play and pause control gesture, the at least one processor is further configured to perform following steps.

Step 3211: matching the user gesture with a preset control gesture, the preset control gesture including the play and pause control gesture and a mute control gesture.

Step 3212: in response to the user gesture matching the play and pause control gesture, computing a play and pause gesture confidence of the user gesture with respect to the play and pause control gesture.

Step 3213: in response to the play and pause gesture confidence exceeding a gesture success threshold, determining that the user gesture is the play and pause control gesture.

The image collector may perform gesture recognition on the user image, or the at least one processor may perform it. Therefore, when the image collector or the at least one processor recognizes a user gesture in each frame of user images, the user gesture in each frame of the user images matches with the preset control gesture respectively, the present control gesture includes the play and pause control gesture and the mute control gesture, to determine whether a user gesture in a current frame of the user image is to control the display apparatus to perform a play (pause) operation or a mute (unmute) operation.

If the user gesture is recognized to match the play and pause control gesture, it means that the user would like to control the display apparatus to perform the play or pause operation. However, if an effect of the user gesture is not in place, for example, when the play and pause control gesture is a one-handed five-finger gesture, if at least one finger of the user is gestured in a bending state, the gesture made by the user does not resemble the one-handed five-finger gesture. In this case, this ambiguous user gesture may cause failure to accurately determine whether to recognize the user gesture as the play and pause control gesture, result in misrecognition, and may cause failure to promptly control the display apparatus.

Therefore, in order to ensure timely and effective control of the display apparatus, it is necessary to determine whether the user image including the recognized user gesture is a gesture success frame of the play and pause control gesture, that is, only when a similarity of the user gesture to the play and pause control gesture exceeds a threshold, is the user gesture determined as the play and pause control gesture.

The play and pause gesture confidence, i.e., the similarity, between the user gesture in each frame of the user images and the play and pause control gesture is computed. Whether each play and pause gesture confidence exceeds the gesture success threshold is determined. In some embodiments, the gesture success threshold may be set as 99%. If a play and pause gesture confidence does not exceed 99%, it is determined that the user gesture is not the play and pause control gesture; and if a play and pause gesture confidence exceeds 99%, it is determined that the user gesture corresponding to the play and pause gesture confidence is the play and pause control gesture to avoid misrecognition.

It is determined that a user image to which a user gesture with a play and pause gesture confidence exceeding the gesture success threshold belongs is the gesture success frame. During a gesture detection process, the number of gesture success frames and the total number of gesture recognition frames for all collected user images are calculated.

During the gesture detection process, when a user gesture in a frame of the user image is recognized as the play and pause control gesture, the gesture recognition may not be considered successful, i.e., performing a corresponding command by controlling the display apparatus to perform a corresponding operation. Instead, it is necessary to continuously detect several frames of the user images, and only after a proportion of gesture success frames corresponding to the play and pause control gesture exceeds a certain threshold, can gesture recognition success be determined. Then, the corresponding command is performed by controlling the display apparatus to perform the corresponding operation.

Whether the gesture recognition is successful is determined by computation according to several continuously collected frames of the user images, to ensure efficient control of the display apparatus, and avoid a problem that the user makes a play and pause control gesture, and then immediately cancels the play and pause control gesture, while the display apparatus recognizes the gesture, and responds to the corresponding command by performing the corresponding operation. In fact, in the scenario where the user immediately cancels the gesture, it is not necessary to control the display apparatus, thus affecting the user experience.

Therefore, when the user gesture is recognized as the play and pause control gesture, the first effective success frame rate of the play and pause control gesture is computed to determine whether the gesture recognition in the current scenario can be considered successful, so as to accurately control the display apparatus.

In some embodiments, when performing the step S322: in response to the user gesture being the play and pause control gesture, computing a first effective success frame rate of the play and pause control gesture, the at least one processor is further configured to perform following steps.

Step 3221: in response to the user gesture being a play and pause control gesture, acquiring a total number of gesture recognition frames of the user images collected, and the number of gesture success frames of the corresponding user images when the user gesture is the play and pause control gesture within a first detection duration.

Step 3222: computing a ratio of the number of gesture success frames to the total number of gesture recognition frames, and determining the ratio as the first effective success frame rate of the play and pause control gesture.

When the play and pause gesture confidence corresponding to the user gesture exceeds 99%, the corresponding user gesture can be determined as the play and pause control gesture, the user image where the user gesture is located is a gesture success frame, and the first effective success frame rate of the play and pause control gesture is computed for all user images collected by the image collector within a first detection duration from a moment of detecting the gesture success frame.

Therefore, the total number of gesture recognition frames of the user images collected within the first detection duration and the number of gesture success frames of the corresponding user images when the user gesture is the play and pause control gesture are acquired. In some embodiments, a duration corresponding to the process of determining whether the gesture recognition is successful during the gesture detection process is the first detection duration, where the first detection duration starts from a moment of detecting the gesture success frame, and may be set as 500 ms. The first detection duration may also be set as other durations according to actual applications, and is not limited here.

The first detection duration is a maximum duration for the image collector to continuously collect user images including user gestures during the gesture detection process. The image collector sequentially sends multiple frames of the user images collected within the first detection duration to the at least one processor, so that the at least one processor can calculate the total number of gesture recognition frames among the multiple frames of the user images received within the first detection duration.

The computing the ratio of the number of gesture success frames to the total number of gesture recognition frames means to compute a ratio of the number of success frames where the at least one processor detects the play and pause control gesture to the total number of gesture recognition frames within the first detection duration. The ratio is determined as the first effective success frame rate of the play and pause control gesture.

For example, when the AI detection method detects that a user gesture in a frame of the user image is the play and pause control gesture, a counter of 500 ms (first detection duration) is started, and each frame of the user image within 500 ms is detected. If the play and pause control gesture is detected, the number of gesture success frames (Detected Frames) corresponding to the play and pause control gesture and the total number of gesture recognition frames (Total Frames) are increased by one respectively. If the detected gesture is not the play and pause control gesture, only the total number of gesture recognition frames (Total Frames) is increased by one. When 500 ms is expired, the ratio of the number of gesture success frames to the total number of frames (Success Rate=Detected Frames/Total Frames) is computed, and is determined as the first effective success frame rate of the play and pause control gesture.

In some embodiments, in order to avoid the at least one processor being unable to determine whether the corresponding operation needs to be performed after the user makes the play and pause control gesture, only retains the gesture for a short time, and then cancels the gesture, and to facilitate accurate control of the display apparatus, a first effective threshold may be set, and among the multiple frames of the user images collected by the image collector within the first detection duration, only when the first effective success frame rate of the play and pause control gesture exceeds the first effective threshold, can the gesture recognition be considered successful.

If the first effective success frame rate of the play and pause control gesture does not exceed the first effective threshold, it means that the user only transiently makes the play and pause control gesture and then cancels the play and pause control gesture. In this case, it means that the gesture recognition is unsuccessful, and subsequent control operations cannot be performed. If the first effective success frame rate of the play and pause control gesture exceeds the first effective threshold, it means that the gesture recognition is successful. In this case, in response to the command corresponding to the play and pause control gesture, the play operation or the pause operation is performed, and counts of the Detected Frames and the Total Frames are reset for next detection.

In some embodiments, the first effective threshold may be set as 95%. If the recognition success rate exceeds the first effective threshold of 95%, it means that during a current gesture detection process (within the first detection duration), the gesture recognition is successful. In this case, in response to the command corresponding to the play and pause control gesture, the play operation or the pause operation may be performed. The first effective threshold may also be set as other values according to actual needs, and is not limited here.

In some embodiments, when the gesture recognition of the play and pause control gesture in the user image is successful, in order to promptly prompt the user that current gesture recognition is successful, the play and pause control gesture shall be maintained to prevent the play or pause operation from being canceled halfway, and a gesture detection prompt interface may be presented in the user interface.

Figure 11:
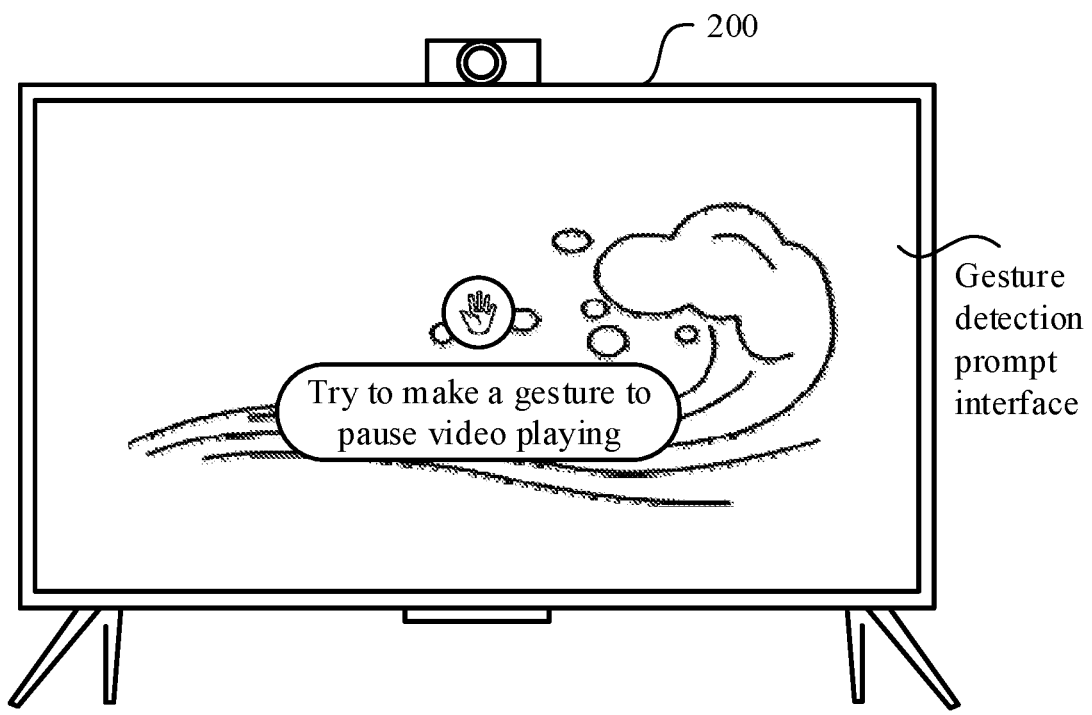
FIG. 11 shows a schematic diagram of a gesture detection prompt interface in a play and pause scenario according to some embodiments.

FIG. 11 shows a schematic diagram of a gesture detection prompt interface in a play and pause scenario according to some embodiments. In this case, referring to FIG. 11, the at least one processor is further configured to: in response to determining that the user gesture is the play and pause control gesture, present a gesture detection prompt interface in the user interface, the gesture detection prompt interface presenting a gesture recognition success prompt message and a gesture pattern.

When the first effective success frame rate of the play and pause control gesture in the user image collected within the first detection duration exceeds the first effective threshold, it means that gesture recognition is successful. In this case, the gesture detection prompt interface is presented in the user interface. The gesture detection prompt interface presents the gesture recognition success prompt message and the gesture pattern, where the gesture recognition success prompt message is used to prompt the user that it is currently in a gesture detection process, and a content of the prompt message may be "try to make a gesture to pause video playing." The gesture recognition success prompt message may be optionally configured, or may not be presented. The gesture pattern is used to identify a UI form of the play and pause control gesture. Generally, the UI form of this pattern is same as a posture made by the user using his/her fingers. For example, if the play and pause control gesture is the one-handed five-finger gesture, the play and pause control gesture pattern is a "palm" pattern.

In some embodiments, after the gesture recognition is successful, in response to the command corresponding to the play and pause control gesture, the play operation or the pause operation may be performed. However, in order to further ensure that after the gesture recognition is successful, whether the user maintains the play and pause control gesture all along without canceling the gesture halfway, a second effective success frame rate of the play and pause control gesture within 500 ms may be computed again after the gesture recognition is successful.

When performing the step S323: responding to a command corresponding to the play and pause control gesture by performing a play operation or a pause operation, the at least one processor is further configured to perform following steps.

Step 3241: in response to the first effective success frame rate of the play and pause control gesture exceeding the first effective threshold, acquiring a user image collected within a second detection duration.

Step 3242: computing a second effective success frame rate of the play and pause control gesture in the user image collected within the second detection duration.

Step 3243: in response to the second effective success frame rate of the play and pause control gesture exceeding a third effective threshold, responding to the command corresponding to the play and pause control gesture by performing the play operation or the pause operation.

Step 3244: in response to the second effective success frame rate of the play and pause control gesture not exceeding the third effective threshold, canceling responding to the command corresponding to the play and pause control gesture by performing the play operation or the pause operation.

When the gesture recognition is successful, i.e., when it is detected that the first effective success frame rate of the play and pause control gesture exceeds the first effective threshold, the second effective success frame rate of the play and pause control gesture within the second detection duration is computed. In this case, the user image collected by the image collector within the second detection duration is acquired. The computing method of the second effective success frame rate is similar to the computing method of the first effective success frame rate, and will not be repeated here.

A starting moment of the second detection duration is a moment of detecting that the gesture recognition is successful, and the second detection duration may be set as 500 ms. The second detection duration may also be set as other durations according to actual applications, and is not limited here.

In a process of computing the effective success frame rate for the second time, in order to facilitate accurate control of the display apparatus, the third effective threshold may be set, so that among multiple frames of the user images collected by the image collector within the second detection duration, only when the second effective success frame rate of the play and pause control gesture exceeds the third effective threshold, can the command corresponding to the play and pause control gesture be responded to by performing the play operation or the pause operation.

In some embodiments, the third effective threshold may be set as 70%. If the recognition success rate exceeds the third effective threshold of 70%, it means that during the current gesture detection process (within the second detection duration), the gesture recognition is successful. In this case, the command corresponding to the play and pause control gesture may be responded to by performing the play operation or the pause operation. The third effective threshold may also be set as other values according to actual applications, and is not limited here.

Therefore, when it is determined that the second effective success frame rate of the play and pause control gesture exceeds the third effective threshold, the command corresponding to the play and pause control gesture is responded to by performing the play operation or the pause operation. When it is determined that the second effective success frame rate of the play and pause control gesture does not exceed the third effective threshold, it means that the user cancels the gesture halfway, and it is determined that the user cancels the corresponding operation. In this case, the at least one processor cancels responding to the command corresponding to the play and pause control gesture by performing the play operation or the pause operation.

In a process of computing the effective success frame rate for the second time, in order to prompt that the user is currently performing the gesture recognition, a buffered animation may be presented in the gesture detection prompt interface. That is, after the gesture recognition is successful, a 500 ms buffered animation is performed immediately after the gesture detection prompt interface is presented in the user interface. A presentation duration of the buffered animation is a duration during which whether the gesture recognition is successful is determined for the second time, i.e., the second detection duration.

Figure 12:
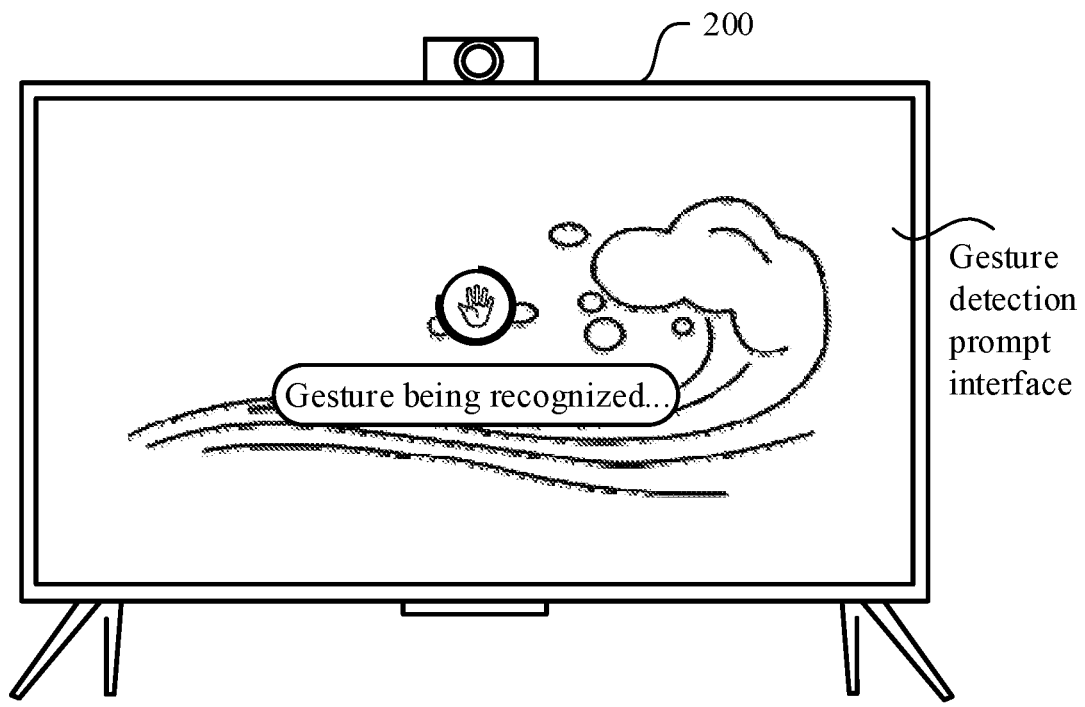
FIG. 12 shows another schematic diagram of a gesture detection prompt interface in a play and pause scenario according to some embodiments.

FIG. 12 shows another schematic diagram of a gesture detection prompt interface in a play and pause scenario according to some embodiments. In this case, referring to FIG. 12, the at least one processor is configured to perform: during acquiring the user image collected within the second detection duration, present the gesture pattern in a form of buffered animation, the buffered animation being presented for a duration of the second detection duration.

The gesture recognition success prompt message in the gesture detection prompt interface in this scenario is used to inform the user that a specified gesture currently capable of controlling the play pause operation is successfully recognized, where a content of the prompt message may be "gesture being recognized . . . " After seeing the prompt message, the user can know that the display apparatus can be controlled to perform the play operation or the pause operation based on the play and pause control gesture. For example, the gesture pattern is presented in the form of buffered animation, and may be presented by clockwise rotation from a vertex of the gesture pattern for one circle. The buffered animation is rotated for one circle within a duration of the second detection duration.

It should be noted that the gesture detection prompt interface shown in FIG. 11 and the gesture detection prompt interface shown in FIG. 12 are continuously presented. When the gesture recognition is successful, the gesture detection prompt interface shown in FIG. 11 is presented in the user interface, and after the gesture recognition is successful, the gesture detection prompt interface shown in FIG. 12 is immediately presented in the user interface, that is, after the gesture pattern appears in the user interface, a rotation effect of the buffered animation is immediately performed. The process of presenting the gesture detection prompt interface shown in FIG. 12 is a process of performing second gesture recognition.

In some embodiments, when it is determined that the second effective success frame rate of the play and pause control gesture does not exceed the third effective threshold, it means that the user cancels the gesture halfway, and it is determined that the user cancels the corresponding operation. In this case, the buffered animation of the gesture pattern is not performed, presentation of the gesture detection prompt interface is canceled, and the corresponding operation is not subsequently performed, that is, canceling responding to the command corresponding to the play and pause control gesture by performing the play operation or the pause operation.

In some embodiments, after the second gesture recognition is successful, the display apparatus may respond to the command corresponding to the play and pause control gesture by performing the play operation or the pause operation. Because the play and pause gesture scenario is only limited to full-screen playing, it is necessary to determine whether the command corresponding to the play and pause control gesture can be responded to according to a playing mode of a current video.

When performing the responding to the command corresponding to the play and pause control gesture by performing the play operation or the pause operation, the at least one processor is further configured to perform following steps.

Step 3251: in response to a play and pause command generated when the second effective success frame rate of the play and pause control gesture exceeds the third effective threshold, acquiring playing mode broadcast data for playing a video file.

Step 3252: in response to the playing mode broadcast data indicating full-screen playing, responding to the play and pause command by performing the play operation or the pause operation on the video file.

Step 3253: in response to the playing mode broadcast data indicating small-screen playing, not responding to the play and pause command.

If the second gesture recognition is successful, i.e., when the second effective success frame rate of the play and pause control gesture exceeds the third effective threshold, it means that the play operation or the pause operation on the display apparatus may be performed. In this case, the play and pause command is generated. The play and pause command is sent in a form of a virtual button of a remote control.

In response to the play and pause command, the at least one processor acquires the playing mode broadcast data for playing the video file. When it is determined that the playing mode broadcast data of the video file indicates full-screen playing, it means that the display apparatus can be controlled based on gestures in this scenario, i.e., the command generated from the play and pause control gesture may be responded to by performing the play operation or the pause operation on the video file. When it is determined that the playing mode broadcast data of the video file indicates small-screen playing, it means that the display apparatus cannot be controlled based on gestures in this scenario. In this case, the command generated from the play and pause control gesture is not responded to, and the play operation or the pause operation on the video file cannot be performed.

In some embodiments, whether a current playing mode is a full-screen playing interface can be determined by acquiring the playing mode broadcast data and channel monitoring, whether a current channel is a physical channel or an Android channel can be determined by channel monitoring, and whether the current playing mode is full-screen play or small-screen play can be determined by the playing mode broadcast data.

If the channel type is the Android channel and the video file is played by full-screen playing, the command generated from the play and pause control gesture may be responded to by performing the play operation or the pause operation on the video file. If the channel type is the Android channel and the video file is played by small-screen playing, the command generated from the play and pause control gesture may not be responded to, and the play operation or the pause operation on the video file cannot be performed. If the channel type of the display apparatus is the physical channel, in this case, the command generated from the play and pause control gesture may directly not be responded to, without determining whether the video file is played by full-screen play or small-screen playing, and the play operation or the pause operation on the video file cannot be performed. Steps S21 to S23 provided in the above embodiments and related contents thereof may be referred to for a specific implementation process, which will not be repeated here.

In order to determine whether to perform the play operation or the pause operation, it is necessary to first determine a current state of the display apparatus. If the display apparatus is currently in a playing state, the command corresponding to the play and pause control gesture is responded to by performing a pause operation; and if the display apparatus is currently in a pause state, the command corresponding to the play and pause control gesture is responded to by performing a play operation.

In some embodiments, when performing step 3252: in response to the playing mode broadcast data indicating full-screen playing, responding to the play and pause command by performing the play operation or the pause operation on the video file, the at least one processor is further configured to perform following steps.

Step 3261: in response to the playing mode broadcast data indicating full-screen playing, acquiring a current playing state of the video file.

Step 3262: in response to the current playing state being a video playing state, responding to the play and pause command by performing a pause operation on the video file.

Step 3263: in response to the current playing state being a video pause state, responding to the play and pause command by performing a play operation on the video file.

When it is determined that the display apparatus currently plays the video file by full-screen playing, the current playing state of the video file played by the display apparatus is acquired. If the current playing state is a video playing state, it means that the pause operation may be performed according to a current gesture made by the user, and the play and pause command may be responded to by performing a pause operation on the video file. If the current playing state is a video pause state, it means that the play operation may be performed according to a current gesture made by the user, and the play and pause command may be responded to by performing a play operation on the video file.

The current playing state of the display apparatus may be determined by simulating sending of a center key value from the remote control. During full-screen video playing, the user makes a play and pause control gesture, such as a five-finger gesture, and after a successful detection, in this case, the sending of the center key value of the remote control is simulated. When receiving the center key value, the system may determine whether the video is currently in the playing state based on whether an interface videoview.isplaying is true.

If the videoview.isplaying is true, it means that in this case, the video is currently in the playing state. In this case, the system may respond to the play and pause command, invoke an interface videoview.pause, and then perform a pause operation; and if the videoview.isplaying is false, it means that the current video is in the video pause state. In this case, the system may respond to the play and pause command, and invoke videoview.start to perform a play operation.

In some embodiments, after completing a process of controlling the display apparatus to perform the play operation or the pause operation based on the above methods, an operation completion prompt interface may be presented in the user interface to prompt the user that the control has been completed.

Figure 13:
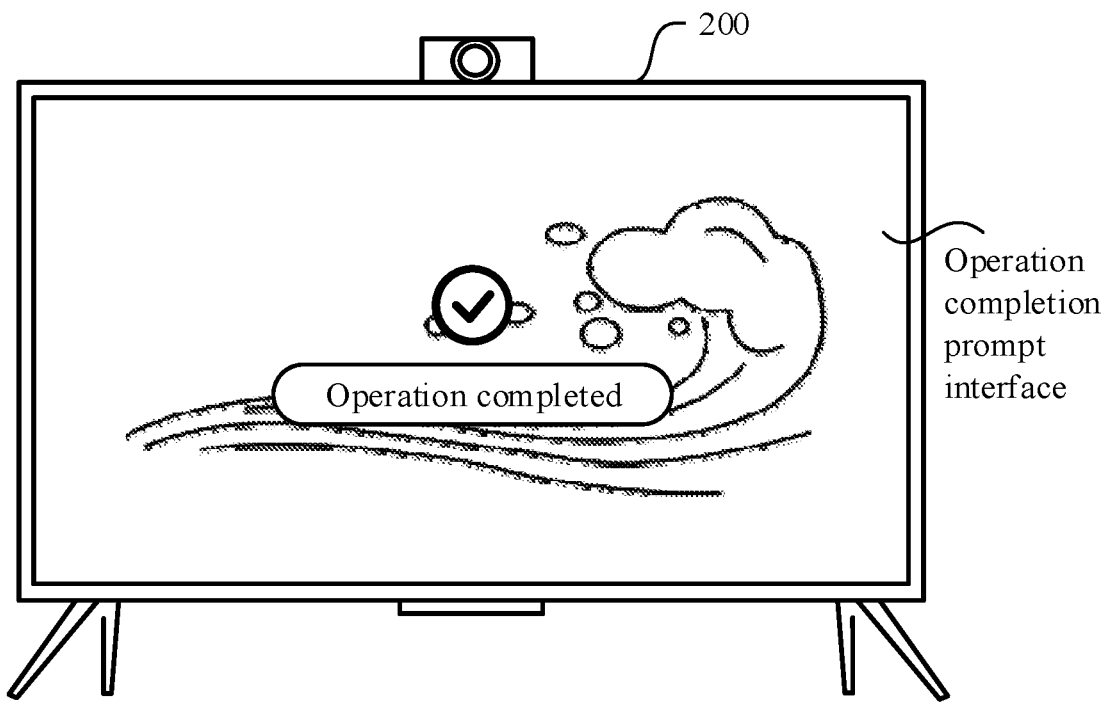
FIG. 13 shows a schematic diagram of presenting an operation completion prompt interface in a user interface according to some embodiments.

FIG. 13 shows a schematic diagram of presenting an operation completion prompt interface in a user interface according to some embodiments. Referring to FIG. 13, after control of the display apparatus is completed once, the operation completion prompt interface is presented in the user interface. The operation completion prompt interface presents an operation completion pattern and an operation completion prompt message, where the operation completion pattern may be in a form of a "tick" UI, and a content of the operation completion prompt message may be "operation succeeded," etc.

As can be seen, when the display apparatus according to embodiments of the disclosure is controlled based on gesture recognition, if a user gesture recognized by gesture recognition on the collected user image is the play and pause control gesture, the display apparatus is controlled to perform a play operation or a pause operation. Further, during a control operation, only when the play and pause gesture confidence exceeds the gesture success threshold, the first effective success frame rate of the play and pause control gesture within the first detection duration exceeds the first effective threshold, the second effective success frame rate of the play and pause control gesture within the second detection duration exceeds the third effective threshold, and in a scenario of full-screen playing, can the command corresponding to the play and pause control gesture be responded to by performing a play operation or a pause operation, so that the control operation is more accurate. The above gesture recognition method can efficiently control the display apparatus. Even without a remote control, the user can still conveniently control the display apparatus, thus improving the user experience.

Figure 14:
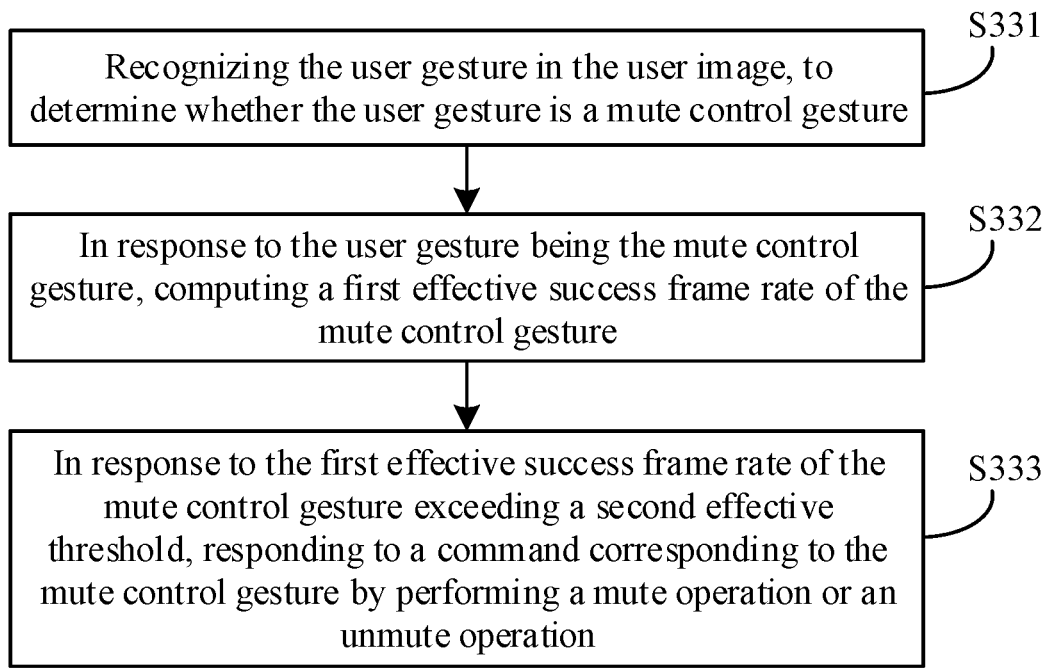
FIG. 14 shows a flowchart of a method for controlling a display apparatus to perform a mute operation or an unmute operation according to some embodiments.
Figure 15:
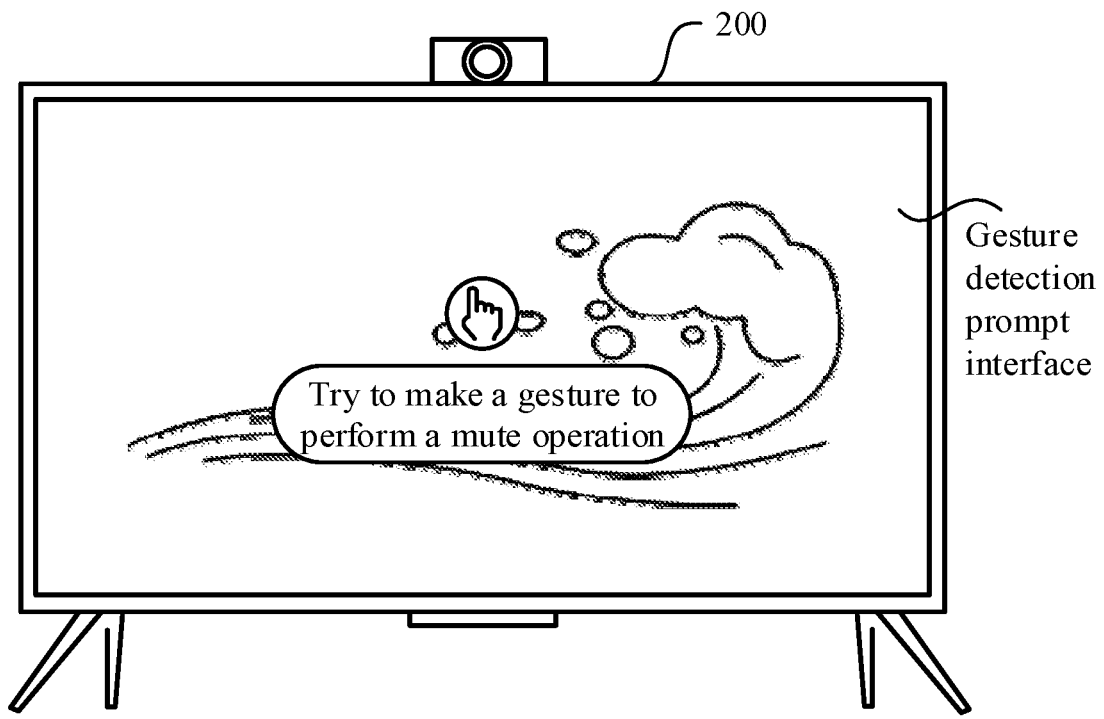
FIG. 15 shows a schematic diagram of a gesture detection prompt interface in a mute scenario according to some embodiments.

FIG. 14 shows a flowchart of a method for controlling a display apparatus to perform a mute operation or an unmute operation according to some embodiments; and FIG. 15 shows a data flow diagram of controlling a display apparatus to perform a mute operation or an unmute operation according to some embodiments. Referring to FIG. 14 and FIG. 15, in some embodiments, when performing a step S33: in response to a user gesture being a mute control gesture, responding to a command corresponding to the mute control gesture by performing a mute operation or an unmute operation, the at least one processor is further configured to perform following steps.

S331: recognizing the user gesture in the user image, to determine whether the user gesture is a mute control gesture.

S332: in response to the user gesture being the mute control gesture, computing a first effective success frame rate of the mute control gesture.

S333: in response to the first effective success frame rate of the mute control gesture exceeding a second effective threshold, responding to a command corresponding to the mute control gesture by performing a mute operation or an unmute operation.

A specific implementation scheme is similar to a scheme for determining video play and pause based on image recognition, and will not be described in detail again.

FIG. 15 shows a schematic diagram of a gesture detection prompt interface in a mute scenario according to some embodiments. In this case, referring to FIG. 15, the at least one processor is further configured to: in response to determining that the user gesture is the mute control gesture, present the gesture detection prompt interface in the user interface, the gesture detection prompt interface presenting a gesture recognition success prompt message and a gesture pattern.

Figure 16:
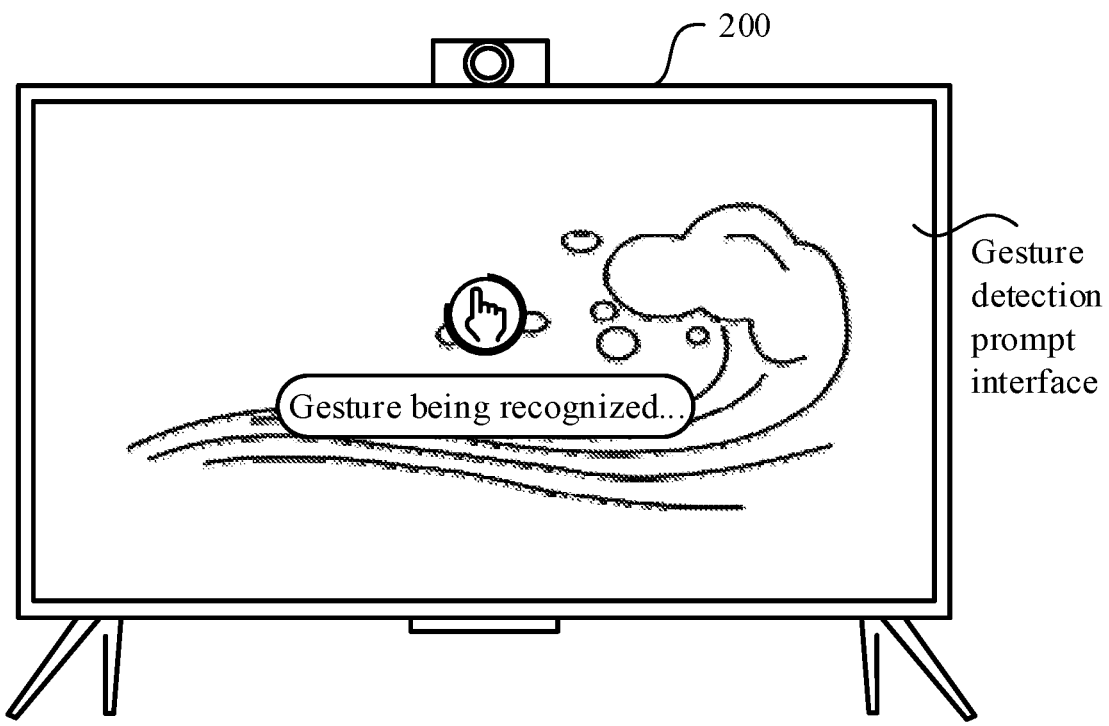
FIG. 16 shows another schematic diagram of a gesture detection prompt interface in a mute scenario according to some embodiments.

FIG. 16 shows another schematic diagram of a gesture detection prompt interface in a mute scenario according to some embodiments. In this case, referring to FIG. 16, the at least one processor is configured to perform: in response to acquiring the user image collected within the second detection duration, present the gesture pattern in the form of buffered animation, the buffered animation being presented for a duration of the second detection duration.

The gesture recognition success prompt message in the gesture detection prompt interface in this scenario is used to inform the user that a specified gesture currently capable of controlling the mute operation is successfully recognized, where a content of the prompt message may be "gesture being recognized . . . " After seeing the prompt message, the user can know that the display apparatus can be controlled to perform the mute operation or the unmute operation based on the mute control gesture.

The gesture pattern is presented in the form of buffered animation, and may be presented by clockwise rotation from a vertex of the gesture pattern for one circle. The buffered animation is rotated for one circle within a duration of the second detection duration.

It should be noted that the gesture detection prompt interface shown in FIG. 15 and the gesture detection prompt interface shown in FIG. 16 are continuously presented. When first gesture recognition is successful, the gesture detection prompt interface shown in FIG. 15 is presented in the user interface, and after the first gesture recognition is successful, the gesture detection prompt interface shown in FIG. 16 is immediately presented in the user interface, that is, after the gesture pattern appears in the user interface, a rotation effect of the buffered animation is immediately performed. The process of presenting the gesture detection prompt interface shown in FIG. 16 is a process of performing second gesture recognition.

In order to determine whether to perform the mute operation or the unmute operation, it is necessary to first determine a current state of the display apparatus. If the display apparatus is currently in a mute state, the command corresponding to the mute control gesture is responded to by performing the unmute operation; and if the display apparatus is currently in an unmute state, the command corresponding to the mute control gesture is responded to by performing the mute operation.

In response to the mute command, the at least one processor acquires a current mute flag bit of the system. If the current mute flag bit is True, it means that the system is currently in the mute state. Therefore, the unmute operation may be performed according to a gesture made by the user. In this case, in response to the mute command, the display apparatus can perform the unmute operation. If the current mute flag bit is False, it means that the system is currently in the unmute state. Therefore, the mute operation may be performed according to a gesture made by the user. In this case, in response to the mute command, the display apparatus can perform the mute operation.

When the user gesture is the mute control gesture, such as gesture of the number 1, and after gesture recognition is successful, sending of a mute key value of the remote control is simulated. After receiving the mute key value of the remote control, the system invokes getmuteflag to acquire a current muteflag (mute flag bit). If the current muteflag is True, it means that in this case, the display apparatus is in the mute state. After receiving the mute key value, the display apparatus cancels muting, i.e., performs an unmute operation, and sets the muteflag to False. If the acquired current muteflag is False, it means that in this case, the display apparatus is in an unmute state. After receiving the mute key value, the display apparatus performs the mute operation, and sets the muteflag to True.

In some embodiments, after completing a process of controlling the display apparatus to perform the mute operation or the unmute operation based on the above methods, the operation completion prompt interface may be presented in the user interface to prompt the user that the control has been completed. The operation completion prompt interface may be as shown in FIG. 13. The operation completion prompt interface presents the operation completion pattern and the operation completion prompt message, where the operation completion pattern may be in the form of the "tick" UI, and the content of the operation completion prompt message may be "operation succeeded," etc.

As can be seen, when the display apparatus according to embodiments of the disclosure is controlled based on gesture recognition, if a user gesture recognized by gesture recognition on the collected user image is the mute control gesture, the display apparatus is controlled to perform a mute operation or a unmute operation. Further, during a control operation, only when a mute gesture confidence exceeds the gesture success threshold, the first effective success frame rate of the mute control gesture within the first detection duration exceeds the second effective threshold, and a second effective success frame rate of the mute control gesture within the second detection duration exceeds the third effective threshold, can the command corresponding to the mute control gesture be responded to by performing a mute operation or a unmute operation, so that the control operation is more accurate. The above gesture recognition method can efficiently control the display apparatus. Even without a remote control, the user can still conveniently control the display apparatus, thus improving the user experience.

In some embodiments, in order to avoid continuously responding to the play and pause command or the mute command, after performing an operation process, the control method implemented in the disclosure can perform a next operation only after an interval of a preset duration.

After completing an operation control, the at least one processor is further configured to perform following steps.

Step 41: after performing a process of controlling a play operation or a pause operation, or controlling a mute operation or an unmute operation, after an interval of a preset duration, acquiring a next frame of a user image including a user gesture collected by an image collector.

Step 42: in response to the user gesture in the next frame of the user image being a play and pause control gesture, responding to a command corresponding to the play and pause control gesture by performing a next play operation or pause operation.

Step 43: in response to the user gesture in the next frame of the user image being a mute control gesture, responding to a command corresponding to the mute control gesture by performing a next mute operation or unmute operation.

After completely completing a process of a current play operation or pause operation, or mute operation or unmute operation, if a user re-makes a user gesture within a detection region of the image collector, the image collector collects the next frame of the user image including the user gesture, and sends the next frame of the user image to the at least one processor. After receiving a new frame of the user image, the at least one processor re-determines the control gesture. When determining that a user gesture in the new user image is the play and pause control gesture, the at least one processor responds to the command corresponding to the play and pause control gesture by performing the next play operation or pause operation; and when determining that the user gesture in the new user image is a mute control gesture, the at least one processor responds to the command corresponding to the mute control gesture by performing a next mute operation or unmute operation. The contents in the above embodiments may be referred to for a specific process of controlling the play operation or pause operation, or controlling the mute operation or unmute operation, which will not be repeated here.

In some embodiments, the interval of the preset duration may be set as 2 seconds, or may be set as other values according to needs, and is not limited here.

No matter a control operation is successfully completed or is not successfully completed, i.e., is canceled halfway, it is necessary to collect a next frame of the user image after an interval of 2 sec, to prevent the user from operations of frequently starting the display apparatus based on gesture control within a short time.

As can be seen from the above embodiments, after a global gesture switch is switched on, if the image collector of the display apparatus according to embodiments of the disclosure is not occupied by a specified application that needs to start the image collector, a gesture detection function is enabled, and a user image including a user gesture collected by the image collector is acquired. When it is detected that the user gesture in the user image is a play and pause control gesture, a playing mode broadcast data indicates full-screen playing, the command generated from the play and pause control gesture is responded to by performing the play operation or the pause operation on a video file; and when it is detected that the user gesture in the user image is a mute control gesture, the command corresponding to the mute control gesture is responded to by performing a mute operation or a unmute operation. As can be seen, the display apparatus according to embodiments of the disclosure efficiently controls the display apparatus based on gesture recognition. Even without a remote control, the user can still conveniently control the display apparatus, thus improving the user experience.

In some embodiments, when a smart TV function or a video playing function is achieved using the display apparatus, the display apparatus can play different TV programs, different video files, audio files, or the like. In a process of using the display apparatus, the user can adjust an output volume of the display apparatus based on user demand, so that the user can immerse himself/herself in the TV programs or audio/video.

The method for volume adjustment of a display apparatus is generally implemented using a configured remote control thereof, which is not be convenient enough, thus affecting the user experience. Therefore, in order to improve the efficiency of adjusting the output volume of the display apparatus, embodiments of the disclosure provide a method for volume adjustment through gesture recognition, including recognizing a user's gesture in an image and a position thereof in the image using an AI image detection technology, and implementing volume adjustment through position changes of the user's gesture in the image. At present, a smart TV has greatly supported an external camera and a built-in camera, thus allowing for image collection and gesture detection through the cameras.

The method for volume adjustment based on gesture recognition according to embodiments of the disclosure not only can implement volume adjustment without unsmooth volume adjustment caused by frame loss, jamming, or too slow detection during a gesture detection process even when a system CPU has too large loads, but also can smoothly implement volume adjustment on the display apparatus by recognizing a sliding gesture.

Figure 17:
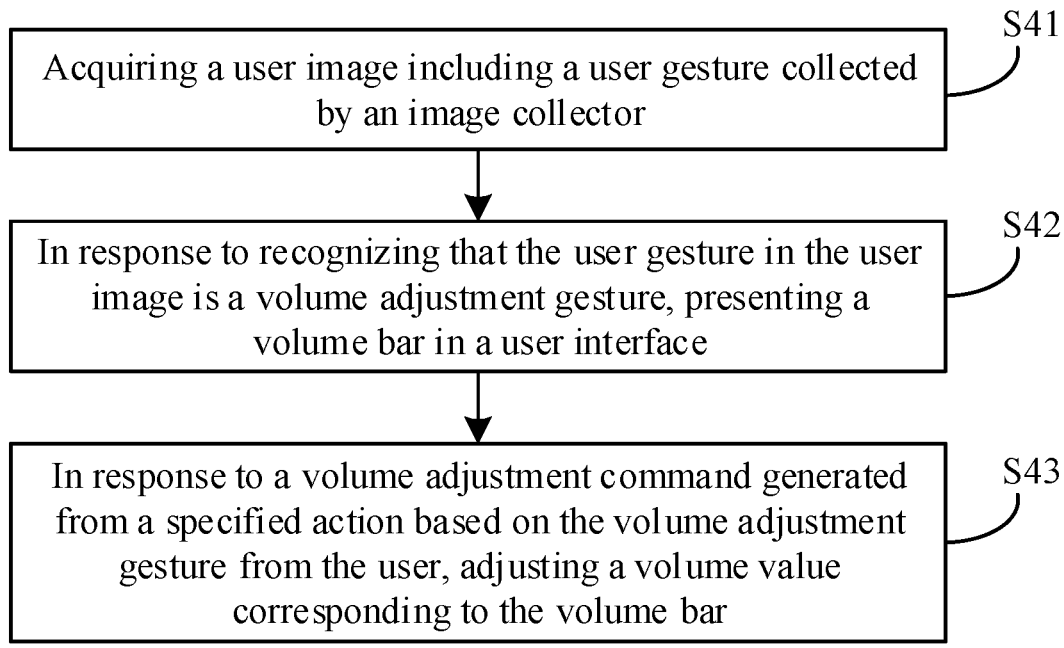
FIG. 17 shows a flowchart of a method for volume adjustment according to some embodiments.
Figure 18:
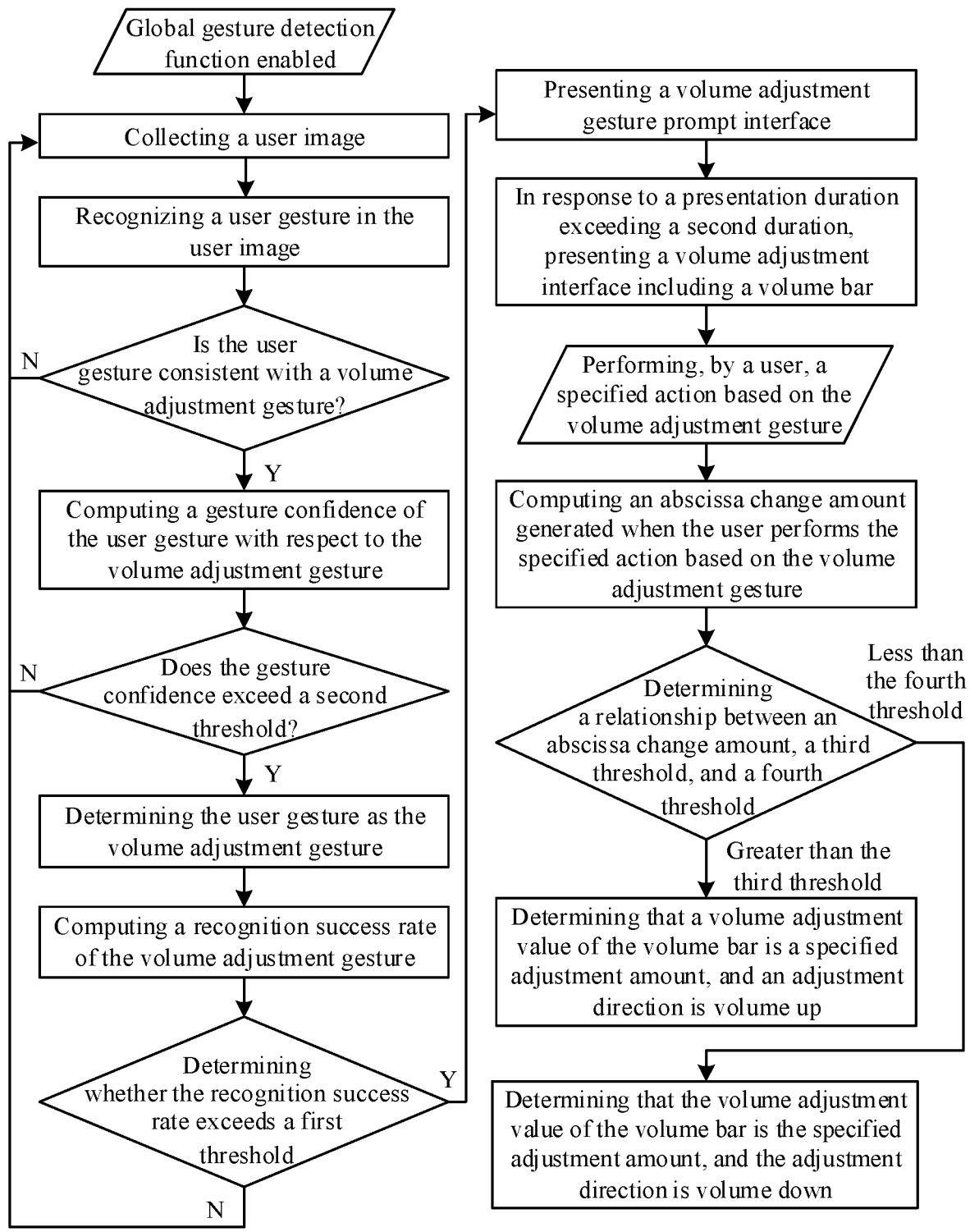
FIG. 18 shows a data flow diagram of a method for volume adjustment according to some embodiments.

FIG. 17 shows a flowchart of a method for volume adjustment according to some embodiments; and FIG. 18 shows a data flow diagram of a method for volume adjustment according to some embodiments. In order to implement smart volume adjustment by recognizing a sliding gesture on a TV through gesture interaction and recognition on an image collected using a built-in camera of the TV, embodiments of the disclosure provide a display apparatus, including: a display configured to present an image and/or a user interface; an image collector or a user input interface configured to connect with the image collector, the image collector being configured to collect a user image, the user input interface being configured to receive a user command through an action, such as voice, touch, gesture, pressing, etc.; a memory configured to store computer instructions and data associated with the display and at least one processor in connection with the display, the image collector, the user input interface and the memory and configured to execute the instructions to cause the display apparatus to perform various operations or functions. When performing the method for volume adjustment shown in FIG. 17 and FIG. 18, the at least one processor is configured to perform following steps.

S41: acquiring a user image including a user gesture collected by an image collector.

When a user is using the display apparatus, if it is necessary to adjust a volume of the display apparatus, the user can stand within a detection region of the image collector (camera), and make a gesture using his/her fingers. The image collector collects the user image of the user within the detection region, and the user image includes the user gesture. The at least one processor performs gesture recognition on the user image including the user gesture, and determines whether the user gesture is a volume adjustment gesture.

The volume adjustment gesture is used to implement smart volume adjustment on the display apparatus. In some embodiments, the volume adjustment gesture may be set as an OK gesture. The volume adjustment gesture may also be customized according to a use habit of the user, e.g., may also be set as a palm gesture, a finger bending gesture, etc., and is not limited in this embodiment.

The image collector collects user images of the user within the detection region in real time at a preset frequency, and sequentially sends the user images to the at least one processor. the at least one processor performs gesture recognition on each frame of the user images. If a success rate of the volume adjustment gesture recognized within a first duration is greater than a first threshold, the gesture recognition is determined to be successful, and smart volume adjustment on the display apparatus may be implemented according to the recognized volume adjustment gesture.

In some embodiments, the preset frequency of the image collector is 30-40 ms/frame, i.e., the image collector collects a frame of the user image every 30-40 ms.

S42: in response to recognizing that the user gesture in the user image is a volume adjustment gesture, presenting a volume bar in a user interface.

The at least one processor performs gesture recognition on each frame of the user image received to determine whether the user gesture in the user image is the volume adjustment gesture, enables a smart volume adjustment function on the display apparatus by sliding the volume adjustment gesture when recognizing that the user gesture is the volume adjustment gesture, activates a volume bar control, and presents the volume bar control in the user interface, so that the user can perceive current intuitive effects on volume adjustment.

Figure 19:
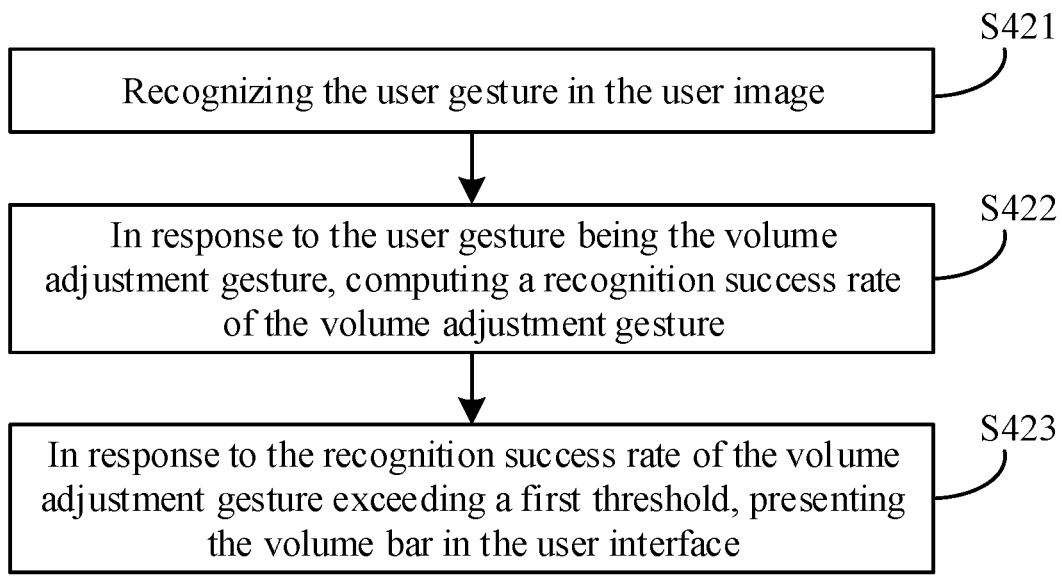
FIG. 19 shows a flowchart of a method for presenting a volume bar in a user interface according to some embodiments.

FIG. 19 shows a flowchart of a method for presenting a volume bar in a user interface according to some embodiments. Referring to FIG. 19, in some embodiments, when performing in response to recognizing that the user gesture in the user image is the volume adjustment gesture, presenting the volume bar in the user interface, the at least one processor is further configured to perform following steps.

S421: recognizing the user gesture in the user image.

S422: in response to the user gesture being the volume adjustment gesture, computing a recognition success rate of the volume adjustment gesture.

S423: in response to the recognition success rate of the volume adjustment gesture exceeding a first threshold, presenting the volume bar in the user interface.

The image collector collects a user image including the user gesture of the user within the detection region. However, if the user gesture made by the user is not a gesture intended to implement volume adjustment, but other accidental gesture, in this case, it is not necessary to start the gesture detection process for volume adjustment, i.e., it is not necessary to activate the volume bar to perform volume adjustment.

In addition, if a gesture made by the user is a gesture for volume adjustment, but an effect of the user gesture is not in place, for example, when the volume adjustment gesture is the OK gesture, the middle finger, ring finger, and little finger of the user should have been straight, but the user poses the three fingers in a bending state, so that the gesture made by the user does not resemble the OK gesture. In this case, this ambiguous user gesture may cause failure to accurately determine whether to recognize the user gesture as the volume adjustment gesture, result in misrecognition, and may cause failure to promptly perform volume adjustment.

Therefore, when performing gesture recognition on each frame of the user image, the at least one processor needs to first determine whether the user gesture in the user image is the volume adjustment gesture, i.e., only when a similarity of the user gesture to the volume adjustment gesture exceeds a threshold, the at least one processor determine the user gesture as the volume adjustment gesture. In addition, during the gesture detection process, only when a ratio of the number of user images whose user gestures are recognized as the volume adjustment gestures to a total number of user images exceeds a threshold, it means that the user needs to activate the volume adjustment function. Otherwise, the volume adjustment process is not performed.

In some embodiments, when performing in response to the user gesture being the volume adjustment gesture, computing the recognition success rate of the volume adjustment gesture, the at least one processor is further configured to perform following steps.

Step 4221: matching the user gesture with the volume adjustment gesture, to compute a gesture confidence of the user gesture with respect to the volume adjustment gesture.

Step 4222: in response to the gesture confidence exceeding a second threshold, determining that the user gesture is the volume adjustment gesture.

Step 4223: acquiring a total number of gesture recognition frames of the user images, and the number of gesture success frames of the corresponding user images when the user gesture is the volume adjustment gesture within a first duration.

Step 4224: computing a ratio of the number of gesture success frames to the total number of gesture recognition frames, and determining the ratio as the recognition success rate of the volume adjustment gesture.

When recognizing a user gesture in each frame of the user image, the at least one processor matches the user gesture in each frame of the user image with the volume adjustment gesture respectively, to compute the gesture confidence, i.e., similarity, of each user gesture with respect to the volume adjustment gesture.

Whether each gesture confidence exceeds the second threshold is determined. In some embodiments, the second threshold may be set as 95%. If a gesture confidence exceeds 95%, it is determined that a user gesture corresponding to the gesture confidence is the volume adjustment gesture, to avoid misrecognition.

It is determined that a user image whose user gesture with the gesture confidence exceeds the second threshold is the gesture success frame. During the gesture detection process, the number of gesture success frames and the total number of gesture recognition frames for all collected user images are calculated.

In some embodiments, a duration corresponding to the gesture detection process is the first duration, which may be set as 1 second. The first duration may also be set as other durations according to needs, and is not limited here.

The first duration is a maximum duration for the image collector to continuously collect user images including user gestures. The image collector sequentially sends multiple frames of the user images collected within the first duration to the at least one processor, so that the at least one processor can calculate the total number of gesture recognition frames among the multiple frames of the user images received within the first duration.

The at least one processor performs gesture recognition on each frame of the user image respectively. If recognizing that a gesture confidence of a user gesture in a frame of the user image with respect to the volume adjustment gesture exceeds the second threshold, the at least one processor determines that the user gesture is the volume adjustment gesture, and calculates the number of gesture success frames of corresponding user images when the user gesture is the volume adjustment gesture within the first duration.

The computing the ratio of the number of gesture success frames to the total number of gesture recognition frames means to compute a ratio of the number of success frames where the at least one processor detects the OK gesture within the first duration to the total number of gesture recognition frames. The ratio is determined as the recognition success rate of the volume adjustment gesture.

In some embodiments, in order to avoid the at least one processor being unable to determine whether the volume bar needs to be activated to perform volume adjustment after the user makes the volume adjustment gesture, only retains the gesture for a short time, and then cancels the gesture, and to facilitate the at least one processor to promptly activate the volume bar to perform volume adjustment, the first threshold may be set, so that among the multiple frames of the user images collected by the image collector within the first duration, only when the recognition success rate of the volume adjustment gesture exceeds the first threshold, the gesture recognition is determined as successful. Then, a volume bar control is activated to perform a subsequent volume adjustment process.

Therefore, after the recognition success rate of the corresponding volume adjustment gesture within the first duration is determined, whether the recognition success rate of the volume adjustment gesture exceeds the first threshold is determined. In some embodiments, the first threshold may be set as 90%. If the recognition success rate exceeds the first threshold of 90%, it means that during a current gesture detection process (within the first duration), the gesture recognition is successful. In this case, the volume bar may be presented in the user interface. The first threshold may also be set as other values according to actual application needs, and is not limited here.

If the recognition success rate of the volume adjustment gesture is less than the first threshold, it means that the gesture recognition detection fails, and a currently detected volume adjustment gesture of a same user may be lost. In this case, the volume adjustment gesture is immediately re-detected.

Before activating the volume bar control for presentation, the at least one processor needs to first determine whether the gesture recognition is successful. Therefore, in order for the user to clearly know that current gesture recognition is successful, the at least one processor may present a volume adjustment gesture prompt interface in the user interface.

In some embodiments, when performing in response to the recognition success rate of the volume adjustment gesture exceeding the first threshold, presenting the volume bar in the user interface, the at least one processor is further configured to perform following steps.

Step 4231: in response to the recognition success rate of the volume adjustment gesture exceeding the first threshold, presenting a volume adjustment gesture prompt interface in the user interface, where the volume adjustment gesture prompt interface is configured to present a gesture recognition success prompt message and a volume adjustment gesture pattern.

Steps 4232: in response to a presentation duration of the volume adjustment gesture prompt interface exceeding a second duration, canceling presentation of the volume adjustment gesture prompt interface, and presenting a volume adjustment interface in the user interface, where the volume adjustment interface includes the volume bar and a volume adjustment operation prompt message.

When the recognition success rate of the volume adjustment gesture exceeds the first threshold, it means that the current gesture recognition is successful, and a subsequent process of performing a sliding operation based on the volume adjustment gesture to trigger volume adjustment may be performed. In this case, in order to provide a feedback on the volume adjustment gesture made by the user, the volume adjustment gesture prompt interface may be generated and presented in the user interface.

Figure 20:
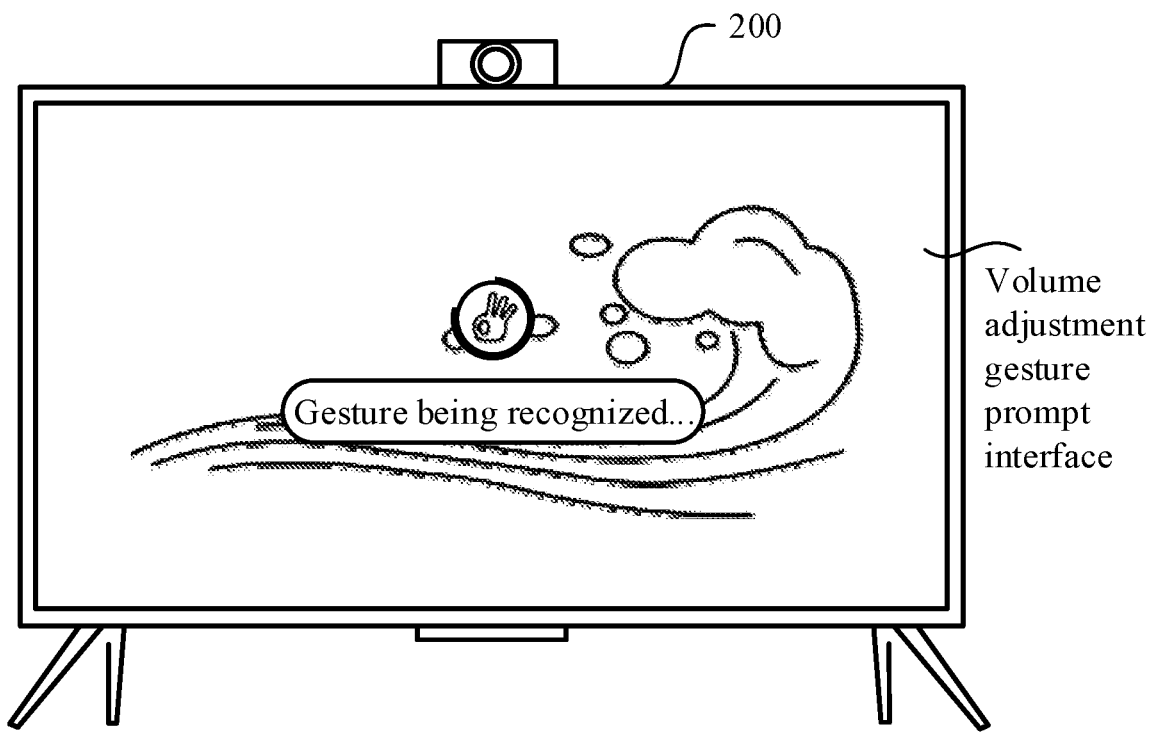
FIG. 20 shows a schematic diagram of presenting a volume adjustment gesture prompt interface in a user interface according to some embodiments.

FIG. 20 shows a schematic diagram of presenting a volume adjustment gesture prompt interface in a user interface according to some embodiments. Referring to FIG. 20, when gesture recognition is successful, the volume adjustment gesture prompt interface presents a gesture recognition success prompt message and a volume adjustment gesture pattern, where the gesture recognition success prompt message is used to inform a user that a specified gesture currently capable of implementing volume adjustment is successfully recognized, and a content of the prompt message may be "gesture being recognized . . . " After seeing the prompt message, the user can know that a subsequent process of performing the sliding operation based on a volume adjustment gesture to trigger volume adjustment may be performed.

The volume adjustment gesture pattern is used to identify a UI form of the volume adjustment gesture. Generally, the UI form of this pattern is same as a posture made by the user using his/her fingers. For example, if the volume adjustment gesture is the OK gesture, the volume adjustment gesture pattern is an "OK" pattern.

After seeing the gesture recognition success prompt message and the volume adjustment gesture pattern, the user can know that a result of a detection process of the volume adjustment gesture is that the gesture recognition is successful. In this case, while presenting the volume adjustment gesture prompt interface in the user interface, the at least one processor informs the system to activate a volume bar control by sending a broadcast package. The volume bar control is presented in the user interface to prompt the user to start a current volume adjustment process.

When the gesture recognition is successful, the user interface first presents the volume adjustment gesture prompt interface. To facilitate the system to activate a volume bar and then automatically present the volume bar in the user interface, a presentation duration of the volume adjustment gesture prompt interface may be set. When the presentation duration of the volume adjustment gesture prompt interface reaches a threshold, presentation of the volume adjustment gesture prompt interface is canceled, and at the same time, the volume bar is presented in the user interface. In this implementation process, a viewing effect of the user is that a content presented in the user interface is switched from the volume adjustment gesture prompt interface to the volume bar.

In some embodiments, the presentation duration of the volume adjustment gesture prompt interface is set as a second duration. The second duration may be 500 ms. After the presentation duration of the volume adjustment gesture prompt interface exceeds 500 ms, presentation of the volume adjustment gesture prompt interface may be canceled, and a volume adjustment interface may be presented in the user interface, where the volume adjustment interface includes the volume bar and a volume adjustment operation prompt message.

Figure 21:
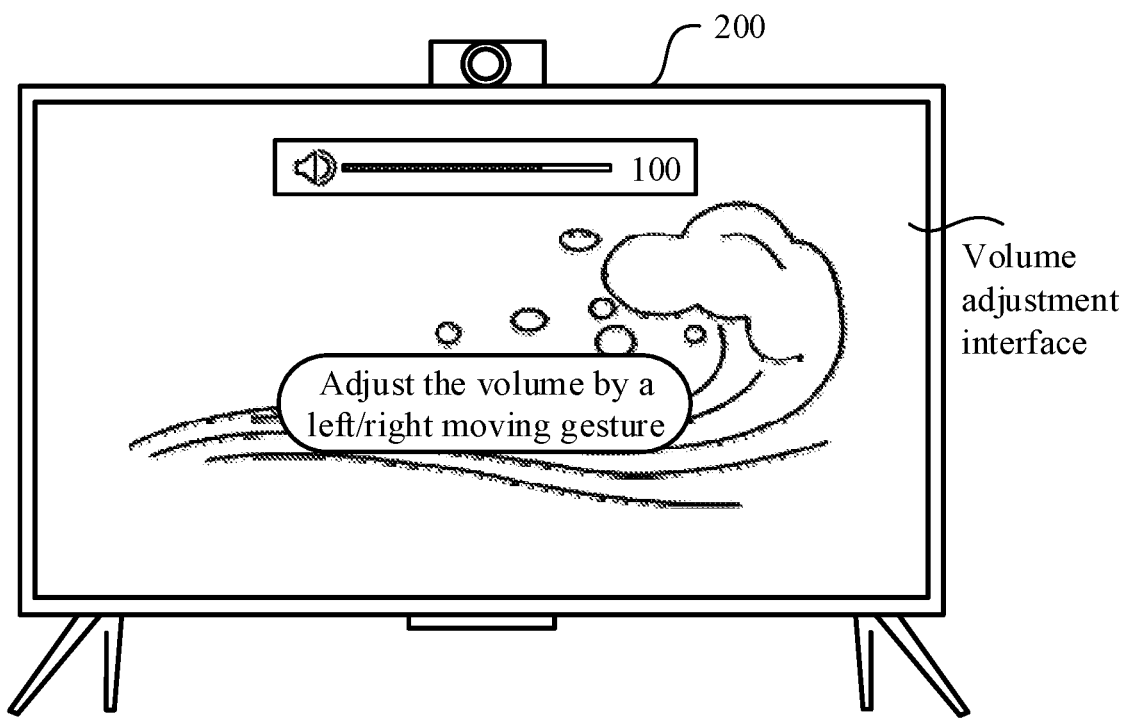
FIG. 21 shows a schematic diagram of presenting a volume adjustment interface in a user interface according to some embodiments.

FIG. 21 shows a schematic diagram of presenting a volume adjustment interface in a user interface according to some embodiments. Referring to FIG. 21, when a presentation duration of a volume adjustment gesture prompt interface reaches a threshold, the user interface is switched to present the volume adjustment interface. The volume adjustment interface includes a volume bar and a volume adjustment operation prompt message, where the volume bar is used to present a current output volume of the display apparatus, and the volume adjustment operation prompt message is used to prompt the user of an operation step of adjusting the volume of the display apparatus using the volume adjustment gesture. For example, a content of the prompt message may be "adjust the volume by a left/right moving gesture."

After seeing the volume adjustment operation prompt message in the user interface, the user can perform a corresponding gesture operation based on the prompt content to start the volume adjustment process.

S43: in response to a volume adjustment command generated from a specified action based on the volume adjustment gesture from the user, adjusting a volume value corresponding to the volume bar.

When the volume adjustment gesture made by the user satisfies the need for starting the volume adjustment process, the user can perform a corresponding operation according to the volume adjustment operation prompt message presented in the user interface. That is, after the gesture recognition detection succeeds, the user maintains the volume adjustment gesture, and adjusts the volume by performing a specified action. In some embodiments, the specified action may be a left/right sliding gesture.

For example, the user can perform volume adjustment by maintaining the OK gesture using his/her fingers, and left/right sliding along a horizontal direction in front of the display apparatus (within a detection region of the image collector).

The user maintains the volume adjustment gesture, and performs a specified action, such as left/right sliding in the horizontal direction, thus resulting in a position change of the user fingers, and an effect presented in the user image is an abscissa change of the gesture. In this case, when the position change occurs, the volume adjustment command can be generated. In response to the volume adjustment command, the at least one processor can promptly adjust the volume of the volume bar according to the abscissa change. In this case, the volume value presented on the volume bar changes accordingly, such as volume up or volume down.

Figure 22:
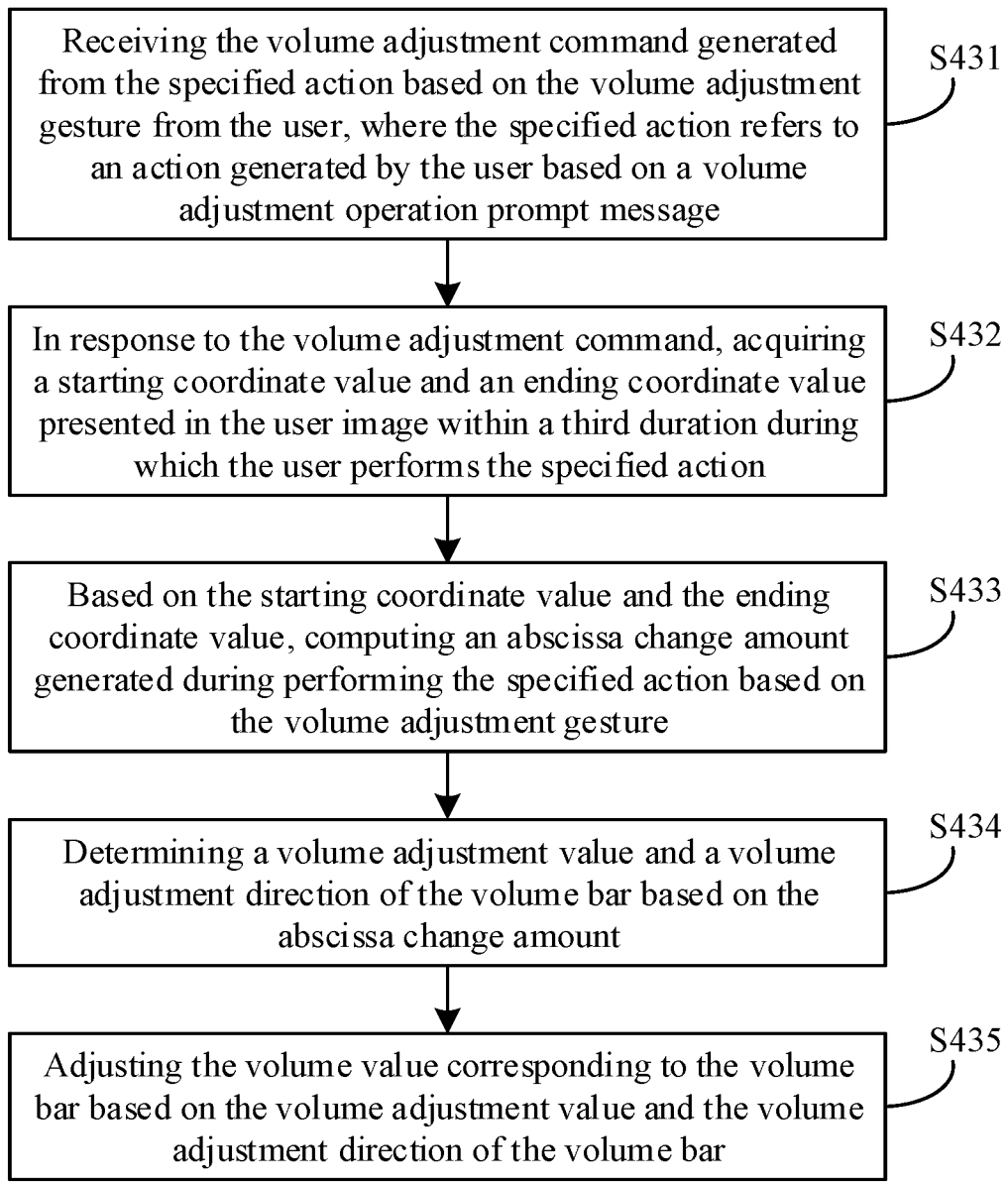
FIG. 22 shows a flowchart of a method for adjusting a volume corresponding to a volume bar according to some embodiments.

FIG. 22 shows a flowchart of a method for adjusting a volume corresponding to a volume bar according to some embodiments. Referring to FIG. 22, in some embodiments, in response to the volume adjustment command generated from a specified action based on the volume adjustment gesture from the user, adjusting the volume value corresponding to the volume bar, the at least one processor is further configured to perform following steps.

S431: receiving the volume adjustment command generated from the specified action based on the volume adjustment gesture from the user, where the specified action refers to an action generated by the user based on a volume adjustment operation prompt message.

S432: in response to the volume adjustment command, acquiring a starting coordinate value and an ending coordinate value presented in the user image within a third duration during which the user performs the specified action.

S433: based on the starting coordinate value and the ending coordinate value, computing an abscissa change amount generated during performing the specified action based on the volume adjustment gesture.

S434: determining a volume adjustment value and a volume adjustment direction of the volume bar based on the abscissa change amount.

S435: adjusting the volume value corresponding to the volume bar based on the volume adjustment value and the volume adjustment direction of the volume bar.

The user performs the specified action according to the volume adjustment operation prompt message presented in the user interface. For example, the user maintains the OK gesture using his/her fingers, and slides the gesture leftward/rightward along the horizontal direction in front of the display apparatus (within the detection region of the image collector), thus resulting in the position change. In this case, the volume adjustment command is generated.

In general, the image collector collects a frame of the user image for a duration of 30-40 ms. Therefore, in order to ensure real-time volume adjustment, when performing a gesture detection algorithm, the position change generated when the user performs the specified action while maintaining the volume adjustment gesture is computed every 100 ms, in order to linearly adjust the volume based on position change information.

Therefore, in response to the volume adjustment command, the at least one processor may acquire the starting coordinate value and the ending coordinate value presented in the user image within the third duration during which the user performs the specified action, so as to compute the abscissa change amount generated when the user performs the specified action based on the volume adjustment gesture. In some embodiments, the third duration may be set as 100 ms, and the position change generated by the sliding gesture of the user may be equivalent to the abscissa change amount generated in the user image.

The image collector collects a user image at an initial moment when the user performs the specified action and a user image at an end moment within the third duration in real time. A coordinate system is established with an upper left corner of the user image as a coordinate origin, with a positive direction of X-axis from left to right, and with a positive direction of Y-axis from top to bottom.

In the coordinate system, a pixel coordinate value of the volume adjustment gesture in the user image collected at the initial moment is the starting coordinate value, a pixel coordinate value of the volume adjustment gesture in the user image collected at the end moment is the ending coordinate value, and the abscissa change amount is computed based on an abscissa value of the starting coordinate value and an abscissa value of the ending coordinate value. The coordinate values are presented as pixel coordinates.

The end moment refers to a corresponding moment of each image collection process within the third duration. For example, 30-40 ms after the initial moment, the image collector collects a frame of the user image, and a moment when the image collection is completed is the end moment; and after another 30-40 ms, the image collector collects another frame of the user image, and a moment when the second image collection is completed is another end moment. Since an end moment may be generated when each frame of the user image is collected, a final end moment is a corresponding moment when an abscissa change rate satisfies a threshold condition.

Figure 23:
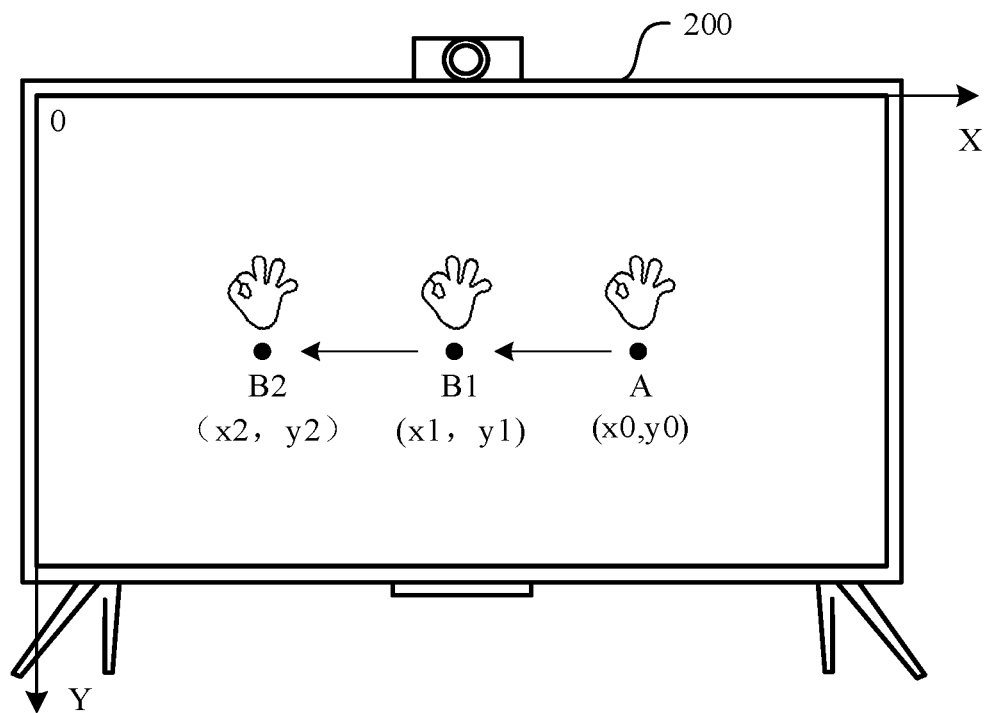
FIG. 23 shows a schematic diagram of computing an abscissa change amount according to some embodiments.

FIG. 23 shows a schematic diagram of computing an abscissa change amount according to some embodiments. Referring to FIG. 23, at the initial moment when the user performs the specified action, a position of the corresponding volume adjustment gesture is a point A. In this case, the starting coordinate value is A (x0, y0). If the sliding gesture of the user reaches a position of a point B1 and a position of a point B2 respectively through two image collection processes within the third duration, in this case, ending coordinate values are B1 (x1, y1) and B2 (x2, y2), respectively.

When B1 is the ending coordinate value, the corresponding abscissa change amount generated while the user performs the specified action based on the volume adjustment gesture is L1=x1−x0. When B2 is the ending coordinate value, the corresponding abscissa change amount generated while the user performs the specified action based on the volume adjustment gesture is L2=x2−x0.

In some embodiments, in order to avoid phenomena such as jitter, frame loss, and jamming during image collection by the image collector, a threshold condition may be set when the volume adjustment value and the volume adjustment direction of the volume bar are determined based on the abscissa change amount.

When determining the volume adjustment value and the volume adjustment direction of the volume bar based on the abscissa change amount, the at least one processor is further configured to perform following steps.

Step 4341: in response to the abscissa change amount being greater than a third threshold, determining that the volume adjustment value of the volume bar is a specified adjustment amount, and the volume adjustment direction is volume up.

Step 4342: in response to the abscissa change amount being less than a fourth threshold, determining that the volume adjustment value of the volume bar is a specified adjustment amount, and the volume adjustment direction is volume down.

In some embodiments, the third threshold and the fourth threshold may be set based on adjustment effects of the volume up and the volume down. The third threshold may be 8 pixels, and the fourth threshold may be −8 pixels. The threshold of 8 represents 8 pixels.

If an abscissa change amount is greater than the third threshold of 8 pixels, it means that the user maintains the volume adjustment gesture by right sliding. In this case, it is determined that the adjustment direction of the volume bar is volume up. If the abscissa change amount is less than the fourth threshold of −8 pixels, it means that the user maintains the volume adjustment gesture by left sliding. In this case, it is determined that the adjustment direction of the volume bar is volume down.

To achieve linear volume adjustment, a volume adjustment value for each volume adjustment may be set as 3 volume unit values. For example, if the abscissa change amount is greater than the third threshold, the volume value of the volume bar is increased by 3 volume unit values based on a current value; and if the abscissa change amount is less than the fourth threshold, the volume value of the volume bar is decreased by 3 volume unit values based on the current value.

Taking a state shown in FIG. 23 as an example, the user slides the volume adjustment gesture leftward, and the image collector collects two frames of the user images within the third duration. In this case, an abscissa change amount generated when the user performs the specified action based on the volume adjustment gesture presented in a first frame of an image (corresponding to the position of the point B1) and when the user performs the specified action based on the volume adjustment gesture presented in a user image (corresponding to the position of the point A) corresponding to a starting moment is computed as per L1=x1−x0, and an abscissa change amount generated while the user performs the specified action based on the volume adjustment gesture presented in a second frame of an image (corresponding to the position of the point B2) and while the user performs the specified action based on the volume adjustment gesture presented in the user image (corresponding to the position of the point A) corresponding to the starting moment is computed as per L2=x2−x0.

If L2<−8 (fourth threshold), it means that a position change amount when the user maintains the volume adjustment gesture by sliding from the point A to the point B2 is enough to trigger a volume adjustment process. In this case, the volume value of the volume bar can be adjusted.

After the volume adjustment value and the volume adjustment direction of the volume bar are determined, a corresponding volume of the volume bar can be adjusted. For example, when the volume adjustment value is 3, and the volume adjustment direction is volume up, the volume value is increased by 3 volume unit values based on a current volume value of the volume bar. When the volume adjustment value is 3, and the volume adjustment direction is volume down, the volume value is decreased by 3 volume unit values based on the current volume value of the volume bar.

In some embodiments, when the at least one processor linearly adjusts the volume of the volume bar according to an abscissa change amount within the third duration, i.e., each time when a change of 8 pixel points is detected due to the abscissa change corresponding to the sliding gesture of the user within 100 ms, the at least one processor performs a volume adjustment process, and adjusts 3 volume unit values each time.

The volume adjustment direction may be determined according to a positive/negative value of the detected change of the 8 pixels. For example, if a value corresponding to the detected 8 pixels is a negative number, it means that volume down is required; and if the value corresponding to the detected 8 pixels is a positive number, it means that volume up is required.

It should be noted that the set gesture detection duration (the third duration), the position change threshold (the third threshold, the fourth threshold) of 8 pixels, and the 3 volume adjustment values (the specified adjustment amount) may also be set as other values according to needs, which are merely illustrated as examples here, and are not limited.

In some embodiments, during the volume adjustment process, excessive CPU occupancy by the display apparatus often occurs, thus resulting in a phenomenon of frame loss or jamming in gesture detection during gesture sliding, so that a user gesture moves within the third duration (100 ms), but does not cause an abscissa change accordingly in the user image, thereby resulting in failure of volume adjustment, and affecting the volume adjustment accuracy.

Therefore, in order to ensure accurate volume adjustment even if there is a phenomenon of frame loss or jamming, when determining the starting coordinate value and the ending coordinate value, the at least one processor is further configured to perform following steps.

Step 4321: in response to the abscissa change amount being zero within the third duration, extending a gesture detection duration on the basis of the third duration.

Step 4322: based on a total duration corresponding to the gesture detection duration, acquiring the starting coordinate value and the ending coordinate value while the user performs the specified action based on the volume adjustment gesture, where the total duration of the gesture detection duration refers to a total duration corresponding to one or more third durations, the starting coordinate value is a starting coordinate value corresponding to a first third duration among the one or more third durations, and the ending coordinate value is an ending coordinate value corresponding to a last third duration among the one or more third durations.

When starting the volume adjustment process, the at least one processor performs gesture detection in real time according to the user image collected by the image collector to determine the abscissa change amount generated during gesture sliding. During a gesture detection process, if no position change is detected within the third duration (100 ms), i.e., the abscissa change amount is zero, a duration of the third duration (100 ms) may continue to be extended until a volume adjustment threshold is reached (the abscissa change amount satisfies the third threshold or the fourth threshold).

In this case, the total gesture detection duration is a corresponding duration which extends the third duration. In this case, the starting coordinate value generated while the user performs the specified action based on the volume adjustment gesture is still the starting coordinate value corresponding to the initial moment, where the initial moment is a moment corresponding to starting of gesture sliding in the first third duration; and the ending coordinate value is an ending coordinate value corresponding to an end moment within a last third duration among one or more third duration, where the end moment refers to a corresponding moment when the abscissa change amount within the last third duration satisfies the threshold condition.

For example, during the gesture detection process, if no abscissa change amount is detected within a first 100 ms, the third duration is extended by 100 ms. If the abscissa change amount generated at a moment of 150 ms (within a second 100 ms) satisfies the threshold condition, a pixel coordinate corresponding to a gesture position detected at an initial moment of generating gesture sliding within the first 100 ms is the starting coordinate value, and a pixel coordinate corresponding to a gesture position detected at 150 ms (ending moment) is the ending coordinate value.

As can be seen, if no abscissa change amount is detected within the gesture detection duration (the third duration), the duration corresponding to the third duration may continue to be extended until the abscissa change amount reaches the volume adjustment threshold (the third threshold or the fourth threshold). This method can effectively avoid the phenomenon of poor volume adjustment follow-up caused by frame loss or jamming in the user image collected by the image collector, thereby improving the volume adjustment accuracy.

In some embodiments, when the user performs a sliding action to adjust the volume of the display apparatus based on the volume adjustment gesture, a volume adjustment state prompt message may be presented in the user interface, to prompt the user that it is currently in the volume adjustment process.

Figure 24:
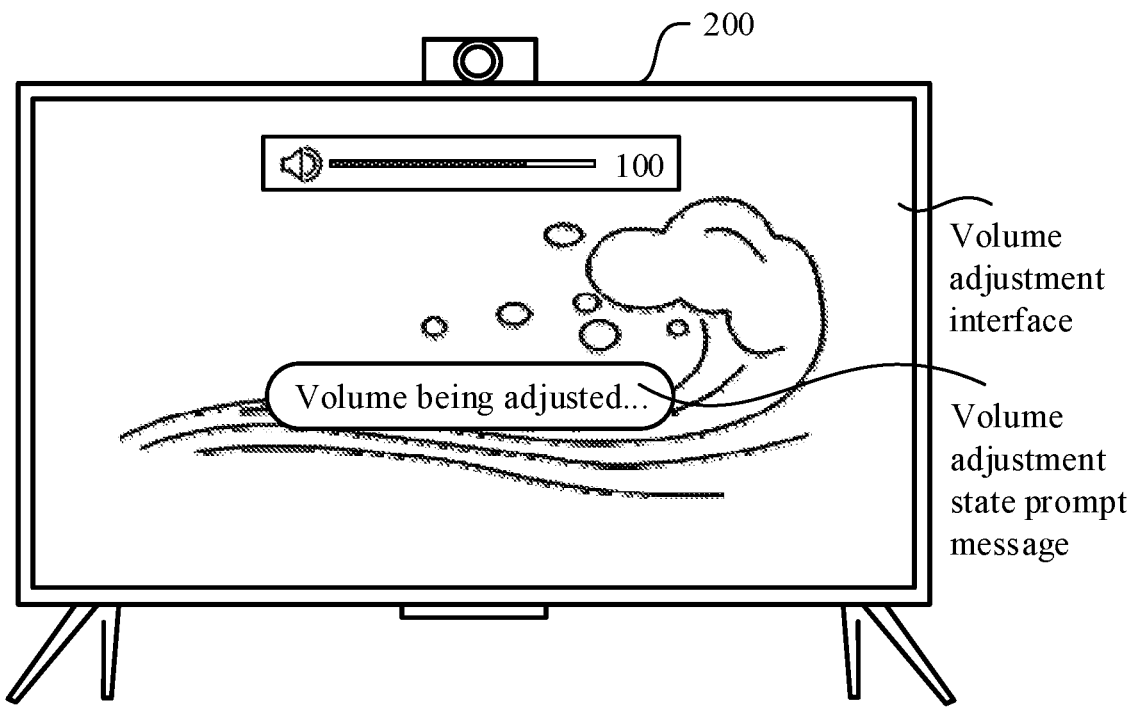
FIG. 24 shows a schematic diagram of presenting a volume adjustment state prompt message in a user interface according to some embodiments.

FIG. 24 shows a schematic diagram of presenting a volume adjustment state prompt message in a user interface according to some embodiments. Referring to FIG. 24, during a volume adjustment process, the at least one processor is further configured to: in response to the volume adjustment command, switch the volume adjustment operation prompt message presented in the user interface to a volume adjustment state prompt message.

During the volume adjustment process, the volume adjustment interface is presented in the user interface all along. The volume bar is presented in the user interface all along. The volume value corresponding to the volume bar changes accordingly with the sliding operation of the volume adjustment gesture of the user, such as volume up or volume down.

To prompt the user that it is currently in the volume adjustment process, presentation of the volume adjustment operation prompt message in the volume adjustment interface may be canceled, and instead, the volume adjustment state prompt message may be presented. A prompt content of the volume adjustment state prompt message may be "volume being adjusted . . . ," etc.

In some embodiments, after the user adjusts the volume of the display apparatus to a desired volume, the user may cancel the maintained volume adjustment gesture. In this case, the next frame of the user image collected by the image collector may not include the volume adjustment gesture, which means that the volume adjustment process of the user is completed.

Due to no gesture sliding, the volume of the volume bar does not slide leftward/rightward following the gesture, i.e., the volume may not be adjusted. Therefore, after the user completes the volume adjustment process, presentation of the volume adjustment interface (the volume bar) presented in the user interface is canceled. After monitoring broadcast data that the volume bar disappears, the at least one processor generates a volume adjustment completion interface, and presents the volume adjustment completion interface in the user interface, to prompt the user that the volume adjustment is completed.

Figure 25:
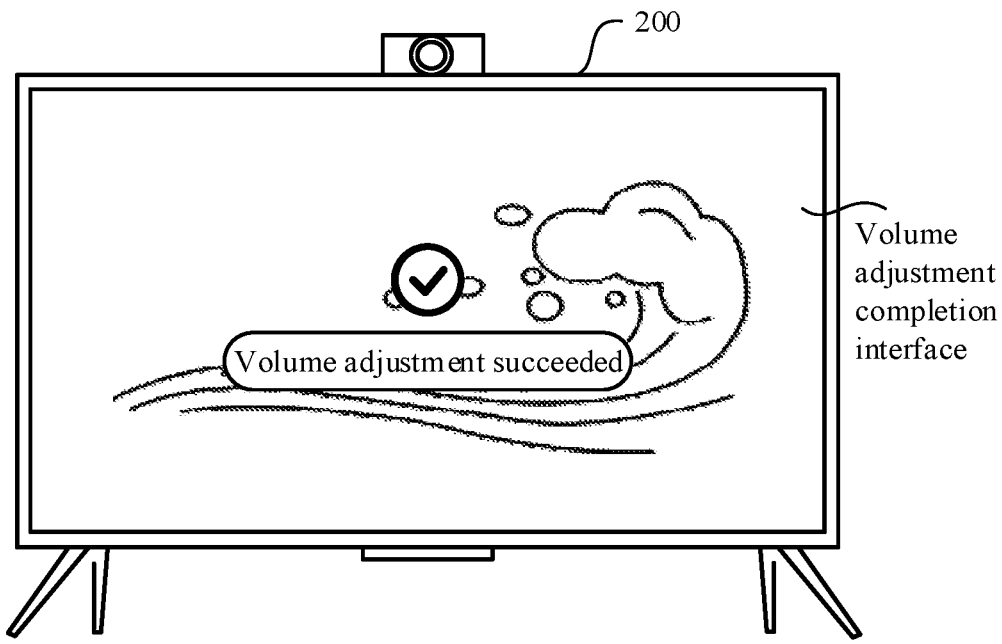
FIG. 25 shows a schematic diagram of presenting a volume adjustment completion interface in a user interface according to some embodiments.

FIG. 25 shows a schematic diagram of presenting a volume adjustment completion interface in a user interface according to some embodiments. Referring to FIG. 25, to prompt the user that volume adjustment is completed, the volume adjustment completion interface presents a volume adjustment completion pattern and a volume adjustment completion prompt message, where the volume adjustment completion pattern may be in a form of a "tick" UI, and a content of the volume adjustment completion prompt message may be "volume adjustment succeeded," etc.

In some embodiments, when the user performs a sliding operation to perform volume adjustment based on the volume adjustment gesture, if the user maintains the volume adjustment gesture without gesture sliding, in this case, the abscissa change amount is zero, it means that there is no volume up or volume down for the volume of the volume bar. Since volume adjustment is not performed in a current state, the at least one processor may recognize this state as a volume adjustment completion state, to prevent the volume adjustment interface from being presented in the user interface all along, which affects normal use of the display apparatus for the user.

To ensure that the at least one processor can accurately detect whether the volume adjustment process is completed, a duration of a state in which the abscissa change amount is zero may be defined. the at least one processor is further configured to: in response to the abscissa change amount generated when the user performs the specified action based on the volume adjustment gesture being zero within a fourth duration, cancel presenting the volume bar, and present the volume adjustment completion interface in the user interface, where the volume adjustment completion interface includes the volume adjustment completion pattern and the volume adjustment completion prompt message.

In some embodiments, the duration of the state in which the abscissa change amount is zero is set as the fourth duration, where the fourth duration refers to a duration from a moment of a last change of the volume of the volume bar to a current moment, and also refers to a duration from a corresponding moment when the user stops sliding after maintaining the volume adjustment gesture and performing a sliding operation to the current moment. The fourth duration may be set as 2 sec, or may be set as other values, or may be set according to needs, and is not limited here.

If the abscissa change amount is zero all along after the user performs a volume adjustment process and after the fourth duration, it means that there is no user gesture sliding within 2 sec, and then there is no volume up or volume down. Therefore, presentation of the volume adjustment interface (the volume bar) presented in the user interface is canceled. After monitoring the broadcast data that the volume bar disappears, the at least one processor generates the volume adjustment completion interface, and presents the volume adjustment completion interface in the user interface, to prompt the user that the volume adjustment is completed. The volume adjustment completion interface is shown in FIG. 25.

In some embodiments, if the user completes a complete volume adjustment process, i.e., after the volume adjustment completion interface is presented in the user interface, and if the user makes the volume adjustment gesture again, the at least one processor can immediately respond to the sliding operation of the gesture to adjust the volume value of the display apparatus. A complete volume adjustment process refers to a process of collecting the user image, performing gesture recognition, successfully recognizing the volume adjustment gesture, activating the volume adjustment function by gesture sliding, starting volume adjustment by gesture sliding, and completing volume adjustment.

After completing a complete volume adjustment process, the at least one processor is further configured to perform following steps.

Step 441: after a current volume adjustment process is completed, acquiring a next frame of the user image including a user gesture collected by the image collector.

Step 442: in response to the user gesture in the next frame of the user image being the volume adjustment gesture, performing a next volume adjustment process.

After the current volume adjustment process is completely completed, if the user makes a user gesture again within the detection region of the image collector, the image collector collects a next frame of the user image including the user gesture, and sends the next frame of the user image to the at least one processor. After receiving a new frame of the user image, the at least one processor re-determines the volume adjustment gesture. When determining that the user gesture in the new user image is the volume adjustment gesture, the at least one processor immediately responds to the volume adjustment command generated while the user performs the specified action based on the volume adjustment gesture, to perform a next volume adjustment process. The contents in the above embodiments may be referred to for a specific volume adjustment process, which will not be repeated here.

In some embodiments, if the user makes a gesture, and then immediately cancels the gesture in a gesture recognition stage, the user maintains the gesture for a duration shorter than the first duration, but immediately makes the gesture again after canceling the gesture, such that the at least one processor frequently recognizes the user gesture in each frame of the user image, thereby affecting normal operation of the display apparatus. Therefore, when a process of starting the volume adjustment is forced to terminate and there is a state in which the user frequently activates the volume adjustment function, the at least one processor may not immediately perform gesture recognition on the user image, but may perform gesture recognition after an interval of time.

When the user frequently makes a gesture within a short time, thus stopping the volume adjustment process halfway, the at least one processor is further configured to: in response to the acquired user image not including the user gesture within the first duration, acquire a next frame of the user image collected by the image collector after an interval of a fifth duration.

The user makes a gesture, and then immediately cancels the gesture. In this case, the user maintains the gesture for a duration shorter than the first duration. Therefore, after the user makes the gesture for a first time, the at least one processor fails to detect whether the gesture is the volume adjustment gesture, and a recognition success rate of the volume adjustment gesture may not yet exceed the first threshold, i.e., the volume adjustment process has not yet been started.

In order to avoid that the user frequently starts the volume adjustment process within a short time, the image collector may collect a next frame of the user image after the interval of the fifth duration from a moment when the user makes a gesture and then immediately cancels the gesture, or when the image collector collects the user image in real time, the at least one processor may acquire the corresponding user image after the interval of the fifth duration.

In some embodiments, the fifth duration refers to a time interval from a moment when the image collector collects a user image including a gesture made by the user to a moment when the image collector collects a next frame of the user image including the gesture. The fifth duration may be set as 3 sec, or may be set as other values according to needs, and is not limited here.

For example, the user makes a gesture at 8:05 and in this case, the image collector collects a user image including the gesture at 8:05. If the user immediately cancels the gesture and then makes the gesture again after an interval of 3 seconds, the image collector may collect the user image including the gesture after a moment of 8:08, or the at least one processor may acquire the user image including the gesture collected by the image collector after the moment of 8:08.

In some embodiments, in order to ensure normal progress of the volume adjustment process, when the volume bar is presented in the user interface, the volume adjustment process is performed without repeatedly starting the gesture detection process for volume adjustment. the at least one processor performs gesture recognition on the user image collected by the image collector, and starts the volume adjustment process by gesture sliding after the gesture recognition is successful. During this process, the volume bar is activated and is presented in the user interface all along, and the gesture detection process is no longer repeated on a subsequently collected user image including the volume adjustment gesture, i.e., the volume adjustment process by gesture sliding is no longer repeatedly started.

In some embodiments, if a complete volume adjustment process is completed, when the volume bar is not presented in the user interface, the gesture detection process for volume adjustment is started to perform the volume adjustment process. A complete volume adjustment process refers to a process of collecting the user image, performing gesture recognition, successfully recognizing the volume adjustment gesture, activating the volume adjustment function by gesture sliding, starting volume adjustment by gesture sliding, and completing volume adjustment.

After a complete volume adjustment process is completed, presentation of the volume bar in the user interface may be canceled, indicating that the current volume adjustment is completed. In this case, the next volume adjustment process may be started, i.e., re-collecting a user image and performing a subsequent detection process.

As can be seen, the display apparatus according to embodiments of the disclosure includes an image collector configured to collect a user image in real time, a memory configured to store instructions and data associated with the display and at least one processor in connection with the display and the memory and configured to execute the instructions to cause the display apparatus to acquire the user image including a user gesture collected by the image collector, and perform gesture recognition on the user image; in response to recognizing that the user gesture in the user image is a volume adjustment gesture, start a smart volume adjustment function on the display apparatus based on the volume adjustment gesture, and present a volume bar in a user interface; and generate a volume adjustment command corresponding to a position change generated when a user performs a specified action based on the volume adjustment gesture, and respond to the volume adjustment command by adjusting a volume value corresponding to the volume bar. As can be seen, the display apparatus according to embodiments of the disclosure recognizes a user's gesture in an image and a position thereof in the image using the AI image detection technology, and implements smart volume adjustment through a position change of the user's gesture in the image without the help of another apparatus, such that the volume adjustment is convenient and efficient with good user experience.

In some embodiments, based on the above contents, completing a volume adjustment process includes a complete volume adjustment process and a volume adjustment process paused halfway. Depending on different forms of the volume adjustment process, the display apparatus performs different steps when performing next volume adjustment.

Figure 26:
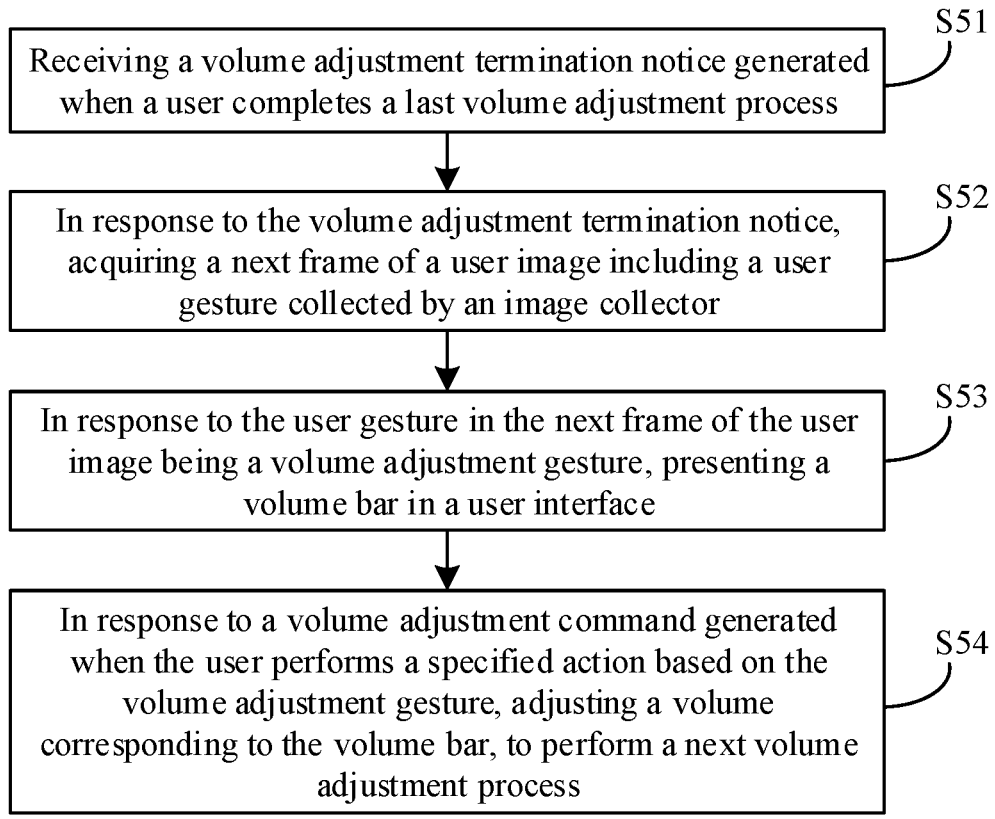
FIG. 26 shows another flowchart of the method for volume adjustment according to some embodiments.

FIG. 26 shows another flowchart of the method for volume adjustment according to some embodiments. Embodiments of the disclosure provide a display apparatus, including: a display configured to present an image and/or a user interface; an image collector configured to collect a user image; a memory configured to store instructions and data associated with the display and at least one processor in connection with the display, the image collector and the memory and configured to execute the instructions to cause the display apparatus to perform various operations or functions. When performing the method for volume adjustment shown in FIG. 26, the at least one processor is configured to perform following steps.

S51: receiving a volume adjustment termination notice generated when a user completes a last volume adjustment process.

The display apparatus may generate the volume adjustment termination notice every time when performing a volume adjustment process. The volume adjustment termination notice may be generated when the at least one processor detects a scenario where there is no longer a gesture or a scenario without gesture sliding in the user image.

The scenario where there is no longer a gesture in the user image may be a scenario where the user cancels a volume adjustment gesture after completely completing a volume adjustment process, or a scenario where the user just makes a gesture, but quickly cancels the gesture (in this case, the volume adjustment process has not yet been started).

The scenario without gesture sliding may be a scenario where the user has completed a volume adjustment process by gesture sliding, or may be a scenario where a volume adjustment function is enabled after gesture recognition is successful, but the user does not perform volume adjustment by gesture sliding.

According to different scenarios, the system may generate different volume adjustment termination notices, and send the volume adjustment termination notices to the at least one processor by broadcast packages, so that the at least one processor performs a next volume adjustment process using different strategies according to the volume adjustment termination notices in different scenarios.

S52: in response to the volume adjustment termination notice, acquiring a next frame of a user image including a user gesture collected by the image collector.

The volume adjustment termination notice is generated in different scenarios. Therefore, in different scenarios, the volume adjustment termination notice includes a volume adjustment completion notice and a volume adjustment failure notice, where the volume adjustment completion notice is generated in a process where the display apparatus has completely performed a volume adjustment process, and the volume adjustment failure notice is generated in a process where the display apparatus is forced to terminate the volume adjustment process due to gesture disappearance halfway.

In some embodiments, when the volume adjustment process is completely completed, the volume adjustment termination notice is the volume adjustment completion notice. In this case, when performing in response to the volume adjustment termination notice, acquiring a next frame of the user image collected by the image collector and including the user gesture, the at least one processor is further configured to perform following steps.

Step 5211: during a last volume adjustment process, in response to an abscissa change amount generated when the user performs a specified action based on a volume adjustment gesture being zero within a fourth duration, generating a volume adjustment completion notice.

Step 5212: in response to the volume adjustment completion notice, acquiring a next frame of the user image including the user gesture collected by the image collector.

During the last volume adjustment process, if the abscissa change amount generated when the user performs the specified action based on the volume adjustment gesture is zero within the fourth duration, it means that the display apparatus has completed a volume adjustment process. In this case, presentation of a volume bar is canceled, and the volume adjustment completion notice is generated.

In response to the volume adjustment completion notice, the at least one processor may present a volume adjustment completion interface in the user interface, and immediately acquire a next frame of the user image collected by the image collector, to perform gesture recognition according to the next frame of the user image, thus facilitating immediate start of the next volume adjustment process.

In some embodiments, when a volume adjustment process is not completely completed, the volume adjustment termination notice is the volume adjustment failure notice. In this case, when performing in response to the volume adjustment termination notice, acquiring the next frame of the user image including the user gesture collected by the image collector, the at least one processor is further configured to perform following steps.

Step 5221: during the last volume adjustment process, in response to a next frame of the collected user image not including the volume adjustment gesture, generating a volume adjustment failure notice.

Step 5222: in response to the volume adjustment failure notice, acquiring a next frame of the user image collected by the image collector and including the user gesture after an interval of a fifth duration.

During the last volume adjustment process, if a next frame of the collected user image does not include the volume adjustment gesture, for example, in a gesture recognition stage, the user makes a gesture, and then immediately cancels the gesture; in this case, the user maintains the gesture for a duration shorter than a first duration. Therefore, after the user makes the gesture for a first time, the at least one processor fails to detect whether the gesture is the volume adjustment gesture, and a recognition success rate of the volume adjustment gesture may not yet exceed a first threshold, i.e., the volume adjustment process has not yet been started.

If the next frame of the user image collected by the image collector does not include the volume adjustment gesture, it means that the gesture disappears halfway during the start of the volume adjustment process. In this case, the start of the volume adjustment process is terminated by force, and the volume adjustment failure notice is generated.

If the user frequently starts the volume adjustment process within a short time, the image collector may collect the next frame of the user image after the interval of the fifth duration from a moment when the user makes a gesture and then immediately cancels the gesture, or when the image collector collects the user image in real time, the at least one processor may acquire a corresponding user image after the interval of the fifth duration.

In response to the volume adjustment failure notice, the at least one processor re-acquires a next frame of the user image collected by the image collector and including the user gesture after the interval of the fifth duration. This method can prevent frequent recognition of the user gesture in each frame of the user image by the at least one processor from affecting normal operation of the display apparatus.

S53: in response to the user gesture in the next frame of the user image being the volume adjustment gesture, presenting a volume bar in a user interface.

S54: in response to a volume adjustment command generated when the user performs the specified action based on the volume adjustment gesture, adjusting a volume corresponding to the volume bar, to perform a next volume adjustment process.

After completing a volume adjustment process, the next volume adjustment process is entered. In this case, the at least one processor performs corresponding gesture recognition, i.e., a subsequent process, according to the next frame of the acquired user image, to adjust the volume of the volume bar according to a position change generated by sliding gesture from the user. Steps S11 to S13 in the above embodiments and the contents of related portions may be referred to for contents of relevant specific implementations, which will not be repeated here.

As can be seen, the display apparatus according to embodiments of the disclosure receives the volume adjustment termination notice generated when the user completes the last volume adjustment process after completing a volume adjustment process. When the volume adjustment termination notice is the volume adjustment completion notice, the at least one processor can immediately respond to the next volume adjustment process. When the volume adjustment termination notice is the volume adjustment failure notice, the at least one processor can respond to the next volume adjustment process after the interval of the fifth duration. As can be seen, the display apparatus can perform corresponding processes during the next volume adjustment according to different forms of the volume adjustment termination notices received, thus improving the volume adjustment efficiency with good user experience.

FIG. 17 shows a flowchart of a method for volume adjustment according to some embodiments. Referring to FIG. 17, the disclosure further provides a method for volume adjustment performed by one or more processors in the display apparatus according to the above embodiments. The method includes following steps.

S41: acquiring a user image including a user gesture collected by an image collector.

S42: in response to recognizing that the user gesture in the user image is a volume adjustment gesture, presenting a volume bar in a user interface.

S43: in response to a volume adjustment command generated when a user performs a specified action based on the volume adjustment gesture, adjusting a volume value corresponding to the volume bar.

FIG. 26 shows another flowchart of the method for volume adjustment according to some embodiments. Referring to FIG. 26, the disclosure further provides a method for volume adjustment performed by one or more processors in the display apparatus according to the above embodiments. The method includes following steps.

S51: receiving a volume adjustment termination notice generated when a user completes a last volume adjustment process.

S52: in response to the volume adjustment termination notice, acquiring a next frame of a user image including a user gesture collected by an image collector.

S53: in response to the user gesture in the next frame of the user image being a volume adjustment gesture, presenting a volume bar in a user interface.

S54: in response to a volume adjustment command generated when the user performs a specified action based on the volume adjustment gesture, adjusting a volume corresponding to the volume bar, to perform a next volume adjustment process.

As can be seen from the above embodiments, the method for volume adjustment and the display apparatus according to embodiments of the disclosure include an image collector configured to collect a user image in real time, a memory configured to store instructions and data associated with a display of the display apparatus, and one or more processors in connection with the display, the image collector and the memory and configured to execute the instructions to cause the display apparatus to acquire a user image including a user gesture collected by the image collector, and perform gesture recognition on the user image; in response to recognizing that the user gesture in the user image is a volume adjustment gesture, start a smart volume adjustment function on the display apparatus based on the volume adjustment gesture by sliding, and present a volume bar in a user interface; and generate a volume adjustment command corresponding to a position change generated when a user performs a specified action based on the volume adjustment gesture, and respond to the volume adjustment command by adjusting a volume value corresponding to the volume bar. As can be seen, the method and the display apparatus according to embodiments of the disclosure recognize a user's gesture in an image and a position thereof in the image using the AI image detection technology, and implements smart volume adjustment through a position change of the user's gesture in the image without the help of another device, such that the volume adjustment is convenient and efficient with good user experience.

In some cases, there may be multiple users in front of the display apparatus, so that the image collector may also collect an image of the multiple users. If the multiple users control the display apparatus using gestures, the display apparatus cannot perform multiple parallel commands at a same moment. Therefore, for a scenario with multi-person gesture control, it is necessary to provide a method for volume adjustment based on multi-person gesture recognition and a display apparatus for volume adjustment based on multi-person gesture recognition.

Figure 27:
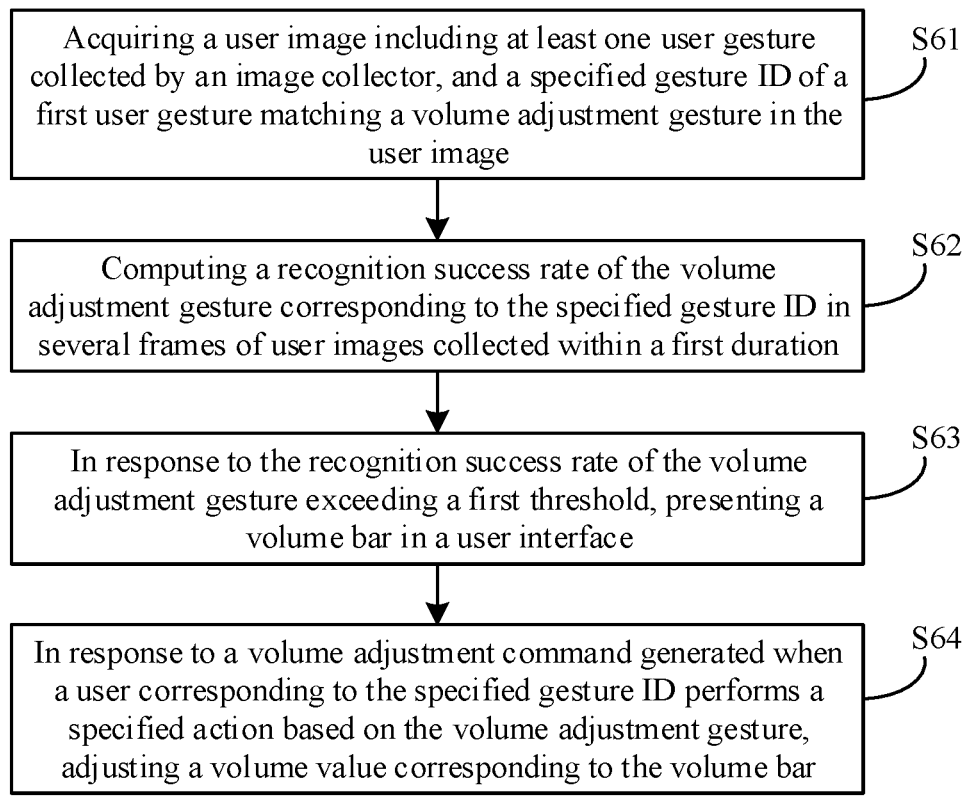
FIG. 27 shows a flowchart of a method for volume adjustment based on multi-person gesture recognition according to some embodiments.

Embodiments of the disclosure provide a display apparatus, including: a display configured to present an image and/or a user interface; an image collector or a user input interface configured to connect with the image collector, the image collector being configured to collect a user image, the user input interface being configured to receive a user command input through an action, such as voice, touch, gesture, pressing, etc.; a memory configured to store instructions and data associated with the display and one or more processors in connection with the display, the image collector, the user input interface and the memory and configured to execute the instructions to cause the display apparatus to perform various operations and functions. When performing the method for volume adjustment based on multi-person gesture recognition shown in FIG. 27, the at least one processor is configured to perform following steps.

S61: acquiring a user image including at least one user gesture collected by an image collector, and a specified gesture ID of a first user gesture matching a volume adjustment gesture in the user image.

In some embodiments, if multiple users use the display apparatus simultaneously, a user image including multiple user gestures of the users within a detection region of the image collector may be collected. In this case, in order to avoid confusion in volume adjustment, one of the user gestures may be used as a reference user gesture for adjustment. Therefore, it is necessary to determine a specified user gesture among the multiple user gestures in the user image.

To facilitate identification of each user gesture, a corresponding gesture ID may be configured for each user gesture. The gesture ID is used for representing a serial number of each user gesture in the user image, and is randomly assigned to distinguish between different user gestures. For example, if there are 3 user gestures in a same frame of the user image, gesture IDs of the three user gestures are 1, 2, and 3, respectively.

When recognition detection is performed on a current frame of the user image collected by the image collector, if the multiple user gestures are recognized, information of the first recognized volume adjustment gesture is prevailing, i.e., a gesture ID of the first recognized volume adjustment gesture serves as the specified gesture ID, so that only a volume adjustment command corresponding to the specified gesture ID is subsequently responded to, thus implementing smooth volume adjustment of the display apparatus, and preventing interference from multi-person gestures.

In some embodiments, acquiring the specified gesture ID of the first user gesture matching the volume adjustment gesture in the user image, the at least one processor is further configured to perform following steps.

Step 611: recognizing at least one user gesture in a user image.

Step 612: determining whether one of the at least one user gesture matches a volume adjustment gesture.

Step 613: in response to a user gesture matching the volume adjustment gesture, determining a first matching user gesture as a specified user gesture.

Step 614: acquiring a gesture ID of the specified user gesture, and determining the gesture ID as a specified gesture ID.

The image collector collects the user image including a user gesture of a user within the detection region. However, if the user gesture made by the user is not a gesture intended to implement volume adjustment, but other accidental gesture, such as a five-finger gesture or a gesture of the number 1 made using one finger, in this case, it is not necessary to start a gesture detection process for volume adjustment, i.e., it is not necessary to activate the volume bar to perform volume adjustment.

Therefore, it is necessary to invoke an AI smart detection function to perform gesture recognition on the user image. If there are multiple user gestures, it is necessary to sequentially determine whether each user gesture matches the volume adjustment gesture.

The image collector collects the user image including the user gesture of the user within the detection region. However, if the user gesture made by the user is not a gesture intended to implement volume adjustment, but other accidental gesture, in this case, it is not necessary to start the gesture detection process for volume adjustment.

A smart algorithm for volume adjustment through gesture recognition based on an AI image detection technology includes a byte algorithm and a gesture algorithm. The byte algorithm is used to detect a user gesture in a user image. If a same frame of the user image including multiple user gestures is detected, these recognized user gestures are transmitted to the gesture algorithm. The transmission sequence of each user gesture is not sequential.

The gesture algorithm is used to match each user gesture with the volume adjustment gesture. As long as one volume adjustment gesture is found in this frame of the user image, a gesture ID of the gesture is recorded. The gesture algorithm matches each user gesture with the volume adjustment gesture in a random sequence. If a first recognized user gesture is not the volume adjustment gesture, a second user gesture may be detected by polling until it is detected that one user gesture is the volume adjustment gesture. In this case, subsequent gestures in this frame of the user image may not be detected by polling.

Based on this smart algorithm, if a user gesture in the same frame of the user image matches the volume adjustment gesture, the first matching user gesture is determined as the specified user gesture. Further, the gesture ID of the specified user gesture is acquired, and is determined as the specified gesture ID.

Figure 28:
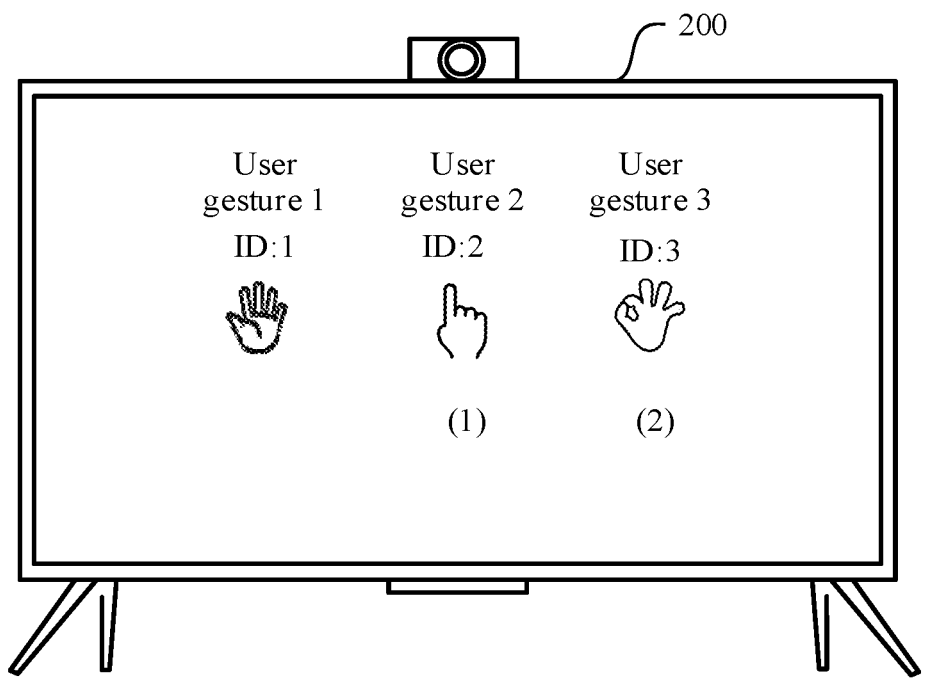
FIG. 28 shows a schematic diagram of multiple user gestures existing in a user image according to some embodiments.

FIG. 28 shows a schematic diagram of multiple user gestures existing in a user image according to some embodiments. For example, referring to FIG. 28, if there are 3 user gestures in a same user image: a user gesture 1 is a one-handed five-finger gesture with a corresponding gesture ID of 1; a user gesture 2 is a gesture of the number 1 made using a finger with a corresponding gesture ID of 2; and a user gesture 3 is an OK gesture with a corresponding gesture ID of 3.

The gesture algorithm randomly selects the user gesture 2 as a first user gesture to match with the volume adjustment gesture, where the user gesture 2 is the gesture of the number 1 made using a finger, and does not match the volume adjustment gesture. In this case, a second user gesture is selected to match with the volume adjustment gesture. If the user gesture 3 is the second user gesture to match with the volume adjustment gesture, and matches the volume adjustment gesture, matching between a third user gesture (the user gesture 1) and the volume adjustment gesture may not be performed, no matter whether the third user gesture is the volume adjustment gesture or not.

When the second user gesture matches the volume adjustment gesture, in this case, if a gesture ID of the second user gesture (the user gesture 3) is 3, a specified gesture ID corresponding to a current volume adjustment process is 3.

The specified gesture ID is used for representing the first user gesture matching the volume adjustment gesture. The specified gesture ID can be used to calibrate a gesture of a same user, so that subsequently in response to a volume adjustment command, volume adjustment of the display apparatus is implemented only according to a volume adjustment command generated by the user corresponding to the specified gesture ID, thereby ensuring that during the adjustment process, even gestures of other users generate interference, the gestures of the other users are not responded to, ensuring smooth volume adjustment, avoiding confusion, and achieving accurate volume adjustment.

S62: computing a recognition success rate of the volume adjustment gesture corresponding to the specified gesture ID in several frames of user images collected within a first duration.

When a volume adjustment gesture is recognized in a current frame of the user image, a specified gesture ID of the gesture is recorded, and a timer is started with a duration being the first duration from a moment when the specified gesture ID is determined. In some embodiments, the first duration is used for a gesture detection process, and may be set as 1 sec. The first duration may also be set as other durations according to needs, and is not limited here.

After determining the specified gesture ID, the image collector collects several frames of the user images within the first duration, and sends the several frames of the user images to the at least one processor, to perform gesture detection and recognition on each frame of the user image. In order to implement accurate volume adjustment of the display apparatus based on gestures, volume adjustment of the display apparatus may not be performed immediately when a volume adjustment gesture is recognized. Instead, volume adjustment of the display apparatus is performed only after the volume adjustment gesture corresponding to the specified gesture ID lasts for a period of time, to prevent the at least one processor from failure to determine whether volume adjustment is required because the user makes the volume adjustment gesture, only retains the gesture for a short time, and then cancels the gesture.

Therefore, it is necessary to compute the recognition success rate of the volume adjustment gesture corresponding to the specified gesture ID. Only when the number of recognition success frames of the volume adjustment gesture corresponding to the specified gesture ID within the first duration satisfies a condition, gesture recognition success is determined, and then volume adjustment of the display apparatus can be performed according to the volume adjustment gesture.

Figure 29:
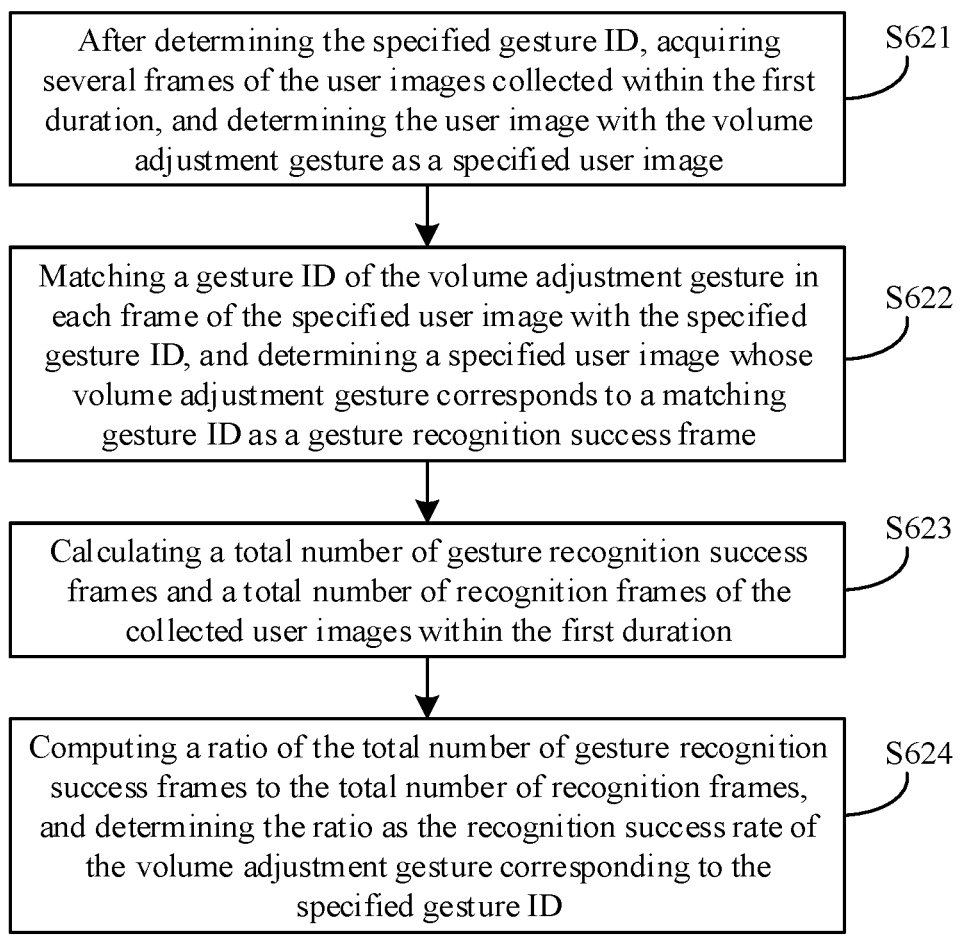
FIG. 29 shows a flowchart of a method for computing a recognition success rate according to some embodiments.

FIG. 29 shows a flowchart of a method for computing a recognition success rate according to some embodiments. Referring to FIG. 29, in some embodiments, when computing the recognition success rate of the volume adjustment gesture corresponding to the specified gesture ID in several frames of the user images collected within the first duration, the at least one processor is further configured to perform following steps.

S621: after determining the specified gesture ID, acquiring several frames of the user images collected within the first duration, and determining the user image with the volume adjustment gesture as a specified user image.

S622: matching a gesture ID of the volume adjustment gesture in each frame of the specified user image with the specified gesture ID, and determining a specified user image whose volume adjustment gesture corresponds to a matching gesture ID as a gesture recognition success frame.

S623: calculating a total number of gesture recognition success frames and a total number of recognition frames of the collected user images within the first duration.

S624: computing a ratio of the total number of gesture recognition success frames to the total number of recognition frames, and determining the ratio as the recognition success rate of the volume adjustment gesture corresponding to the specified gesture ID.

After acquiring several frames of the user images collected within the first duration, information of each user gesture in each frame of the user image is compared with the specified gesture ID. If a gesture has the same gesture ID and is the volume adjustment gesture, it means that the gesture of the same user is detected.

Therefore, each user image in each frame of the user image first matches with the volume adjustment gesture to determine whether there is a volume adjustment gesture in each user image in each frame of the user images, and determine a user image with the volume adjustment gesture as the specified user image.

For example, 10 frames of the user images are collected within the first duration, and there is at least one user gesture in each frame of the user image. Each user gesture matches with the volume adjustment gesture. If it is determined that there is the volume adjustment gesture in 8 frames of the user images, it is determined that the 8 frames of the user images are specified user images.

Because even if there is the volume adjustment gesture in the user image, it also may be a gesture made by other users. Therefore, to ensure that volume adjustment of the display apparatus is implemented only according to a gesture of one user, it is necessary to re-determine whether a gesture ID of each user gesture is consistent with or same as the specified gesture ID.

A gesture ID of the volume adjustment gesture in each frame of the specified user image is acquired, to match the gesture ID of the volume adjustment gesture in each frame of the specified user image with the specified gesture ID (as reference), and determine a specified user image to which the volume adjustment gesture corresponding to the matching gesture ID belongs as the gesture recognition success frame. Even if there are multiple volume adjustment gestures in a same frame of the specified user image, but because different users have different gesture IDs, a volume adjustment gesture consistent with the specified gesture ID can be determined according to the specified gesture ID, thereby determining the gesture recognition success frame.

All gesture recognition success frames detected within the first duration are summarized to calculate the total number of gesture recognition success frames, calculate the total number of recognition frames of all user images collected within the first duration, compute the ratio of the total number of gesture recognition success frames to the total number of recognition frames, and determine the ratio as the recognition success rate of the volume adjustment gesture corresponding to the specified gesture ID.

For example, when the AI smart detection method detects that a user gesture in a frame of the user image is the volume adjustment gesture, a timer of 1 s (the first duration) is started, and each frame of the user image within 1 s is detected. If the volume adjustment gesture is detected and its corresponding gesture ID is same as the specified gesture ID, it means that the gesture is made using a same hand, and then the total number of gesture recognition success frames (Detected Frames) and the total number of recognition frames (Total Frames) corresponding to the volume adjustment gesture are increased by one respectively. If the detected user gesture is not the volume adjustment gesture or if the gesture ID of the user gesture is different from the specified gesture ID, only the total number of recognition frames is increased by one. This process is repeated until 1 s (the first duration) is expired. The ratio of the total number of gesture recognition success frames to the total number of recognition frames (Success Rate=Detected Frames/Total Frames) is computed, and is determined as the recognition success rate of the volume adjustment gesture corresponding to the specified gesture ID.

S63: in response to the recognition success rate of the volume adjustment gesture exceeding a first threshold, presenting a volume bar in a user interface.

In some embodiments, in order to avoid the at least one processor being unable to determine whether the volume bar needs to be activated to perform volume adjustment after the user makes the volume adjustment gesture, only retains the gesture for a short time, and then cancels the gesture, and to facilitate the at least one processor to promptly activate the volume bar to perform volume adjustment, the first threshold may be set, so that among the multiple frames of the user images collected by the image collector within the first duration, only when the recognition success rate of the volume adjustment gesture corresponding to the specified gesture ID exceeds the first threshold, the gesture recognition is determined to be successful. Then, a volume bar control is activated to perform a subsequent volume adjustment process.

That is, during the gesture detection process (the first duration), only when a ratio of the number of user images whose user gestures are recognized as the volume adjustment gestures to a total number of user images exceeds a threshold, it means that the user needs to activate the volume adjustment function. Otherwise, the volume adjustment process is not performed.

Therefore, after the recognition success rate of the corresponding volume adjustment gesture within the first duration is determined, whether the recognition success rate of the volume adjustment gesture exceeds the first threshold is determined. In some embodiments, the first threshold may be set as 90%. If the recognition success rate exceeds the first threshold of 90%, it means that during a current gesture detection process (within the first duration), the gesture recognition is successful. In this case, the volume bar may be presented in the user interface. The first threshold may also be set as other values according to needs, and is not limited here.

If the recognition success rate of the volume adjustment gesture corresponding to the specified gesture ID is less than the first threshold, it means that the gesture recognition detection fails, and a currently detected volume adjustment gesture of the same user may be lost. In this case, the volume adjustment gesture is immediately re-detected.

In some embodiments, before activating the volume bar control for presentation, the at least one processor needs to first determine whether the gesture recognition is successful. Therefore, in order for the user to clearly know that current gesture recognition is successful, the at least one processor may present a volume adjustment gesture prompt interface in the user interface.

S64: in response to a volume adjustment command generated when a user corresponding to the specified gesture ID performs a specified action based on the volume adjustment gesture, adjusting a volume value corresponding to the volume bar.

When the volume adjustment gesture made by the user satisfies the need for starting the volume adjustment process, the user can perform a corresponding operation according to the volume adjustment operation prompt message presented in the user interface. That is, after the gesture recognition detection is successful, the user corresponding to the specified gesture ID maintains the volume adjustment gesture, and adjusts the volume by performing a specified action. In some embodiments, the specified action may be a left/right sliding gesture.

For example, the user can perform volume adjustment by maintaining the OK gesture using his/her fingers, and left/right sliding along a horizontal direction in front of the display apparatus (within a detection region of the image collector).

The at least one processor only responds to a command generated by the user corresponding to the specified gesture ID. If other users also perform the specified action based on the volume adjustment gesture, because gesture IDs of the other users are different from the previously determined specified gesture ID, the at least one processor may not respond to volume adjustment commands from the other users based on the volume adjustment gesture, thus preventing the volume shaking with the volume adjustment gestures of the other users when one user slides the volume from affecting the user experience.

The user corresponding to the specified gesture ID maintains the volume adjustment gesture, and performs a specified action, such as left/right sliding in a horizontal direction, thus resulting in a position change of the user fingers, and an effect presented in the user image is an abscissa change of the gesture. In this case, when the position change occurs, the volume adjustment command can be generated. In response to the volume adjustment command, the at least one processor can promptly adjust the volume of the volume bar according to the abscissa change. In this case, the volume value presented on the volume bar changes accordingly, such as volume up or volume down.

As can be seen, the display apparatus according to embodiments of the disclosure includes an image collector configured to collect a user image in real time, a memory configured to store instructions and data associated with a display of the display apparatus and one or more processors in connection with the display, the image collector and the memory and configured to execute the instructions to cause the display apparatus to acquire the user image including at least one user gesture collected by the image collector, and determine a specified gesture ID of a first user gesture matching a volume adjustment gesture in the user image; compute a recognition success rate of the volume adjustment gesture corresponding to the specified gesture ID in several frames of the user images collected within a first duration; in response to the recognition success rate of the volume adjustment gesture exceeding a first threshold, present a volume bar in a user interface; and generate a volume adjustment command corresponding to a position change generated when a user corresponding to the specified gesture ID performs a specified action based on the volume adjustment gesture, and respond to the volume adjustment command by adjusting a volume value corresponding to the volume bar. As can be seen, the display apparatus according to embodiments of the disclosure, when recognizing multiple user gestures in the user image, determines a user by determining the specified gesture ID, and performs volume adjustment based on the user gesture corresponding to the specified gesture ID, thereby effectively solving problems such as loss and confusion during the gesture recognition process, ensuring that the volume value of the display apparatus can be smoothly adjusted through recognition of sliding gestures, and improving the user experience.

The disclosure further provides a computer non-transitory storage medium, where the computer storage medium may store programs and when executed may cause the display apparatus to perform some or all steps in embodiments of the method and the method for volume adjustment provided in the disclosure. The storage medium may be, e.g., a diskette, an optical disk, a read-only memory (ROM for short), or a random access memory (RAM for short), etc.

For the convenience of explanation, the above description has been made in combination with specific embodiments. However, the above example discussion is not intended to be exhaustive or to limit embodiments to the specific forms disclosed above. Numerous modifications and variations can be obtained in light of the above teachings. The above embodiments are chosen and described in order to better explain the principles and practical applications, to enable those skilled in the art to better utilize the described embodiments and various variant embodiments suitable for specific uses.

What is claimed is:

1. A display apparatus, comprising:
a display configured to present an image and/or a user interface;
an image collector or a user input interface configured to connect with the image collector, the image collector being configured to collect a user image;
a memory configured to store instructions and data associated with the display;
one or more processors in connection with the display, the image collector or the user input interface and the memory and configured to execute the instructions to cause the display apparatus to:
in response to a switch command for a gesture detection function switch on the user interface, detect whether the image collector is occupied by a specified application that needs to start the image collector based on an attribute state of the image collector;
in response to the attribute state being a first state, determine that the image collector is occupied by the specified application that needs to start the image collector, and not perform a gesture detection function;
in response to the attribute state being a second state, determine that the image collector is not occupied by the specified application that needs to start the image collector, and perform the gesture detection function;
wherein the one or more processors are further configured to execute the instructions to cause the display apparatus to:
in response to the gesture detection function being enabled, acquire a user image comprising a user gesture collected by the image collector;
in response to the user gesture indicating a play and pause control gesture, compute a first effective success frame rate of the play and pause control gesture; in response to the first effective success frame rate of the play and pause control gesture exceeding a first effective threshold, respond to a command corresponding to the play and pause control gesture by performing a play operation or a pause operation;
in response to the user gesture indicating a mute control gesture, respond to a command corresponding to the mute control gesture by performing a mute operation or a unmute operation.

2. The display apparatus according to claim 1, wherein the one or more processors are further configured to execute the instructions to cause the display apparatus to:
in response to detecting that the user gesture in the user image is a play and pause control gesture, acquire a playing mode for playing a video file;
in response to the playing mode being full-screen playing, respond to a command generated from the play and pause control gesture by performing a play operation or a pause operation on the video file;

in response to the playing mode being small-screen playing, not respond to the command generated from the play and pause control gesture.

3. The display apparatus according to claim 2, wherein the one or more processors are further configured to execute the instructions to cause the display apparatus to:

acquire a signal source ID for identifying a channel type;

in response to the signal source ID indicating a first channel type, acquire playing mode broadcast data for playing the video file, and determine whether to respond to the command generated from the play and pause control gesture based on the playing mode indicated by the playing mode broadcast data;

in response to the signal source ID indicating a second channel type, not respond to the command generated from the play and pause control gesture.

4. The display apparatus according to claim 1, wherein the one or more processors are further configured to execute the instructions to cause the display apparatus to:

match the user gesture with a preset control gesture, the preset control gesture comprising the play and pause control gesture and the mute control gesture;

in response to the user gesture matching the play and pause control gesture, compute a play and pause gesture confidence of the user gesture with respect to the play and pause control gesture;

in response to the play and pause gesture confidence exceeding a gesture success threshold, determine that the user gesture is the play and pause control gesture.

5. The display apparatus according to claim 1, wherein the one or more processors are further configured to execute the instructions to cause the display apparatus to:

in response to the user gesture being the play and pause control gesture, acquire a total number of gesture recognition frames of user images collected, and a number of gesture success frames of corresponding user images when the user gesture is the play and pause control gesture within a first detection duration;

compute a ratio of the number of gesture success frames to the total number of gesture recognition frames, and determine the ratio as the first effective success frame rate of the play and pause control gesture.

6. The display apparatus according to claim 1, wherein the one or more processors are further configured to execute the instructions to cause the display apparatus to:

in response to the first effective success frame rate of the play and pause control gesture exceeding the first effective threshold, acquire a user image collected within a second detection duration;

compute a second effective success frame rate of the play and pause control gesture in the user image collected within the second detection duration;

in response to the second effective success frame rate of the play and pause control gesture exceeding a third effective threshold, respond to a command corresponding to the play and pause control gesture by performing the play operation or the pause operation;

in response to the second effective success frame rate of the play and pause control gesture not exceeding the third effective threshold, cancel responding to a command corresponding to the play and pause control gesture by performing the play operation or the pause operation.

7. The display apparatus according to claim 6, wherein the one or more processors are further configured to execute the instructions to cause the display apparatus to:

in response to a play and pause command generated when the second effective success frame rate of the play and pause control gesture exceeds the third effective threshold, acquire playing mode broadcast data for playing a video file;

in response to the playing mode broadcast data indicating full-screen playing, responding to the play and pause command by performing the play operation or the pause operation on the video file;

in response to the playing mode broadcast data indicating small-screen playing, not respond to the play and pause command.

8. The display apparatus according to claim 7, wherein the one or more processors are further configured to execute the instructions to cause the display apparatus to:

in response to the playing mode broadcast data indicating full-screen playing, acquire a current playing state of the video file;

in response to the current playing state being a video playing state, respond to the play and pause command by performing the pause operation on the video file;

in response to the current playing state being a video pause state, respond to the play and pause command by performing the play operation on the video file.

9. The display apparatus according to claim 1, wherein the one or more processors are further configured to execute the instructions to cause the display apparatus to:

recognize the user gesture in the user image, to determine whether the user gesture is the mute control gesture;

in response to the user gesture being the mute control gesture, compute a first effective success frame rate of the mute control gesture;

in response to the first effective success frame rate of the mute control gesture exceeding a second effective threshold, respond to a command corresponding to the mute control gesture by performing the mute operation or the unmute operation.

10. The display apparatus according to claim 9, wherein the one or more processors are further configured to execute the instructions to cause the display apparatus to:

match the user gesture with a preset control gesture, the preset control gesture comprising the play and pause control gesture and the mute control gesture;

in response to the user gesture matching the mute control gesture, compute a mute gesture confidence of the user gesture with respect to the mute control gesture;

in response to the mute gesture confidence exceeding a gesture success threshold, determine that the user gesture is the mute control gesture.

11. The display apparatus according to claim 9, wherein the one or more processors are further configured to execute the instructions to cause the display apparatus to:

in response to the user gesture being the mute control gesture, acquire a total number of gesture recognition frames of user images collected, and a number of gesture success frames of corresponding user images when the user gesture is the mute gesture within a first detection duration;

compute a ratio of the number of gesture success frames to the total number of gesture recognition frames, and determine the ratio as the first effective success frame rate of the mute control gesture.

12. The display apparatus according to claim 9, wherein the one or more processors are further configured to execute the instructions to cause the display apparatus to:
  in response to the first effective success frame rate of the mute control gesture exceeding a second effective threshold, acquire a user image collected within a second detection duration;
  compute a second effective success frame rate of the mute control gesture in the user image collected within the second detection duration;
  in response to the second effective success frame rate of the mute control gesture exceeding a third effective threshold, respond to a command corresponding to the mute control gesture by performing the mute operation or the unmute operation;
  in response to the second effective success frame rate of the play and pause control gesture not exceeding the third effective threshold, cancel responding to a command corresponding to the mute control gesture by performing the mute operation or the unmute operation.

13. The display apparatus according to claim 12, wherein the one or more processors are further configured to execute the instructions to cause the display apparatus to:
  in response to a mute command generated when the second effective success frame rate of the mute control gesture exceeding the third effective threshold, acquire a current mute flag bit of a system;
  in response to the current mute flag bit being True, responding to the mute command by performing the unmute operation;
  in response to the current mute flag bit being False, responding to the mute command by performing the mute operation.

14. The display apparatus according to claim 1, wherein the one or more processors are further configured to execute the instructions to cause the display apparatus to:
  in response to determining that the user gesture is the play and pause control gesture or the mute control gesture, present a gesture detection prompt interface in the user interface, the gesture detection prompt interface presenting a gesture recognition success prompt message and a gesture pattern;
  during acquiring the user image collected within the second detection duration, present the gesture pattern in a form of buffered animation, the buffered animation being presented for a duration of the second detection duration.

15. The display apparatus according to claim 1, wherein the one or more processors are further configured to execute the instructions to cause the display apparatus to:
  after performing a process of controlling the play operation or the pause operation, or controlling the mute operation or the an unmute operation, after an interval of a preset duration, acquire a next frame of a user image comprising a user gesture collected by the image collector;
  in response to the user gesture in the next frame of the user image being a play and pause control gesture, responding to a command corresponding to the play and pause control gesture by performing a next play operation or pause operation;
  in response to the user gesture in the next frame of the user image being a mute control gesture, responding to a command corresponding to the mute control gesture by performing a next mute operation or unmute operation.

16. The display apparatus according to claim 1, wherein the one or more processors are further configured to execute the instructions to cause the display apparatus to:
  after performing a process of controlling the play operation or the pause operation, or controlling the mute operation or the an unmute operation, present an operation completion prompt interface in the user interface, the operation completion prompt interface presenting an operation completion pattern and an operation completion prompt message.

17. A control method for a display apparatus, comprising:
  in response to a switch command for a gesture detection function switch on a user interface, detecting whether an image collector is occupied by a specified application that needs to start the image collector based on an attribute state of the image collector;
  in response to the attribute state being a first state, determining that the image collector is occupied by the specified application that needs to start the image collector, and not performing a gesture detection function;
  in response to the attribute state being a second state, determining that the image collector is not occupied by the specified application that needs to start the image collector, and performing the gesture detection function;
  wherein the method further comprises:
  in response to the gesture detection function being enabled, acquiring a user image comprising a user gesture collected by the image collector;
  in response to detecting that the user gesture in the user image is a play and pause control gesture, acquiring a playing mode for playing a video file;
  in response to the playing mode being full-screen playing, responding to a command generated from the play and pause control gesture by performing a play operation or a pause operation on the video file;
  in response to the playing mode being small-screen playing, not responding to a command generated from the play and pause control gesture.

18. The method according to claim 17, further comprising:
  acquiring a signal source ID for identifying a channel type;
  in response to the signal source ID indicating a first channel type, acquiring playing mode broadcast data for playing the video file, and determining whether to respond to a command generated from the play and pause control gesture based on the playing mode indicated by the playing mode broadcast data;
  in response to the signal source ID indicating a second channel type, not responding to the command generated from the play and pause control gesture.

* * * * *